US007054389B2

(12) United States Patent
Yokogawa et al.

(10) Patent No.: US 7,054,389 B2
(45) Date of Patent: May 30, 2006

(54) CARRIER DETECTION CIRCUIT AND INFRARED RAY REMOTE CONTROL RECEIVER

(75) Inventors: Naruichi Yokogawa, Kashihara (JP); Takeshi Nishino, Nara (JP); Kazuo Noda, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 912 days.

(21) Appl. No.: 09/919,955

(22) Filed: Aug. 2, 2001

(65) Prior Publication Data

US 2002/0098818 A1 Jul. 25, 2002

(30) Foreign Application Priority Data

Aug. 2, 2000 (JP) ............................ 2000-234926
Dec. 25, 2000 (JP) ............................ 2000-393355

(51) Int. Cl.
*H03D 1/00* (2006.01)
*H04B 7/00* (2006.01)

(52) U.S. Cl. ...................................... 375/340; 455/263

(58) Field of Classification Search ................ 375/340, 375/345, 316, 346; 455/263, 337, 255, 214; 342/27, 28; 329/312, 313, 353
See application file for complete search history.

(56) References Cited

U.S. PATENT DOCUMENTS 4,554,508 A * 11/1985 Haque ........................ 455/229
5,081,653 A * 1/1992 Saito .......................... 375/345
6,463,108 B1 * 10/2002 Shakiba ...................... 375/345

FOREIGN PATENT DOCUMENTS

| | | | |
|---|---|---|---|
| JP | 56-11548 | U | 1/1981 |
| JP | 57-76960 | A | 5/1982 |
| JP | 60-227550 | A | 11/1985 |
| JP | 61-167250 | A | 7/1986 |
| JP | 2-166858 | A | 6/1990 |
| JP | 188835 | | 7/1994 |
| JP | 33020 | | 6/1995 |
| JP | 8-237207 | A | 9/1996 |
| JP | 2000-183983 | A | 6/2000 |
| JP | 2001-7684 | A | 1/2002 |
| JP | 2002-51093 | A | 2/2002 |

* cited by examiner

*Primary Examiner*—Khai Tran
(74) *Attorney, Agent, or Firm*—Birch, Stewart, Kolasch & Birch, LLP

(57) ABSTRACT

A carrier detection circuit of the present invention detects groups of pulses having a carrier frequency by using a detector, and integrates, by an integrator, a time in which the groups are detected, so as to generate a carrier detection level. Therefore, a transistor is only requested to have responsibility with respect to a frequency of a base band component, but not to the carrier frequency. This ensures a margin with respect to a response of the transistor, while allowing a feeble current to be used as charging and discharging currents for the capacitor. In this way, even if a capacitor in use has such a small capacity that the capacitor can be incorporated in an integrated circuit, the detection of the carrier is performed accurately. Meanwhile, by further providing a level change-over circuit, which increases an output of the detector relative to a reference integral value during a time in which the carrier is detected, it is possible to reduce malfunction caused by a light noise having swelling, in case an infrared ray remote control is used.

50 Claims, 36 Drawing Sheets

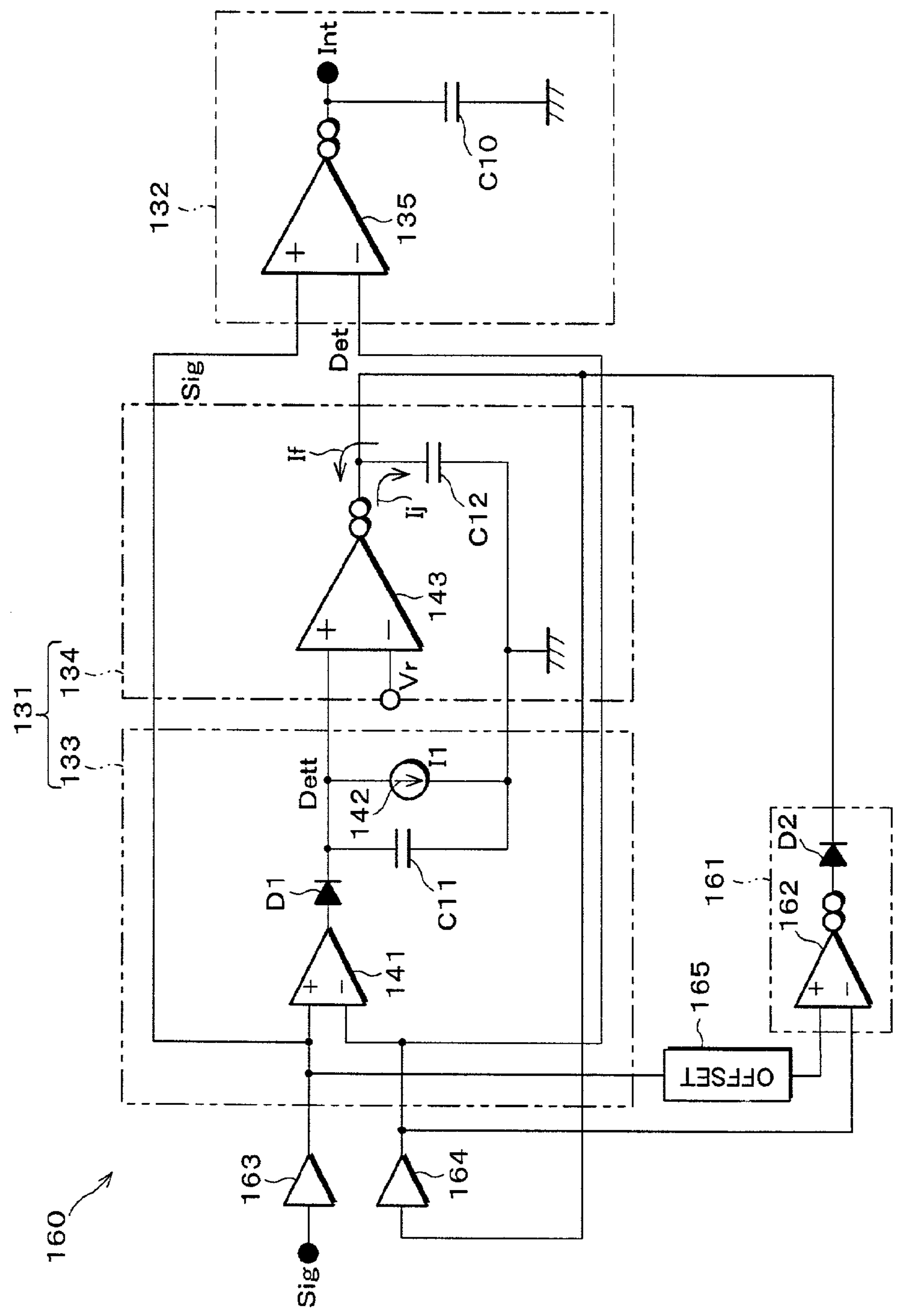
F I G . 8
Int
132
135
C10
Sig
Det
If
Ij
C12
143
Vr
131
134
133
Dett
142
I1
C11
D1
141
D2
161
162
165
OFFSET
163
164
160
Sig

F I G. 1 0
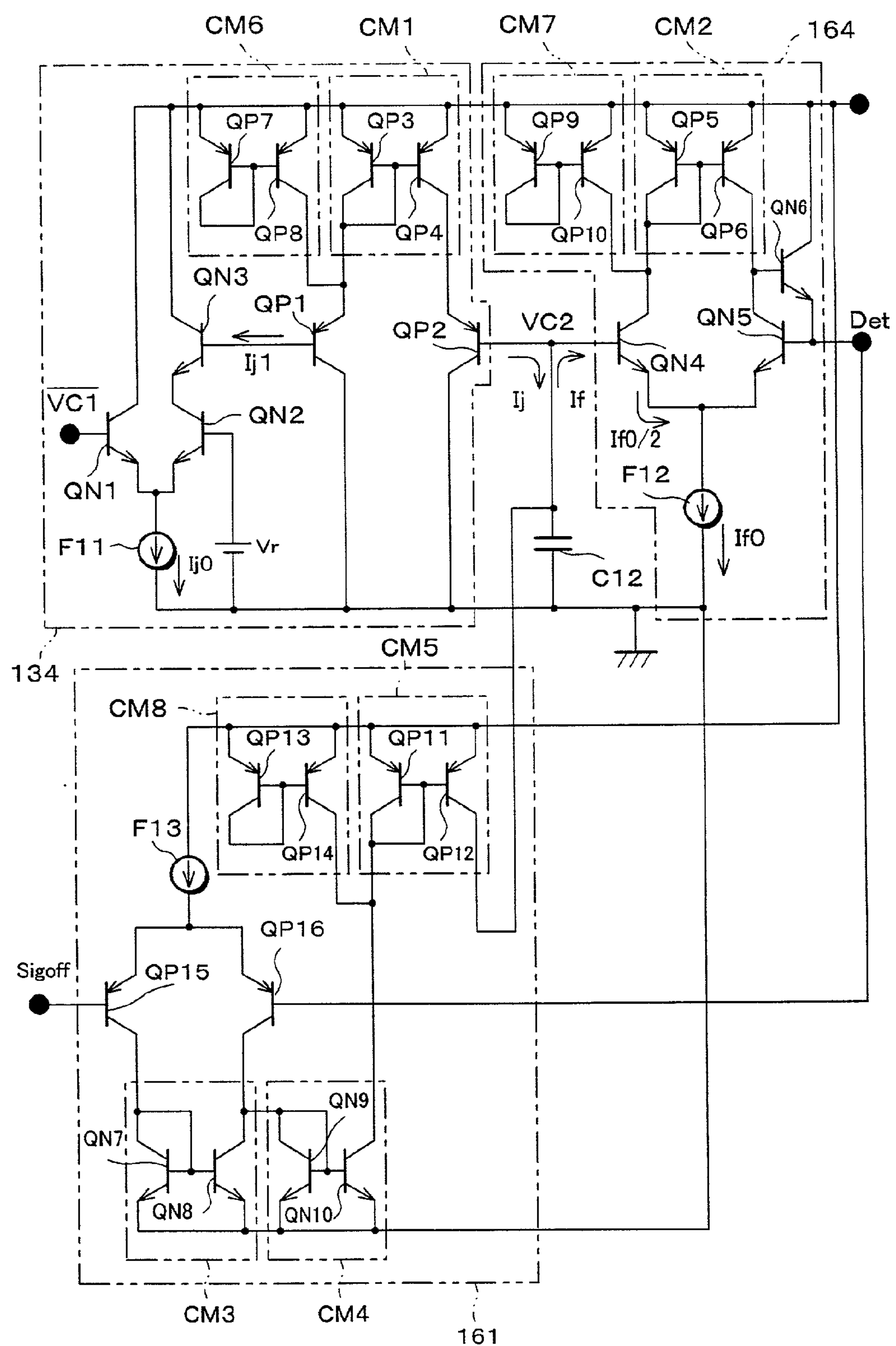

PARASITE PD 1
3
Vcc(Vdd)
GND
TRM1
TRM2
TRM3
TRM4
TRM5
Dout
fo TRIMMING
13
BPF
7
3rd AMP
6
2nd AMP
5
ABCC
12
HA
4
11
Sig
DETECTION
8
Sig
Det
INTEGRATION
9
Int
10
THRESHOLD LEVEL
Iin
2

FIG. 15 (a)
BACKGROUND ART
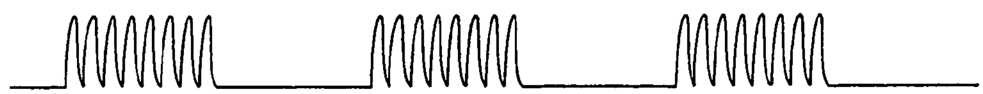
FIG. 15 (b)
BACKGROUND ART
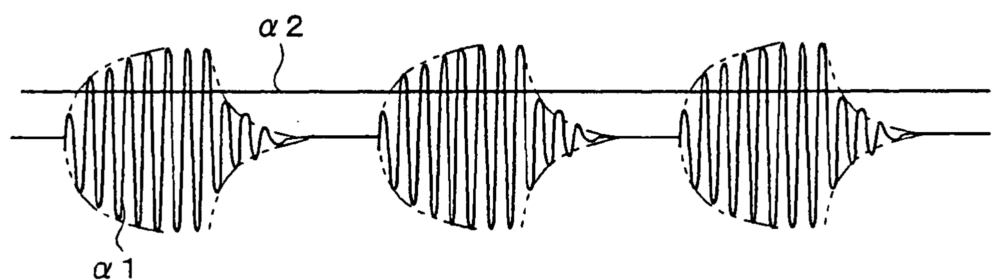
FIG. 15 (c)
BACKGROUND ART
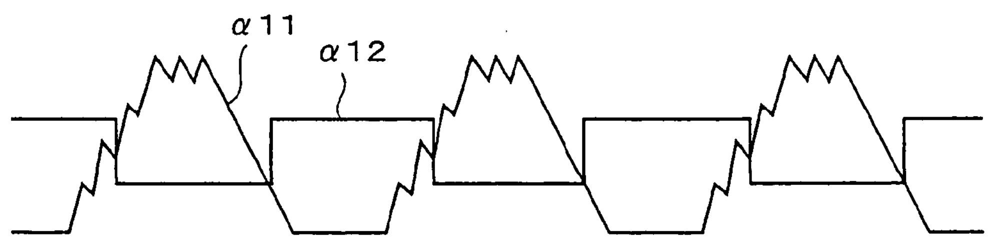
FIG. 15 (d)
BACKGROUND ART FIG. 21 (a)
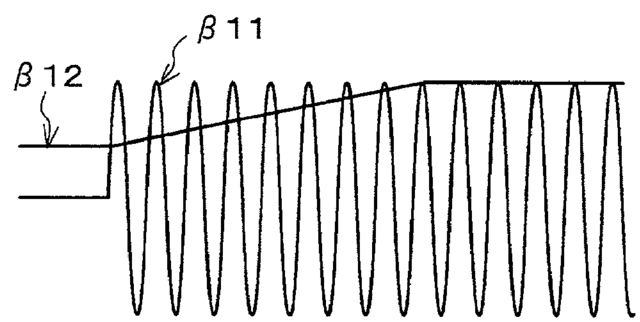
FIG. 21 (b)
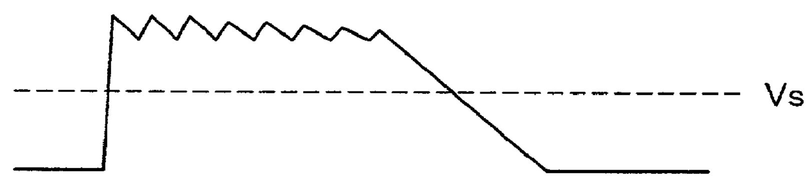
FIG. 21 (c)
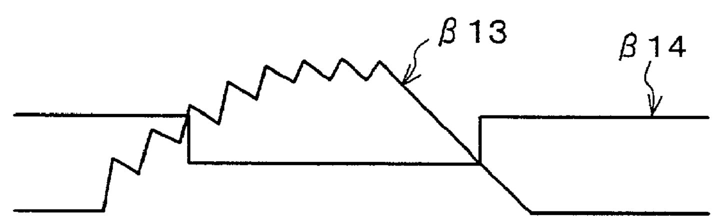
FIG. 21 (d)

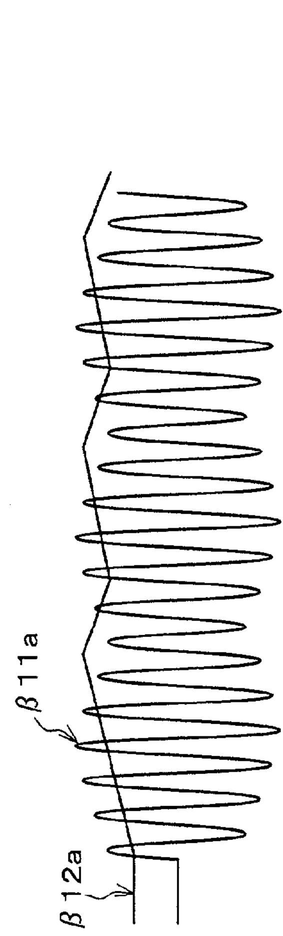
FIG. 22 (a)
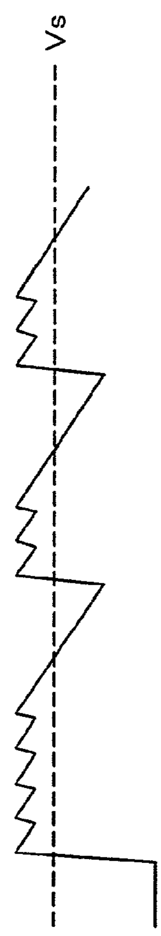
FIG. 22 (b)
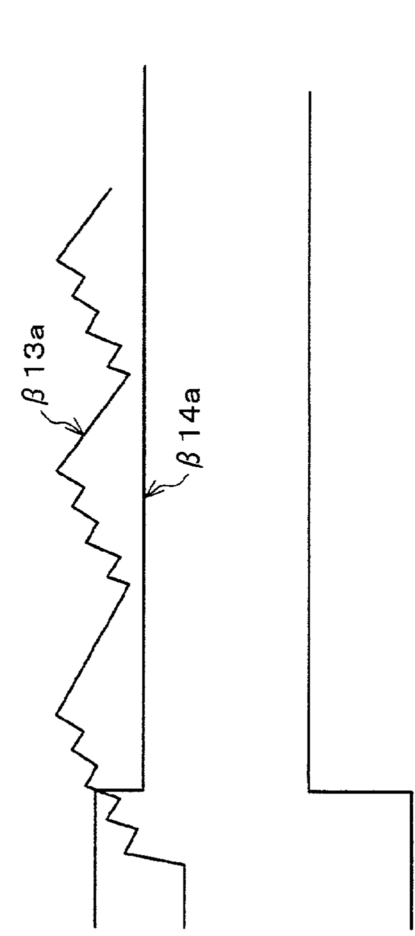
FIG. 22 (c)
FIG. 22 (d)

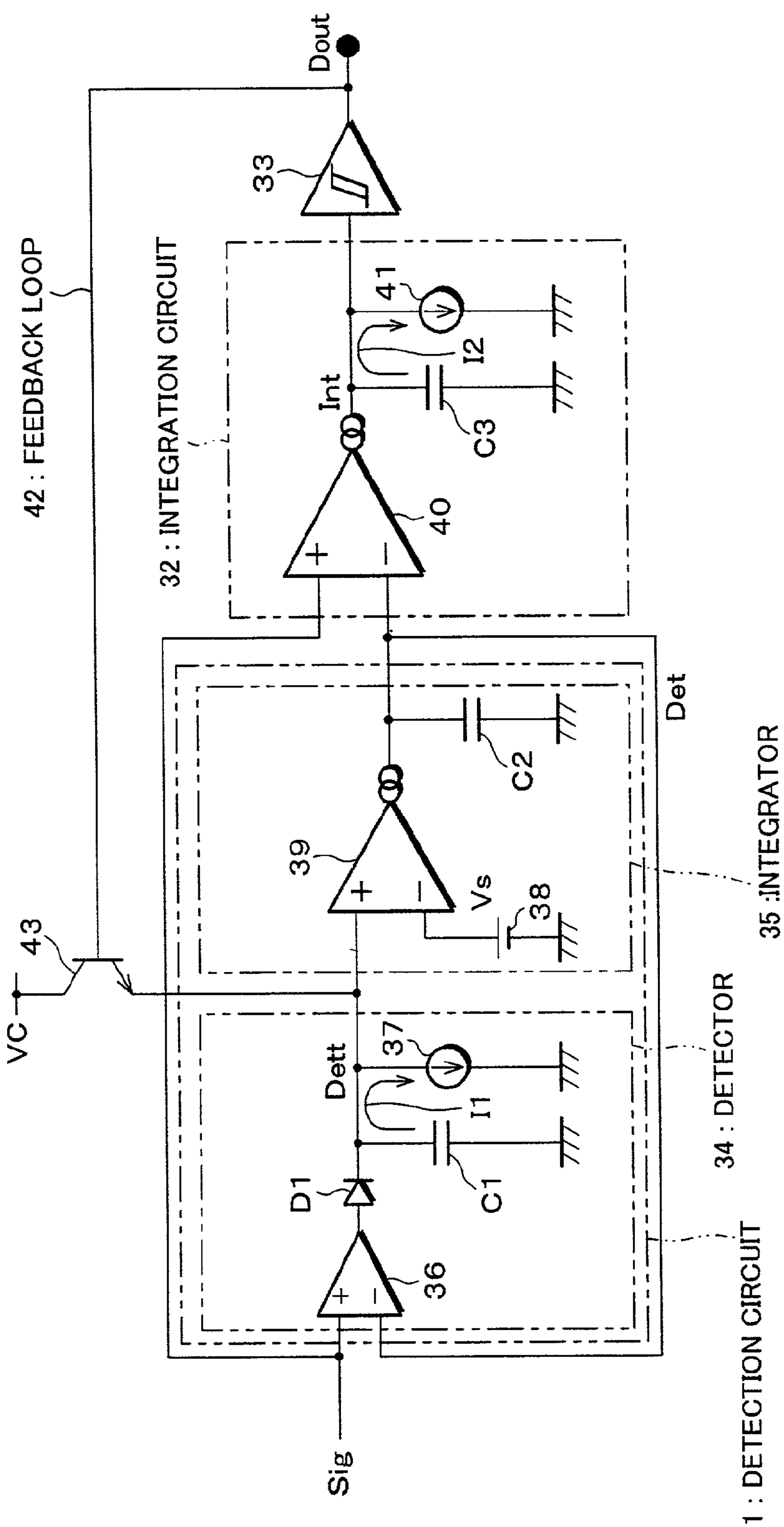
F I G. 2 4
30 : CARRIER DETECTION CIRCUIT
31 : DETECTION CIRCUIT
32 : INTEGRATION CIRCUIT
34 : DETECTOR
35 :INTEGRATOR
42 : FEEDBACK LOOP
Sig
36
D1
C1
Dett
I1
37
VC
43
39
Vs
38
C2
Det
40
Int
C3
I2
41
33
Dout γ1
γ2
γ3
γ4
Vs
VC
t1
t2
t3

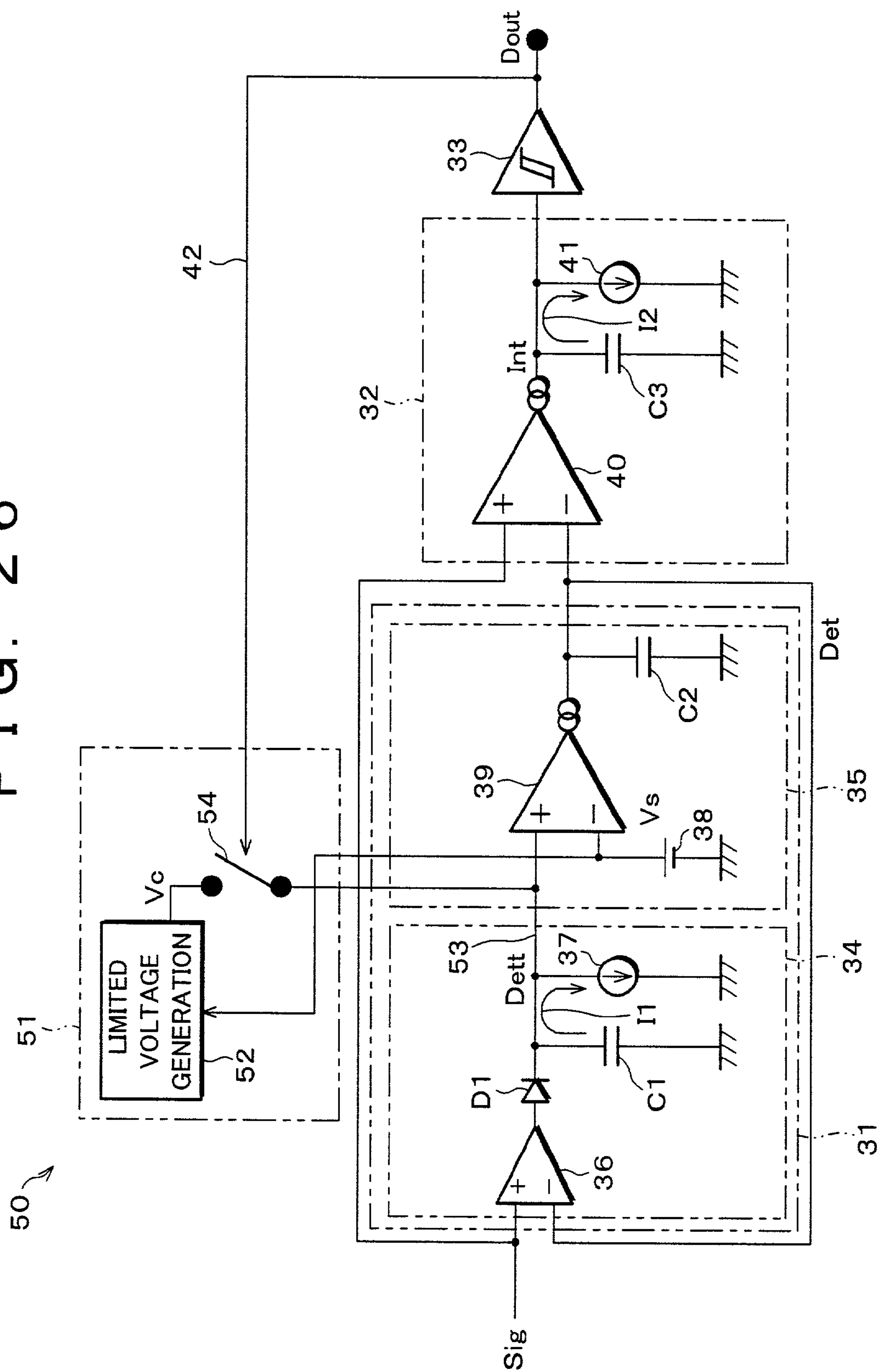
F I G. 26
50
51
LIMITED VOLTAGE GENERATION
52
Vc
54
42
Dout
33
32
41
I2
Int
C3
40
Det
C2
39
Vs
38
35
53
Dett
37
I1
34
D1
C1
36
31
Sig 51
Vcc
Dout
Q1
Q0
I01
55
Vs
R1
Q2
Q4
Q6
Q5
Q7
Q3
D10
Q8
Q9
Q10
56
Deta
Dett

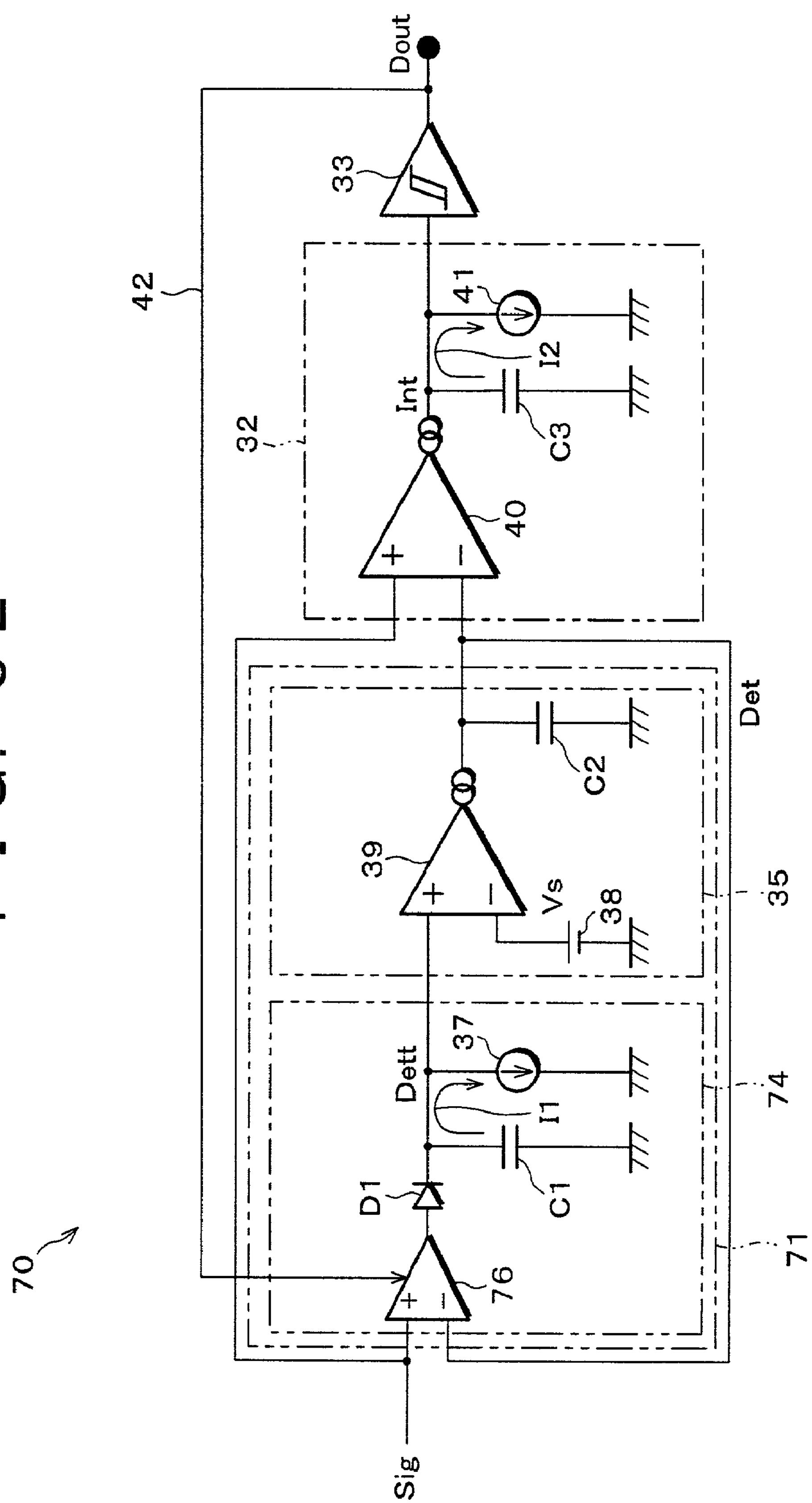
F I G. 3 2
70
Sig
Dout
42
33
32
40
Int
41
I2
C3
39
Vs
38
C2
35
Det
D1
Dett
37
I1
C1
74
76
71

76
72
73
Vcc
Dout
Q27
Q28
Q25
Q26
I04
79
Vref
78
D1
Q22
Q24
Q23
Q21
I03
R21
77
2×I03
Det
Sig

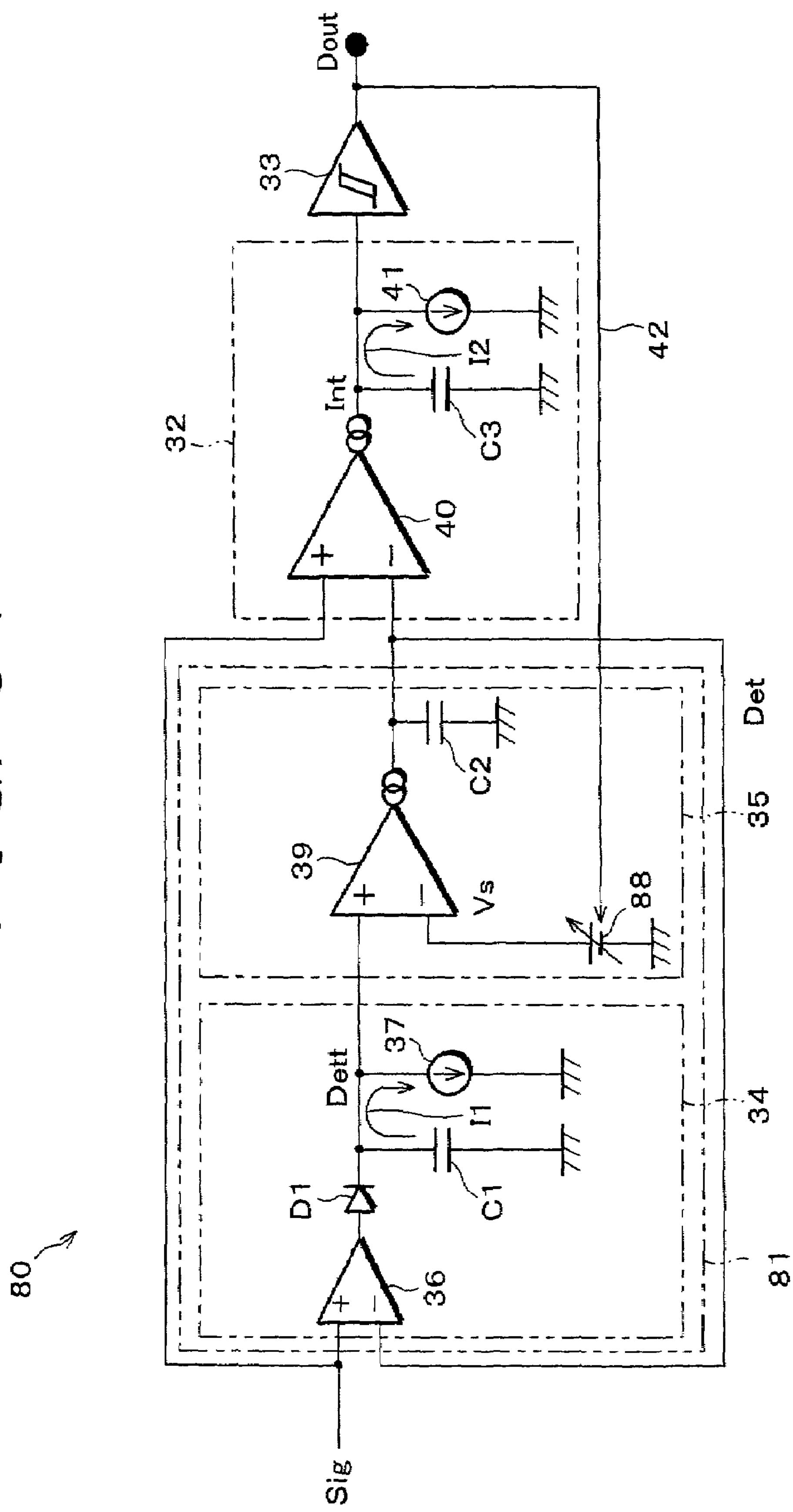
F I G. 3 4
80
Sig
36
D1
C1
Dett
I1
37
34
81
39
Vs
88
35
C2
Det
40
32
Int
C3
I2
41
42
33
Dout Vcc
83
84
82
88
Q31
Q32
Q33
Q34
Q35
Q36
Q37
Q38
Q39
Q40
Q41
Q42
Q43
R31
R32
R33
R34
IO5
IO6
87
89
86
Vref
Dout
Vs
X1
X10

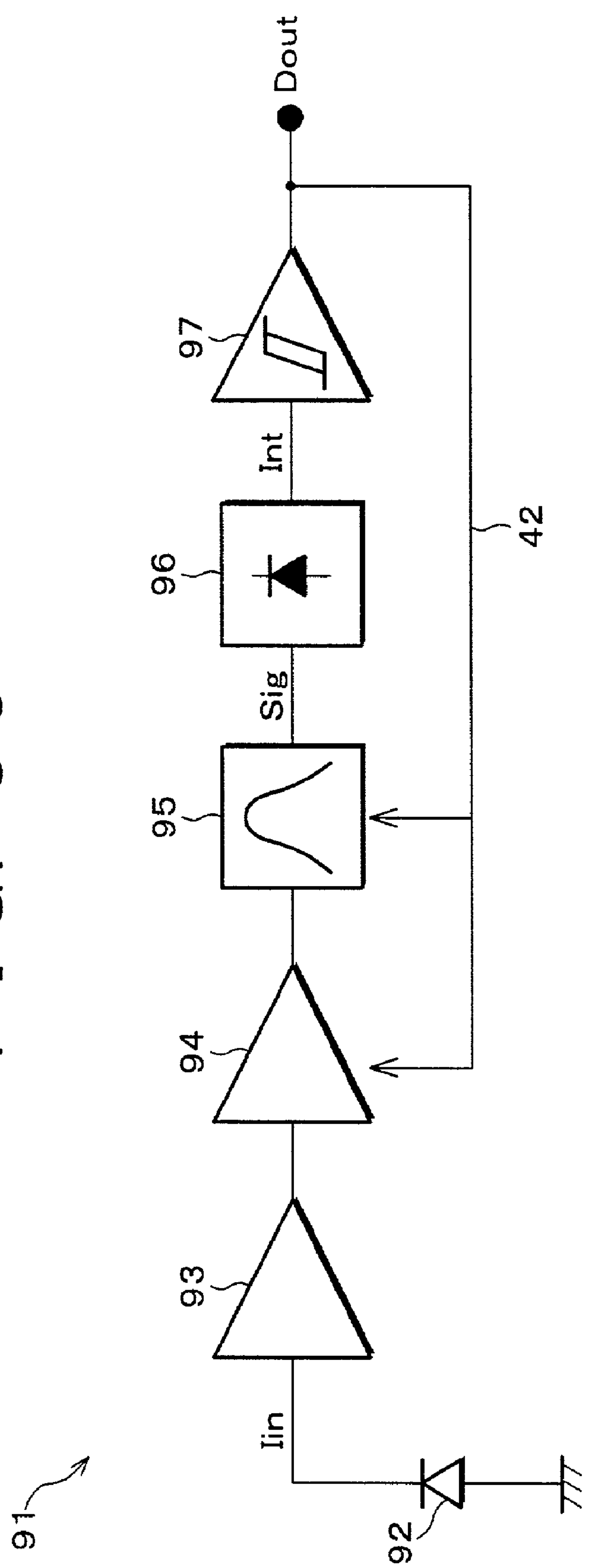
F I G . 3 6
Dout
97
Int
96
42
Sig
95
94
93
Iin
91
92

CARRIER DETECTION CIRCUIT AND INFRARED RAY REMOTE CONTROL RECEIVER

FIELD OF THE INVENTION

The present invention relates to a carrier detection circuit that is suitably employed as a demodulator for a signal having a carrier for apparatuses such as an infrared ray remote control, and to an infrared ray remote control receiver.

BACKGROUND OF THE INVENTION

Shown in FIG. 18 is a block diagram illustrating a constitutional example of a receiver 1 of an infrared ray remote control. In the receiver 1, an infrared ray signal is converted into a light current signal Iin shown in FIG. 15(*a*), by a photodiode 2, so that current-voltage conversion of the light current signal Iin is carried out by an amplifier 203. Then, the light current signal Iin is amplified by an amplifier 204, and is inputted into a band pass filter 7. In the band pass filter 7, a carrier frequent component is detected, as indicated by a reference numeral α1 in FIG. 15(*b*). Further, as indicated by a reference numeral α11 in FIG. 15(*c*), the detection circuit 6 detects a transmission code component having a base band frequency out of the carrier frequency component. A resultant of the detection (detection output) is compared with a predetermined threshold level, which is indicated by a reference numeral α12, by an output circuit 10. The comparison judges whether or not the carrier exists (in other words, judeged are in which part of the signal the carrier is included in, and in which part it is not), so as to demodurate the code signal in digital. The code signal in digital is outputted as an output signal Dout (see FIG. 15(*d*)) from the output circuit 10. The output circuit 10, which is made of the detection circuit 8 and a hysteresis comparator, configures a carrier detection circuit.

Shown in FIG. 14 is a block diagram illustrating a concrete constitutional example of the receiver 1. The receiver 1 converts a transmission code signal of an infrared ray into the light current signal Iin (see FIG. 15(*a*)) by a externally-attached photodiode 2, so that the light current signal Iin is received by a receiving chip 3, which is so reduced in size that the chip 3 can be applied in an integrated circuit. The receiver chip 3 demodulates the output signal Dout (see FIG. 15(*d*)) so as to output the output signal Dout to an apparatus such as a microcomputer for controlling electronic apparatuses. The infrared signal is an ASK signal that has been demodulated in accordance with a predetermined carrier having a frequency of about 30 to 60 kHz.

In the receiving chip 3, the light current signal Iin is amplified subsequently by a first amplifier (HA) 4, a second amplifier (2nd AMP) 5, and a third amplifier (3rd AMP) 6, and then is transmitted to a band pass filter (BPF) 7. The band bass filter 7, which is arranged to be suitable for a frequency of a carrier, detects a carrier frequency component (indicated by a reference numeral α1 in FIG. 15(*b*)). Then, the carrier frequency component is detected in accordance with a carrier detection level Det (indicated by a reference numeral α2 in FIG. 15(*b*)) (which will be explained later), by a detection circuit 8 of the next stage. Further, a time in which the carrier exists is integrated (indicated by a reference numeral α11 in FIG. 15(*c*)) by an integration circuit 9. A resultant of the integration, which is an integral output Int, is compared with a predetermined threshold level (indicated by a reference numeral α12 in FIG. 15(*c*)) by a hysteresis comparator 10. As a result of the comparison, it is judged whether or not the carrier exists. A resultant of the judgement is outputted as the output signal Dout (see FIG. 15(*d*)) in digital (that is, as a digital output).

An output from the first amplifier 4 is sent to a low pass filter 11, which detects a direct current level from a fluorescent lamp or sunlight. The second amplifier 5 of the next stage amplifies a signal that is a resultant of subtraction of the direct current form the output of the first amplifier 4. This allows to avoid the effect caused by the fluorescent lamp or the sunlight. Moreover, an ABCC circuit 12 is provided in association with the first amplifier 4. The ABCC circuit 12 controls a direct current bias of the first amplifier 4 in accordance with an output of the low pass filter 11. Furthermore, an <u>fo</u> trimming circuit 13 is provided in association with the band pass filter 7. The <u>fo</u> trimming circuit 13 trims a zener diode (not shown) provided between terminals TRM 1 to TRM 5 (not shown), which are extended from junctions of voltage dividing resistors, thereby adjusting a center frequency <u>fo</u> of the band pass filter 7. Configured with the detection circuit 8 and the integration circuit 9 is a carrier detection circuit.

Shown in FIG. 16 is a diagram of an equivalent circuit of a typical conventional carrier detection circuit 20. The carrier detection circuit 20 is provided with a detection circuit 21, an integration circuit 22 and a hysteresis comparator (not shown). The detection circuit 21 and the integration circuit 22 are respectively in correspondence with the detection circuit 8 and integration circuit 9, previously discussed. The detection circuit 21 decides the carrier detection level Det in accordance with whether or not the carrier exists, by charging a current Ij in a capacitor C1 or alternatively discharging <u>If</u> from the capacitor C1, by using an amplifier 23 of a current outputting type. (Note that, the abbreviation "C1" may alternatively mean a capacity of the capacitor C1.) In FIG. 17, FIG. 15(*b*) is enlarged and illustrated. In short, the detection circuit 21 compares (a) an output Sig from the band pass filter 6, which is shown by the reference numeral α1 with (b) the carrier detection level Det indicated by the reference numeral α2. When the output Sig is greater than the carrier detection level Det, the capacitor C1 is charged with current Ij, while the current <u>If</u> is discharged from the capacitor C1 if the output Sig is smaller than the carrier detection level Det. The period for charging is a sum of periods of time indicated by a reference numeral ton in FIG. 17, while that for discharging is a sum of periods of time indicated by a reference numeral toff in FIG. 17. Therefore, the detection circuit 21 creates the carrier detection level Det in which the following condition is satisfied:

$$\frac{1}{C1}\int_{o}^{tonsum} Ij = \frac{1}{C1}\int_{0}^{toffsum} If \quad \left(tonsum = \sum \mathrm{ton},\ toffsum = \sum toff\right). \qquad \text{Equation (1)}$$

As described in FIG. 17, the times ton and toff are a charging time and a discharging time for the capacitor C1, respectively. Therefore, the carrier detection level Det, that is, charging voltage of the capacitor C1 varies the times ton and toff. For example, an increase in the carrier detection level Det causes the charging time ton to shorten, while lengthening the discharging time toff. Accordingly, the carrier detection level Det is equal to a level that satisfies the equation 1, in other words, a level in which a value obtained by integrating the charging current Ij with the charging time ton is equal to a value found by performing the integration of the discharging current If with the discharging time toff.

The integral circuit 22, provided with a current output amplifier 24 and a capacitor C2, compares the output Sig of the band pass filter 6 with the carrier detection level Det, and outputs a current to the capacitor C2 in accordance with the result of the comparison, thereby integrating the time during which the carrier exists, so as to be outputted as the integral output Int.

The carrier detection level Det is increased as steady noises, such as a noise from the fluorescent lamp, are inputted. It is necessary to properly set the carrier detection level Det, in order to reduce a malfunction due to the noises. For example, in case a transmission cord is transmitted with some dormant period in-between, it is likely that the noises are detected in the transmission code that is transmitted during such a dormant time when the carrier detection level Det is lowered during the dormant period. Because of this, the capacitor C1 must have a time constant for discharging (hereinafter, it may be denoted as a discharging time constant) to be longer than the dormant period, generally 100 msec or longer, considering a single transmission code of the infrared ray remote control is about 50 msec long. On the other hand, integration of chips has been demanded for a sake of a lower cost. Thus, it is desirable to use a capacity value high enough to attain integration of about 100 pF or less.

However, in the above conventional art, it is necessary to have a circuit having high impedance in which a very feeble current is used, in order to attain a 100 msec or more time constant for discharging, where a capacitor C1 is of 100 pF or less. For example, where the capacity value is at 100 pF, and the carrier detection level Det is varied within 100 mV or less in a period of time of 100 msec, a current I for charging and discharging is determined as follows:

$$\begin{aligned} I &= (C \times V)/T \\ &= (100(pF) \times 100(mV))/100(mse) \\ &= 100(pA). \end{aligned} \quad \text{Equation (2)}$$

As shown by the Equation (2), the current I will be a very feeble current.

Such a feeble current is incapable of operating the circuit normally, due to effects by responses of transistors, unevenness per unit of the transistor in terms of properties, a parasitic (incidental) light current by light strayed from the fluorescent lamp, an incandescent lamp and the sun light, for example. In short, the high impedance of the circuit, which requires a faster speed for responding to the noises, resultants in inaccurate detection of peaks of the noises, so that the carrier detection level Det cannot be obtained from the peaks of the noises. Because of this, such a problem is posed that the carrier is not accurately detected. Accordingly, it is difficult for the capacitor C1 to be integrated in the receiving chip 3 and function normally, when the carrier detection Det is determined in accordance with the equation (1).

SUMMARY OF THE INVENTION

The present invention has an object to provide a carrier detection circuit capable of performing accurate detection of a carrier with high responsibility, even when used is a capacitor having a capacity so small that the capacitor can be opted for integration.

A carrier detection circuit of the present invention (a) for creating a carrier detection level in accordance with an received signal, and (b) for detecting whether or not a carrier exists in the received signal in accordance with the carrier detection level, is provided with (a) a detector for detecting groups of pulses, to be detected, having a carrier frequency, and (b) an integrator for carrying out integration of a time in which the groups of pulses are detected by the detector, and for outputting a resultant of the integration as the carrier detection level.

With the above arrangement, the detector responses to a noise that is superposed on the carrier, and the carrier detection level, which is created by the integrator, is increased. On the other hand, the transistor, is provided in the integrator for performing the charge and discharge of the capacitor, which outputs the carrier detection level, in accordance with the presence and absence of the carrier. The transistor is only requested to be sensitive to a frequency of a base band composition, but not to be sensitive to the carrier frequency, so that the a margin for the response of the transistor is ensured and the charging and discharging currents of the capacitor can be feeble.

Therefore, it is possible to detect whether or not the carrier exists with high responsibility, even when the capacity of the capacitor is so small that the capacitor can be integrated.

A carrier detection circuit of the present invention for generating a carrier detection level in accordance with an received signal so as to detect, in accordance with the carrier detection level, whether or not a carrier exists in the received signal, is provided with (a) a detector for detecting pulses, to be detected, having a carrier frequency, (b) an integrator for performing integration of a time in which an output of the detector is higher than a predetermined reference integral value, so as to detect groups of the pulses having the carrier frequency, and for outputting a resultant of the integration as the carrier detection level, and (c) a level change-over circuit for increasing the output of the detector relative to the reference integral value, during a time in which a carrier exists.

With the arrangement, the detector responses to a noise superposed on the carrier, thereby increasing the carrier detection level that is created by the integrator. On the other hand, regarding the integrator, the transistor, which charges or discharges the capacitor for integration that outputs the carrier detection level in accordance with whether or not the carrier exist, is not required to have responsibility with respect to the carrier frequency, but that with respect to the frequency of the base band component. This ensures a margin for the response of the transistor, allowing the capacitor to have feeble charging and discharging currents.

In this way, further provided with the level change-over circuit is the carrier detection circuit, which can detect, with the high responsibility, whether or not the carrier exists, even when the capacitor has such a small capacity that the capacitor is suitable to be used for the integration of the chips. This increases the output of the integrator relative to the reference integral value of the integrator, as discussed above for example, during the time in which the carrier is detected.

Therefore, even when the pulse level is lowered due to swelling having a frequency lower than the carrier frequency, the output from the detector, which indicates the detection level of pulse group having the carrier frequency, is in a state that the carrier is continuously detected. This suppress the reduction of the carrier detection level due to the swelling, thereby ensuring the pulse level is below or equal to the carrier detection level, after the pulse level is restored from a level lowered by the swelling. In this way, false detection of carrier is prevented.

In this manner, the base band component and the noise component are separated, thereby lowing malfunction caused by the noises having the swelling. As a result, it is possible to detect the base band component accurately.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a view showing a configuration of a carrier detection circuit of a third embodiment of the present invention.

FIG. 10 is an electric circuit diagram showing a concrete circuit example, including a rapid charging circuit and its relative integration circuit and buffer, of the carrier detection circuit shown in FIG. 8.

FIGS. 15(*a*) to (*d*) are wave form charts of each main section of the receiver shown in FIG. 14.

FIG. 17 is an enlarged wave form chart of FIG. 15(*b*).

FIGS. 21(*a*) to 21(*d*) are wave form charts showing wave forms of each main section of the carrier detection circuit, when a continuous light noise is inputted.

FIGS. 22(*a*) to 22(*d*) are wave form charts illustrating wave forms of each main section of the carrier detection, when a light noise having swelling is inputted.

FIG. 24 is a block diagram showing an electric configuration of a carrier detection circuit of a fifth embodiment of the present invention.

FIG. 26 is a block diagram illustrating an electric configuration of a carrier detection circuit of a sixth embodiment of the present invention.

FIG. 32 is a block diagram showing an electric configuration of a carrier detection circuit of an eighth embodiment of the present invention.

FIG. 34 is a block diagram illustrating an electric configuration of a carrier detection circuit of a ninth embodiment of the present invention.

FIG. 36 is a block diagram illustrating an electric configuration of an infrared ray remote control receiver in accordance with a tenth embodiment of the present invention.

DESCRIPTION OF THE EMBODIMENTS

Described below is a first embodiment of the present invention, with reference to FIGS. 1 to 4.

Figure 1:
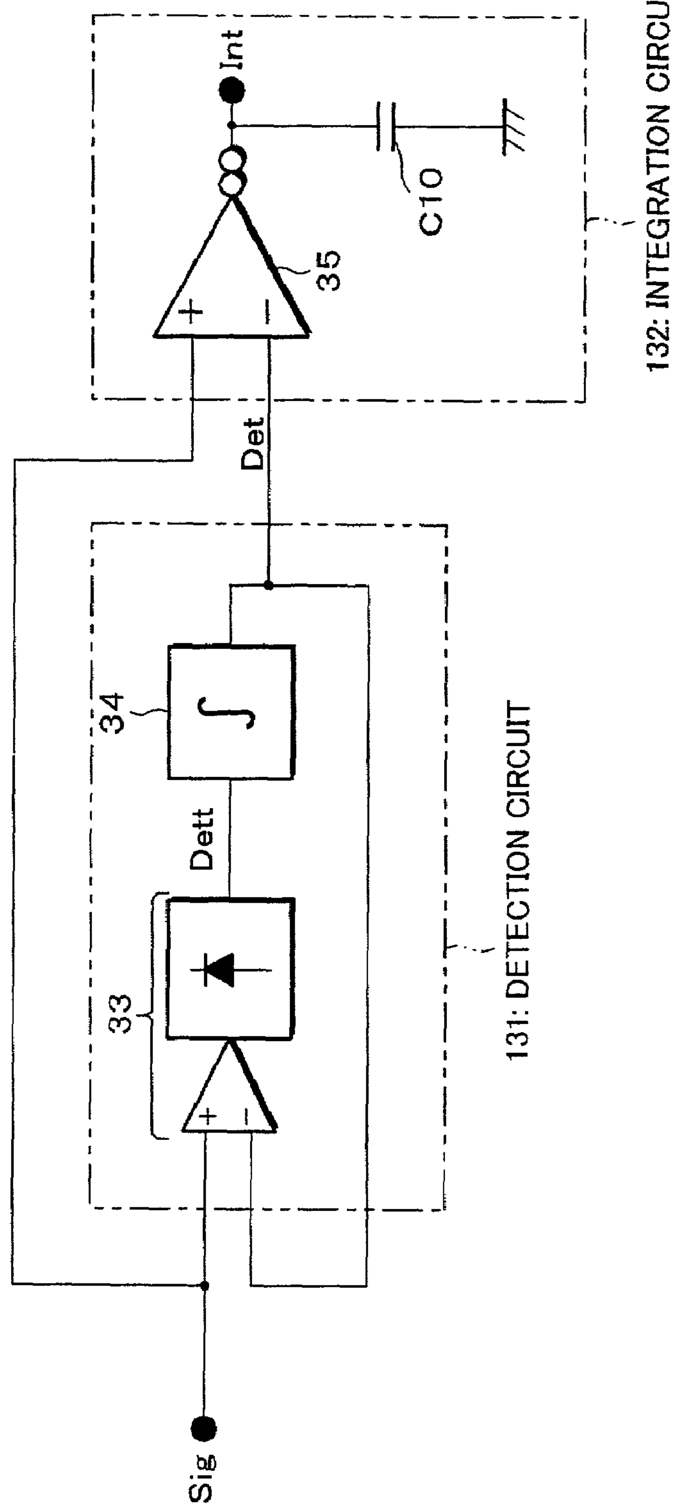
FIG. 1 is a view showing a schematic configuration of a carrier detection circuit of a first embodiment of the present invention.
Figure 14:
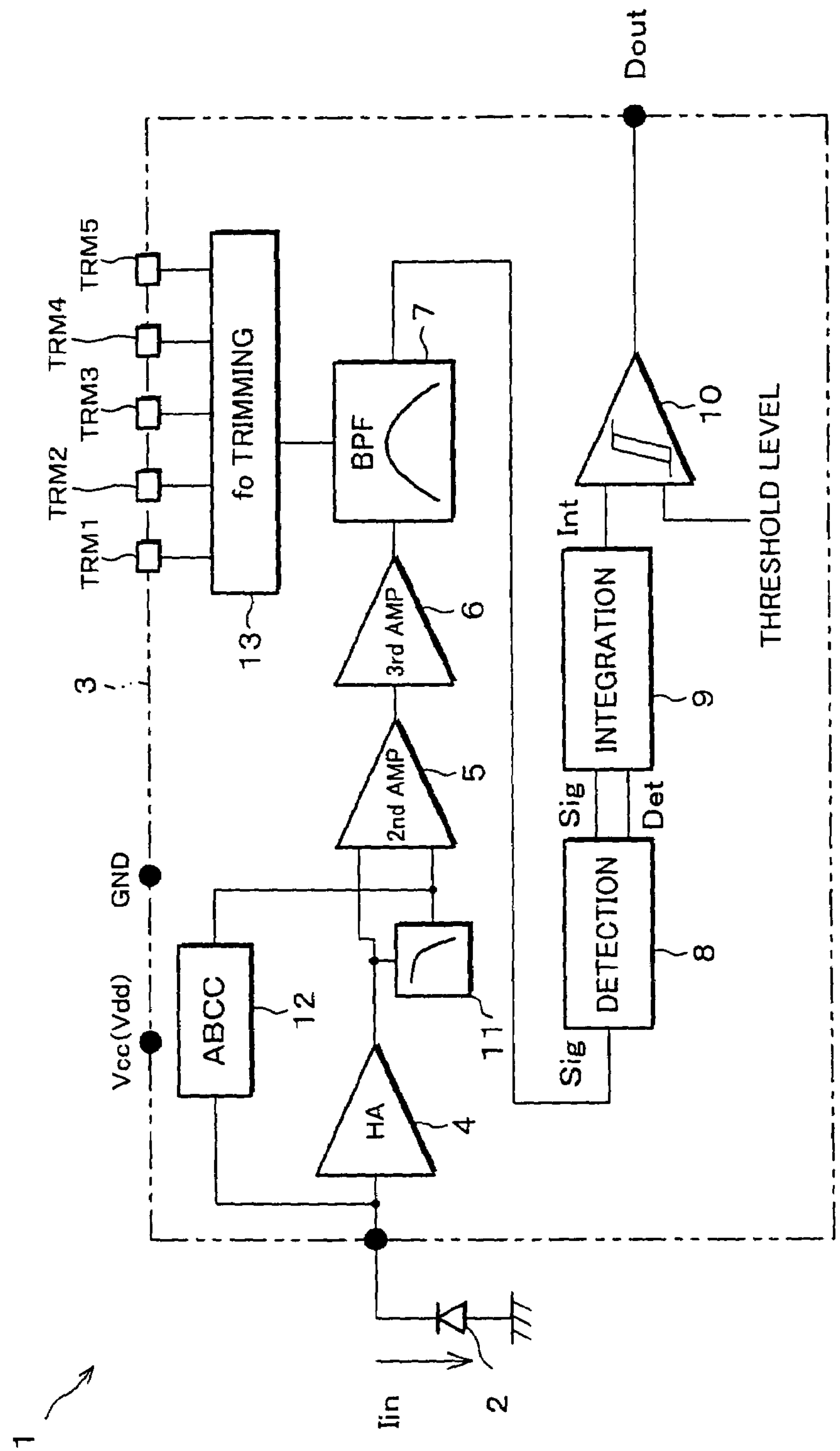
FIG. 14 is a block diagram of a configuration example of an infrared ray remote control receiver.
Figure 16:
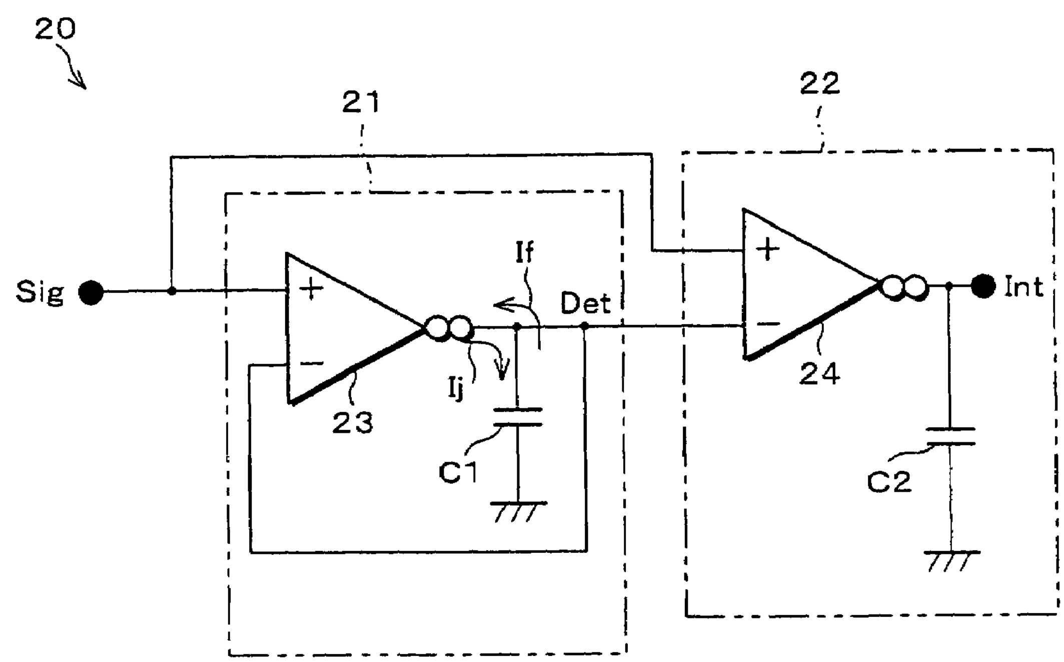
FIG. 16 is an equivalent circuit diagram of a typical conventional carrier detection circuit.
Figure 1:
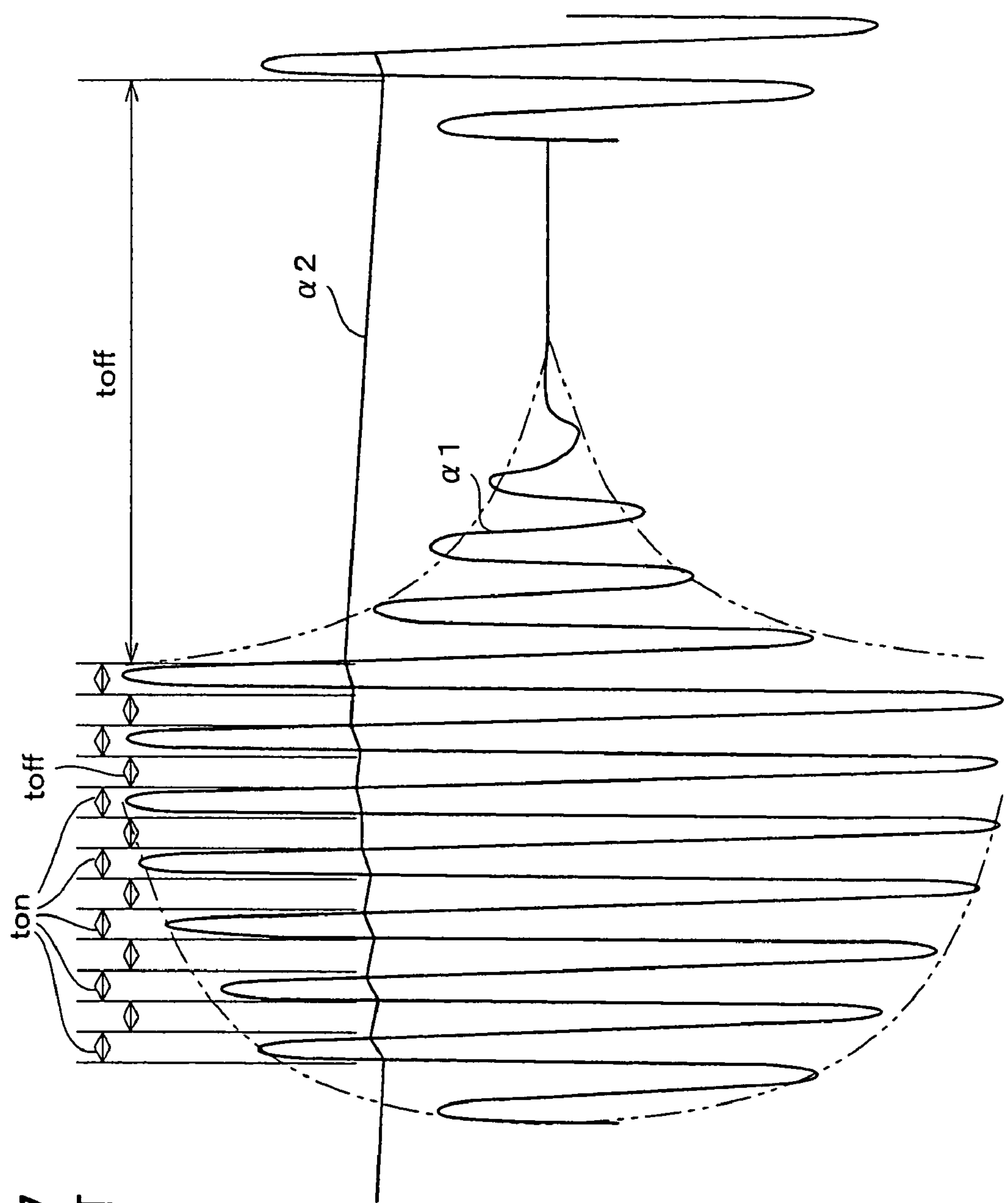

FIG. 1 is a view showing a schematic constitution of a carrier detection circuit 130 of the first embodiment of the present invention. The carrier detection circuit 130 is provided with a detection circuit 131, an integration circuit 132, and a hysteresis comparator (not shown). The detection circuit 131 and the integration circuit 132 respectively correspond to the detection circuit 8 and the integration circuit 9 in FIG. 14. The detection circuit 131 creates a carrier detection level Det from an output Sig from a band pass filter 7, while the integration circuit 132 compares the output Sig with the carrier detection level Det, so that a resultant of the comparison is integrated. This procedure is identical to a conventional carrier detection circuit 20.

It is noteworthy in the present invention that the detection circuit 131 is provided to detect groups of pulses (pulse groups), which was supposed to be detected by a detector 133, having a carrier frequency, an integrator 134 carries out an integration of a time when the pulse groups exist, and an integral output is used as the carrier detection level Det. In short, the detector 133 is not used for directly creating the carrier detection level Det of a whole receiving system, but for producing the carrier detection level Det.

The integration circuit 132 is provided with an amplifier 135 of the current outputting type, and a capacitor C10. The integration circuit 132 compares the output Sig of the band pass filter 7 with the carrier detection level Det so as to output to the capacitor C10 a current in accordance with a resultant of the comparison, whereby the time in which the carrier exists, is integrated and outputted as the integral output Int.

Figure 2:
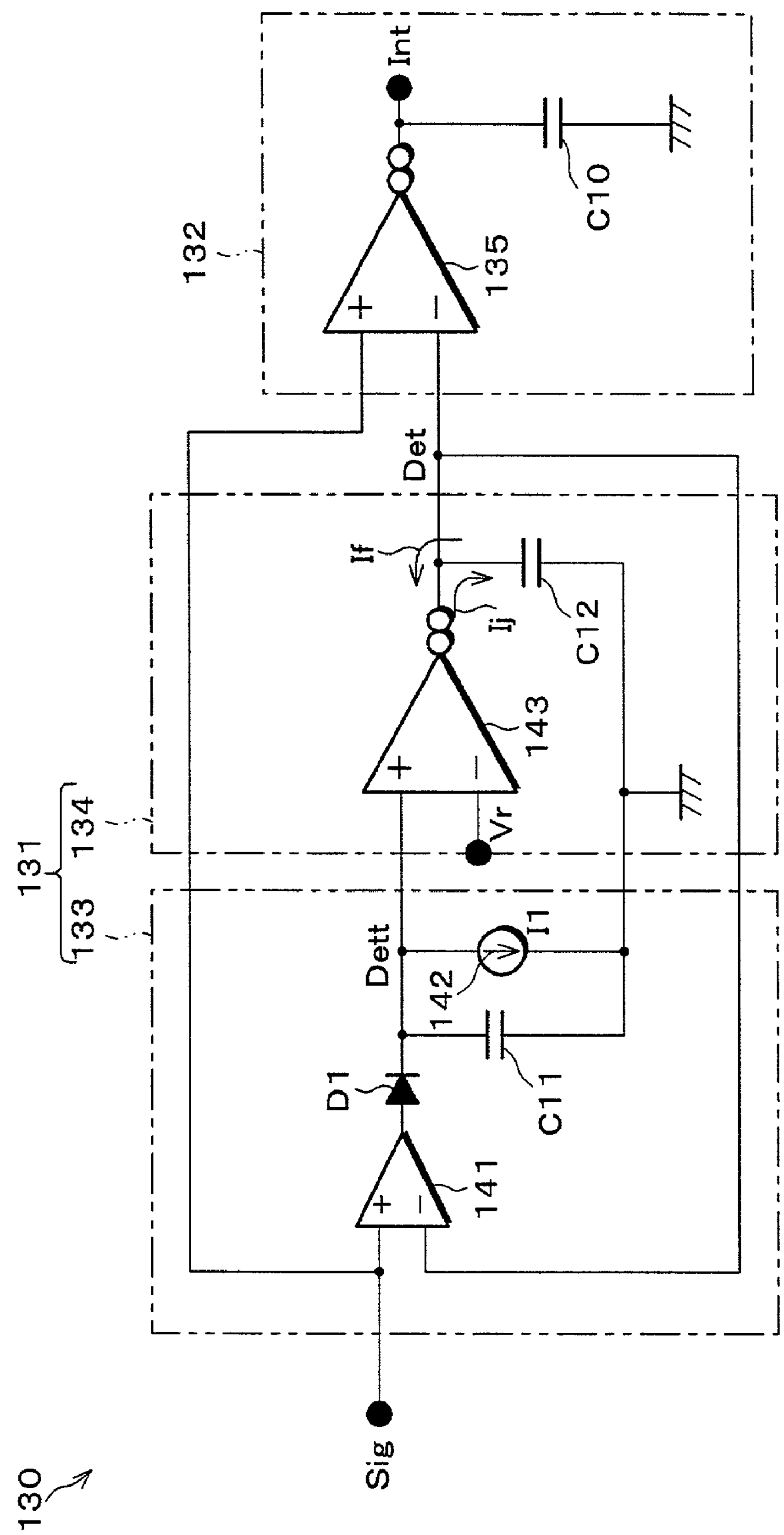
FIG. 2 is an equivalent circuit diagram of the carrier detection circuit of FIG. 1.

FIG. 2 is a diagram of an equivalent circuit of the carrier detection circuit 130. The detector 133, which detects the groups of pulses, to be detected, having the carrier frequency, is provided with a high-speed amplifier 141, a diode D1, a capacitor C11, and a constant current source 142. The high-speed amplifier 141 performs amplification of a difference between the output Sig and the carrier detection level Det at such a high speed that responding with respect to the carrier frequency is sufficiently carried out, and outputs a voltage. The diode D1 rectifies the output of the high-speed amplifier. The capacitor C11 is charged with the output voltage of the high-speed amplification 141 via the diode D1. The constant current source 142 discharges the capacitor C11 by a constant current Il outputted of the capacitor C1.

The integrator 134 is provided with an amplifier 143 and a capacitor C12. The amplifier 143 outputs a current that varies in accordance with a difference between a charging voltage of the capacitor C11 (that is, an output of the detector 133) and a predetermined reference voltage Vr. The capacitor C12 is charged with an output voltage of the amplifier 143, which is to be outputted as the carrier detection level Det by the capacitor C12.

Figure 3:
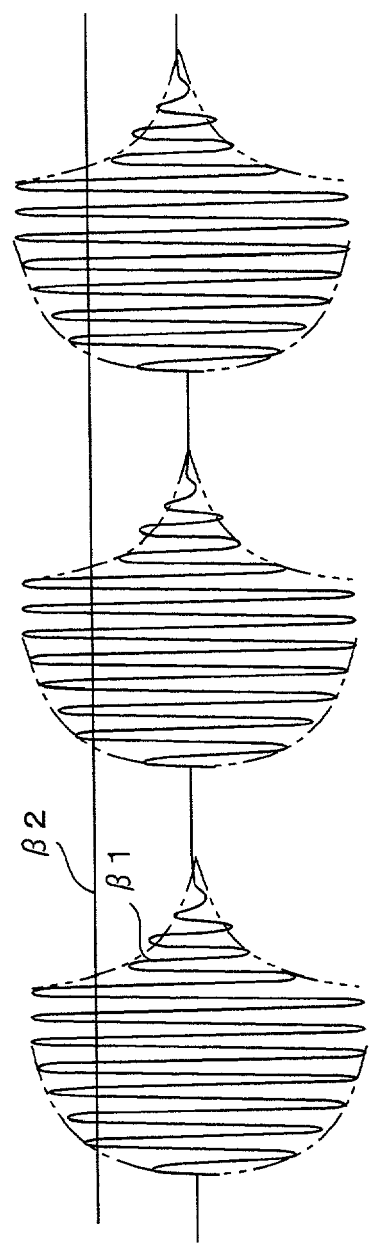
FIGS. 3(*a*) and 3(*b*) are wave form charts explaining an operation of the carrier detection circuit.
Figure 3:
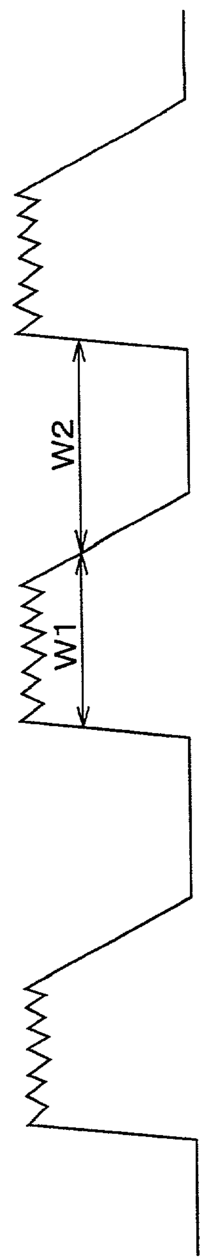

FIGS. 3(*a*) and 3(*b*) show wave form charts to explain an operation of the carrier detection circuit 130. As shown in FIG. 3(*a*), the high-speed amplifier 141 amplifies the difference between the output Sig of the band pass filter 7, which is indicated by the reference numeral β1, and the carrier detection level Det that is indicated by the reference numeral β2. FIG. 3(*b*) illustrates how the diode D1 works: the capacitor C11 is charged during a time W1 in which the pulse having the carrier frequency is detected, so that the output Dett is high, while the constant current source 142 discharges, so that the output Dett is reduced gradually to a zero level during a time W2 without a pulse detected. In this way, the time W1 is a time with the pulse groups, to be detected, having the carrier frequency, as discussed above. Meanwhile, the integrator 134 executes the integration of the time W1 so that the integral output is the carrier detection level Det.

Therefore, in the present invention, the carrier detection level Det is determined in accordance with the amplitude level of the pulse having the carrier frequencies or the pulse density. As explained in FIG. 4 in which FIG. 3(*a*) is enlarged, the time W1 is the charging time ton, the time W2 is the discharging time toff, the charging current is Ij, and the discharging current is If. The respective values are prepared so that the sum total of the respective values satisfies the following equation:

$$\frac{1}{C12}\int_{o}^{tonsum} Ij = \frac{1}{C12}\int_{0}^{toffsum} If \qquad \text{Equation (3)}$$

$$\left(tonsum = \sum \text{ton},\ toffsum = \sum toff\right).$$

Figure 4:
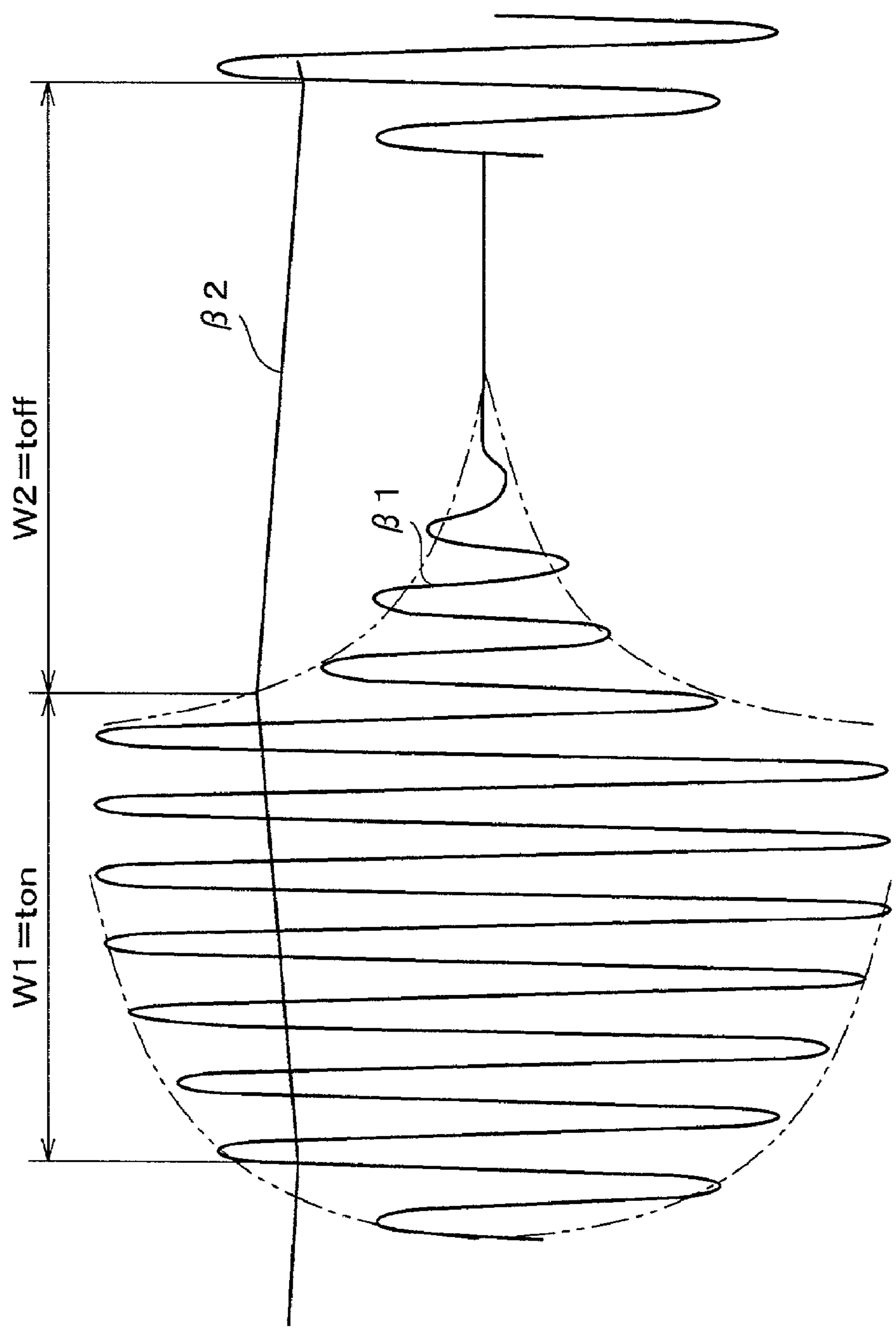
FIG. 4 is an enlarged wave form chart of FIG. 3(*a*).

Here, it is clearly explained by comparing the wave form in FIG. 17 and that in FIG. 4, the charging and discharging have been performed according to whether or not the pulse having the carrier frequency exceeds the carrier detection level Det, while the charging and discharging are performed for every pulse group in the present invention, regardless of whether or not the pulse exceeds the carrier detection level Det.

Because of this, even in a condition in which the carrier detection level Det comes closer to the upper limit of the signal amplitude, the carrier detection level Det can be maintained as it is, thereby ensuring a regular circuit operation. The condition, in which the carrier detection level Det approaching the upper limit of the signal amplitude, is for example, when the carriers are inputted continuously, but not in a regular way of the input of the signal. In this case, according to the equation (3), which is discussed with respect to the condition of the carrier detection level Det, the sum total of the times ton will be large. Thus, the detection circuit 131 will reduce the times ton, so as to satisfy the equation (3). Accordingly, the carrier detection level Det approaches to the upper limit of the signal, thereby reducing the time ton, then is balanced. In the case of the conventional method, on the contrary, continuous detection of carrier will eliminate the dormant period, but it is difficult for the conventional method to maintain the signal amplitude as it is, because the charging time tons and the discharging time toff are generated alternatively.

In this way, it is possible to dramatically reduce an error in the carrier detection level Det due to the error of the response of the transistor that constitutes the carrier detection circuit 130 or the error of the carrier detection circuit 130, itself. For example, the infrared ray remote control has a reference carrier frequency of about 40 kHz, while its frequency of group, that is, envelop frequency of the carrier is about 1 kHz, as being the frequency of a base band component of the code data to be modulated. Accordingly, it is possible to improve by not less than one figure a margin with respect to a section for creating the carrier detection level Det. In other words, in the present invention, the high-speed amplifier 141 responses to the carrier frequency, while the amplifier 143, which works in the same way as the amplifier 23 of a current-outputting type in the conventional carrier detection circuit 20, is only requested to have a responding speed for the base band component. In this way, the amplifier 143 can be used as a high impedance, which utilizes, as the currents Ij and If, a feeble current, such as the one of 100 pA order previously discussed, thereby having a time constant for a long period of discharging and a sufficiently high accuracy in the operation.

Note that, the conventional capacity C1 is about 0.1 μF and too large for the integration. On the contrary, the integration can be attained in the present invention, because the capacity C12 of the present invention is about 100 pF, while the capacity C11 is about 10 pF, thus having a capacity ratio (C11+C12):C1=1:1000, substantially. In this way, ensured is a high responsibility with respect to the noise, even if capacitors C11 and C12, which can be integrated, are used, thereby ensuring an accurate detection of the carriers. In addition, it is possible to employ a common and low-cost process in order to create the integrated circuit of the receiving chip 3.

Discussed below is a second embodiment of the present invention, with reference to FIGS. 5 to 7.

Figure 5:
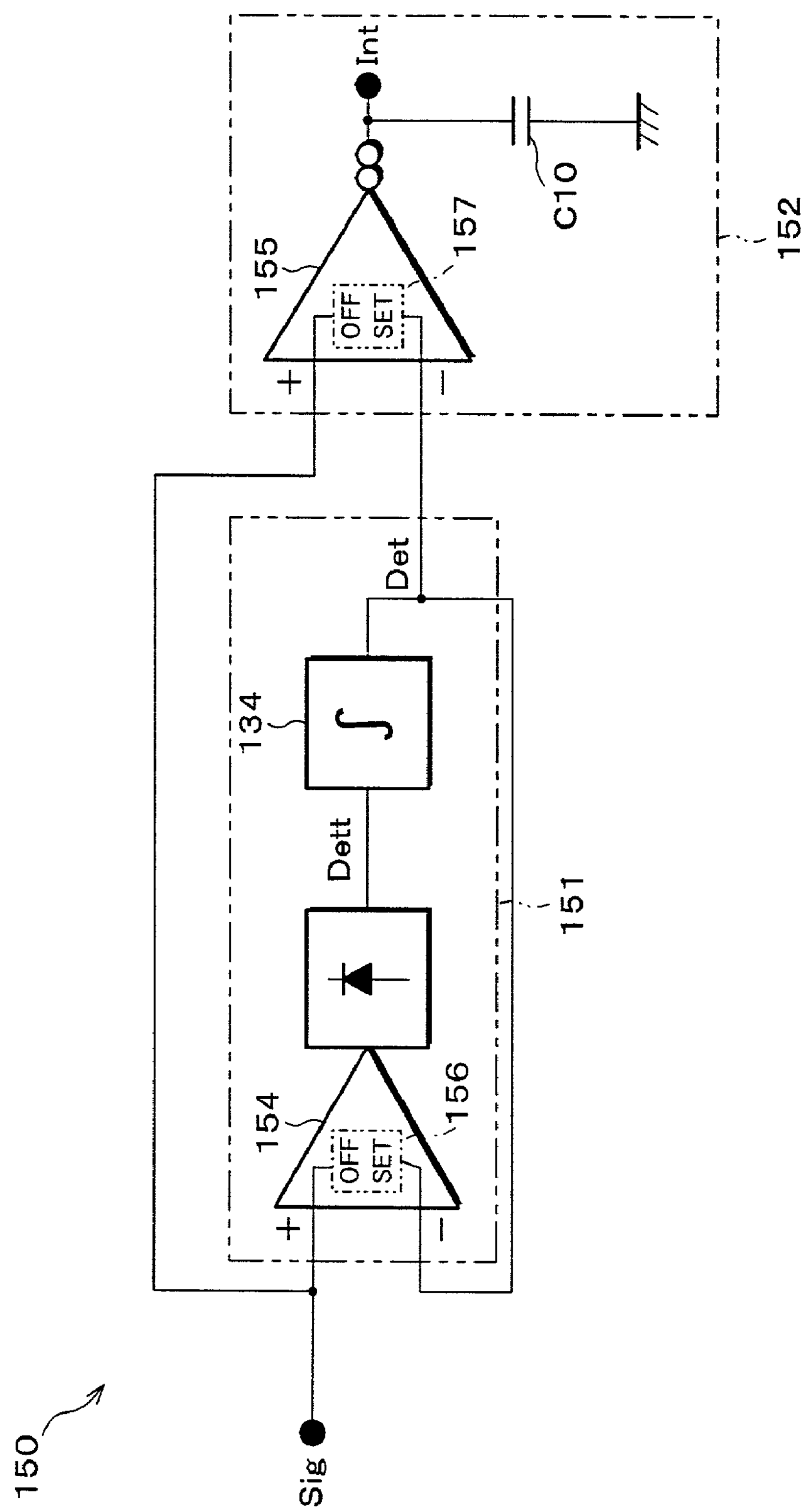
FIG. 5 is a view illustrating a carrier detection diagram of a second embodiment of the present invention.

In FIG. 5, described is a constitution of a carrier detection circuit 150 of the second embodiment of the present invention. The carrier detection circuit 150 has some similarities with the carrier detection circuit 130, thus, corresponding sections are labelled with the same reference numerals, and their explanation is omitted here. The carrier detection circuit 150 is provided with a detection circuit 151 having a high-speed amplifier 154, and an integration circuit 152 including an amplifier 155. Either of the high-speed amplifier 154 or the amplifier 155 has a built-in off-set circuit, indicated by reference numerals 156 and 157, respectively.

Figure 6:
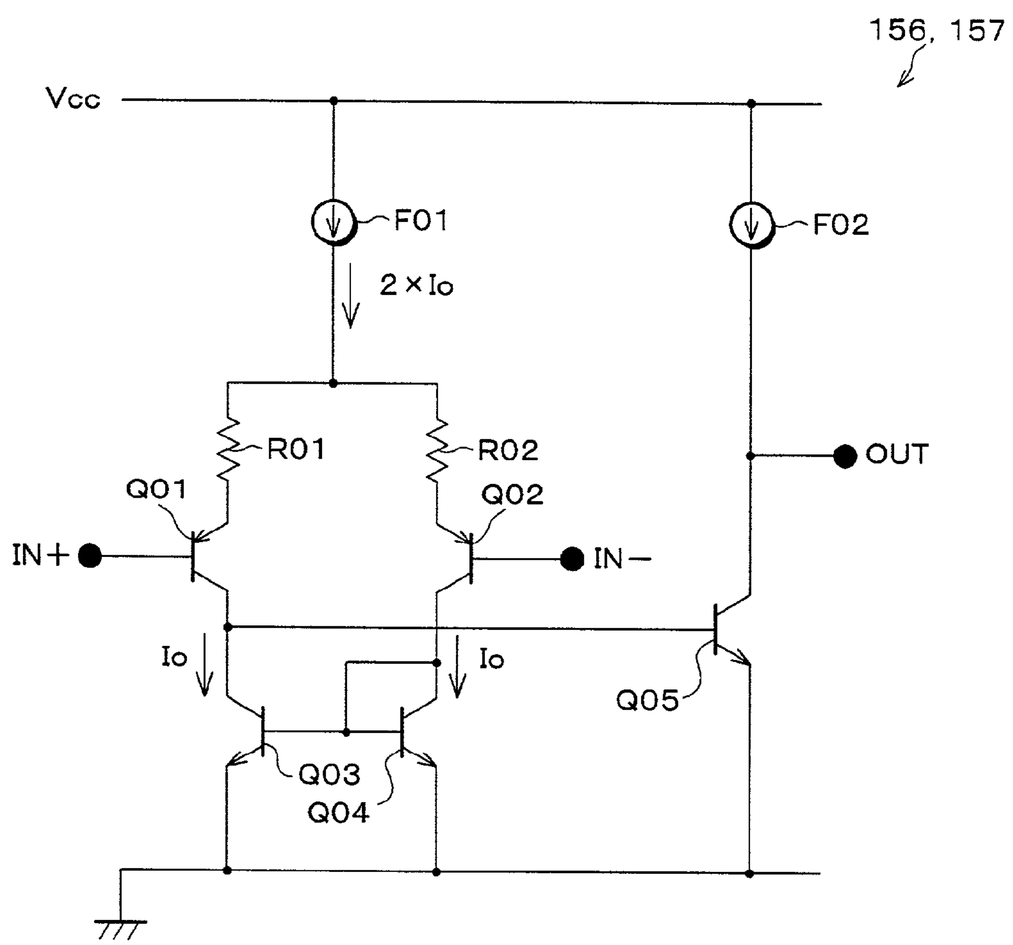
FIG. 6 is an electric circuit diagram illustrating a concrete configuration of an offset circuit of the carrier detection circuit shown in FIG. 5.
Figure 7:
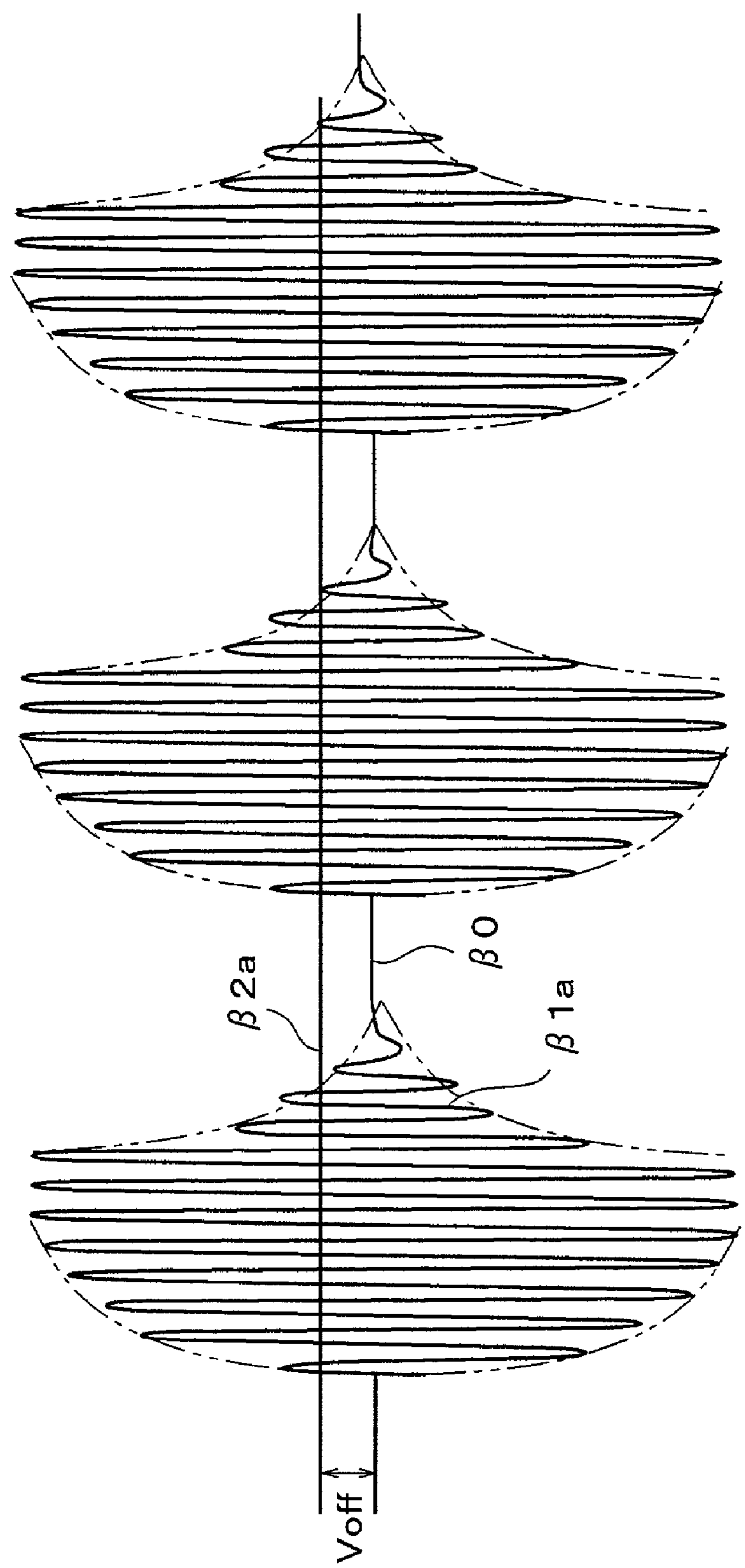
FIG. 7 is a wave form chart explaining a change in a carrier detection level of the carrier detection circuit shown in FIG. 5.
Figure 9:
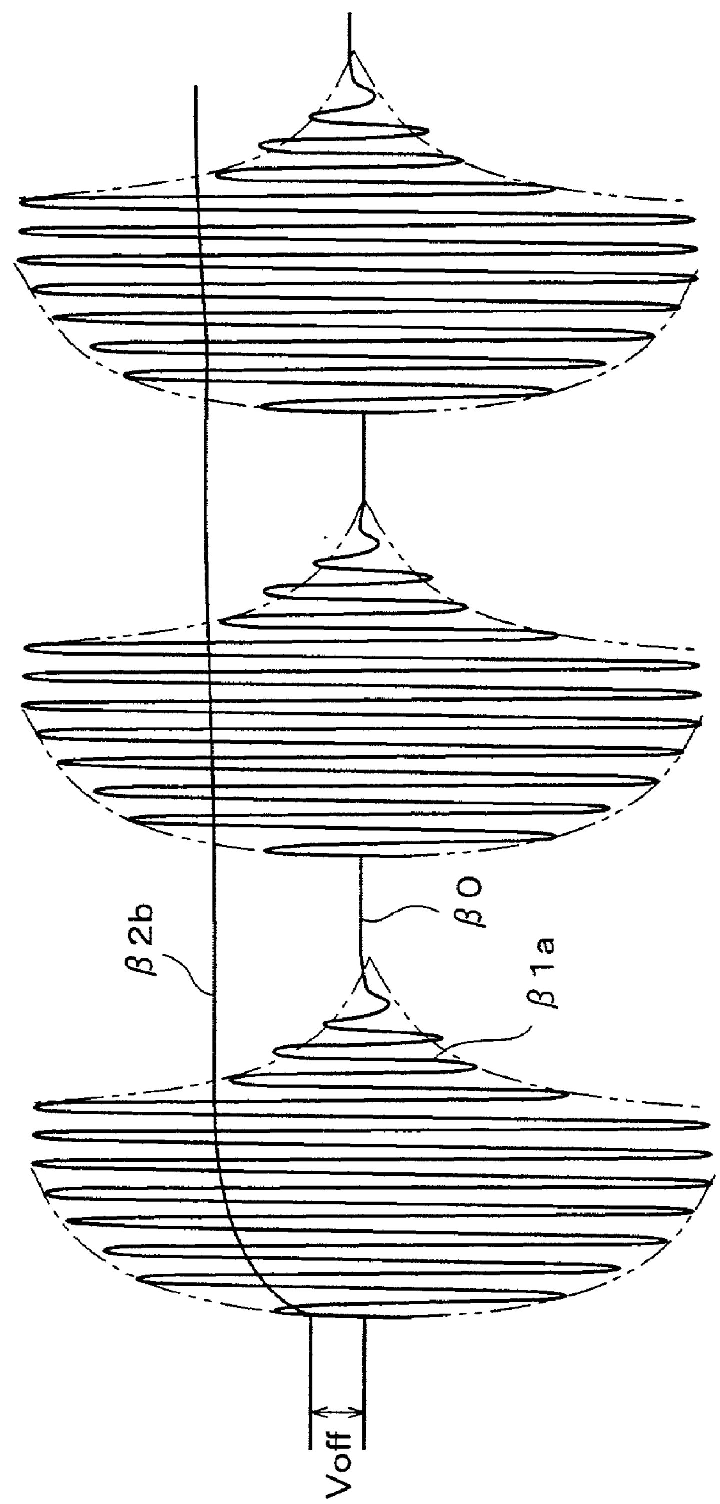
FIG. 9 is a wave form chart explaining a change in a carrier detection level of the carrier detection circuit shown in FIG. 8.

FIG. 6 shows an electric circuit diagram to illustrate a concrete configuration of the offset circuits 156 and 157. The off-set circuits 156 and 157, to be disposed in an input of either of the high-speed amplifier 154 or the amplifier 155, are provided with a pair of transistors Q01 and Q02, load resistors RI and R2, a constant current source F1, transistors Q03 and Q04, a transistor Q05, and a constant current source F02. Bases of the transistors Q01 and Q02 receive received signals IN+ and IN−, respectively, while emitters of the transistors Q01 and Q02 are connected with the load resistors R01 and R02. The constant current source F01 supplies with a current the emitters of the transistors Q01 and Q02 via the load resistors R01 and R02. The transistors Q03 and Q04 are connected to collectors of the transistors Q01 and Q02, so as to constitute a current mirror circuit, while occupying areas equal to each other in the current mirror circuit. A base of the transistor Q05 receives a voltage between the collector of the transistor Q01 and a collector of the transistor Q03. The constant current source F02 supplies with a constant current an emitter of the transistor Q05. From a connecting point between the constant current source F02 and the collector of the transistor QOS, an output OUT for a following circuit is supplied.

The constant current source F01 supplies a constant current 2Io, so that currents passing through the transistors Q03 and Q04 are mutually Io. When IN+<IN−, and R01>R02, an input off-set Voff is determined as follows:

$$Voff \approx oI \times (R01-R02) \qquad \text{Equation (4).}$$

Accordingly, for example, when Io=10 μA, R01=20 kΩ, and R02=10 kΩ, it is determined from the equation (4) that Voff=100 mV.

The off-set circuits 156 and 157 maintains at a constant voltage a carrier detection level Det, as indicated by a reference numeral β2a, by using the off-set voltage Voff, with respect to a direct current level, which is shown by a reference numeral β0 in FIG. 7, of the output Sig of the band pass filter 7 with no carrier detected, thereby achieving an accurate detection of the group of carriers, which are indicated by β1*a*, subsequently from the leading-off. The off-set voltage Voff is added by either of the high-speed amplifier 154 or the amplifier 155, thus being free from effects from a fluctuation in the direct current voltage of the output Sig of the band pass filter 7 or a temperature variation. In this way, reduced is a malfunction caused by a circuit noise of a carrier detection level Det of an initial state before receiving the received signal, or by a no disturbance requiring noise.

Explained below is a third embodiment of the present invention, with reference to FIGS. 8 to 12.

Shown in FIG. 8 is a constitutional view of a carrier detection circuit 160 of the third embodiment of the present invention. The carrier detection circuit 160 is similar to the carrier 130. Thus, corresponding sections are labeled in the same fashion, omitting their explanation. The carrier detection circuit 160 is provided with a rapid charging circuit 161 that temporally supplies with a large current an output terminal of an integrator 134 of a detection circuit 131, when an amplitude level of an output Sig of a band pass filter 7 exceeds a certain level. The rapid charging circuit 161 is provided with a diode D2 and an amplifier 162 that outputs a current that varies in accordance with a difference between the output Sig and a carrier detection level Det.

Moreover, a high-speed amplifier 141 of a detector 133 is followed by buffers 163 and 164. The output Sig is sent to a non-inverted input terminal of the high-speed amplifier 141 as well as a non-inverted input terminal of the amplifier 135 via the buffer 163. Whereas, the carrier detection level Det, which is an output of the integrator 134, is sent to an inverted input terminal of the amplifier 135, as well as an inverted input terminal of the high-speed amplifier 141 via buffer 164. It is so designed that there is a constant ratio of (a) an input bias current of the buffer 164, which is supplied to the integrator 134 of the detection circuit 131 for monitoring a voltage across an integration capacitor C12, to (b) a charging current If from the integrator 134.

In this way, the use of the input bias current of the buffer 164 stabilizes the discharging current If to be a feeble current, thereby giving a time constant for a long period of discharging to the discharging current If. Further, because the ratio of the charging current Ij to the discharging current If is constant, the equation (1) can be applied to determine the carrier detection level Det in accordance with a ratio of a charging time ton to a discharging time toff. In other words, in the event of the use of the input bias current of the buffer 164, the carrier detection level Det should be found from an equation slightly different from the equation (1). As the input bias current of the buffer 164 is constant, the discharging current If is always flows, even when the charging is performed with respect to the integration capacitor C12 by the integrator 134. Accordingly, the charging current is substantially Ij−If. Thus, the carrier detection level Det is determined according to the following equation:

$$\frac{1}{C12}\int_{o}^{tonsum}(Ij-If)=\frac{1}{C12}\int_{0}^{toffsum}If \qquad \text{Equation (5)}$$

$$\left(tonsum=\sum \text{ton},\ toffsum=\sum toff\right).$$

Thus, attained is a constant ratio of the charging current Ij−If to the discharging current If. In this manner, the carrier detection level Det can be determined in accordance with the ratio of the charging time ton to the discharging time toff, as described previously.

Moreover, the carrier detection circuit 160 is provided with an off-set circuit 165 between the output Sig, which is inputted into the rapid charging circuit 161, and the carrier detection level Det.

This allows the off-set voltage Voff to be generated for a direct current level (see the reference numeral β0 in FIG. 9) of the output Sig of the band pass filter 7 in which no carrier is detected. Meanwhile, this also makes the carrier detection level Det follows timely, as shown by a reference numeral β2*b*, upon detecting a leading group of the carrier, indicated by a reference numeral β1*a*. This results in suppression of the distortion of the output pulse width that is demodulated in the leading part of the transmission code. In addition, it is also possible to use a current that varies in accordance with the amplitude level of the inputted carrier signal. In this case, the carrier detection level Det can have better responsibility in accordance with the signal amplitude, when it is arranged to set the charging current according to the signal amplitude.

In FIG. 10, illustrated is an electronic circuit diagram that shows a concrete example of a circuit of the rapid charging circuit 161 and circuits relating thereto, namely the integrator 134 and the buffer 164. In this arrangement, an output VC1 of the detector 133 is not inputted into the integrator 134. Instead, shown in the arrangement is an example where an inverted output $\overline{\mathrm{VC1}}$ is inputted. The integrator 134 is provided with a pair of transistors QN1 and Qn2, which are respectively supplied with the inverted output $\overline{\mathrm{VC1}}$ and a reference voltage Vr. Emitters of the transistors QN1 and QN2 are grounded via a constant current source F11. In terms of collectors, a collector of the transistor QN1 is connected to a high-level power source Vcc, while a collector of the transistor QN2 is connected to the power source Vcc via a transistor QN3. The constant current source F11 draws a constant current Ij0 from the emitters of the transistors QN1 and QN2. A current that varies in accordance with a difference between the reverse output $\overline{\mathrm{VC1}}$ and the reference voltage Vr flows into a base of the transistor QN3. A current that is equal to the base current Ij1 of the transistor QN3 flows out of the base of a transistor QP2 via a transistor QP1, and transistors QP3 and QP4 that constitute a current mirror circuit CM1. Thereafter, the charging current Ij is outputted from a base of the transistor QP2 to a capacitor 12.

Therefore, the charging current Ij, which is outputted from the integrator 134, is described by the following equation, using the constant current Ijo:

$$Ij \approx (Ij0/Hfe(QN3)) \times Hfe(QP1) \times 1/Hfe(QP2) \quad \text{Equation (6),}$$

where Hfe (QN3), Hfe (QP1), and Hfe (QP2) are current amplification of the transistors QN3, QP1 and QP2, respectively.

Moreover, in the buffer 164, given to a base of a transistor QN4 is a bias current that is to be a discharging current <u>If</u> from the capacitor C12. An emitter of the transistor QN4 is grounded, together with an emitter of a transistor QN5, which is paired with the transistor QN4, via a constant current source F12. Meanwhile, collectors of the transistors QN4 and QN5 are connected to the power source Vcc via transistors QP5 and QP6, which constitute a current mirror circuit CM2 while occupying areas equal to each other in the current mirror circuit CM2. Between a base of the transistor QN5 and the power source Vcc, disposed is a transistor Qn6 whose base is connected between the collector of the transistor QN5 and a collector of the transistor QP6. The carrier detection level Det is outputted from a base of the transistor Qn5 and an emitter of the transistor QN6.

With this arrangement, the feeble currents Ij and <u>If</u> are attained by using base currents of the transistors QP2 and QN4, thereby realizing the time constant for a long period. This achieves a sufficiently highly accurate operation by using a current of 100 pA order as described previously. Moreover, the process of the integration of the circuit can be realized by applying a common and low-cost process.

Here, Ifo is a current that is flown out of the current source F12. Thus, emitter currents of the transistors QN4 and QN5 are denoted as If0/2.

Accordingly, the discharging current <u>If</u> can be described as follows:

$$If(If0/2) \times (1/Hfe(QN4)) \quad \text{Equation (7),}$$

where Hfe (QN4) is a current amplification of the transistor Qn4.

Therefore, supposing the respective transistors are substantially matched with each other, a ratio Irate of the charging current Ij–<u>If</u> to the discharging current <u>If</u> of the capacitor C12 is determined by an equation: Irate=(Ij–If)/If. Here, (Ij–If) is determined by the following equation:

$$(Ij - If) \approx (Ijo / Hfe(QN3)) \times Hfe(QP1) \times (1 / Hfe(QP2)) - (If0 / 2Hfe(QN4)). \quad \text{Equation (8)}$$

Thus, *Irate* is determined as follows:

$$Irate \approx \{(Ijo / Hfe(QN)) - (If0 / 2Hfe(QN))\} / (If0 / 2Hfe(QN)) = (Ijo - Ifo / 2) / (Ifo / 2).$$

Accordingly, the ratio of the charging current to discharging current can be constantly maintained by setting a current ratio of the constant current Ij0 to the constant current If0 from the constant current sources F11 and F12, respectively.

In the rapid charging circuit 161, bases of transistors QP15 and QP16, which are paired each other, receive a level Sigoff which is the resultant of addition of an offset outputted from an off-set circuit 165, and the carrier detection level Det, respectively. Emitters of the transistors QP15 and QP16 are connected to the power source Vcc via the constant current source F12, while collectors of the transistors Q215 and QP16 are grounded respectively via transistors QN7 and QN8, which constitute a current mirror circuit CM3. A voltage at a connecting point between the collector of the transistor QP16 and a collector of the QN8 is applied into a base of a transistor QN9 that has a base and a collector connected to the connecting point. A current varying in accordance with the applied voltage is sent to a capacitor 12 via (a) a transistor QN10, which configures, together with the transistor QN9, a current mirror circuit CM4, (b) a transistor QP11 connected in series with the transistor QN10, and (c) a transistor QP12 that constitutes, together with the transistor QP11, a current mirror circuit CM5.

Accordingly, the capacitor 12 receives a current that varies in accordance with a difference between the level Sigoff and Det.

On the other hand, in a device for sensing light afrom an infrared ray remote control or the like, it is generally inevitable that a parasite photodiode in an integrated circuit is activated by incident light into the device or stray light. Especially, a PNP transistor is suffered from this problem. In a common bipolar integrated circuit, a lateral PNP transistor is used as the PNP transistor, because the lateral PNP transistor can be easily manufactured without a special production step.

Figure 11:
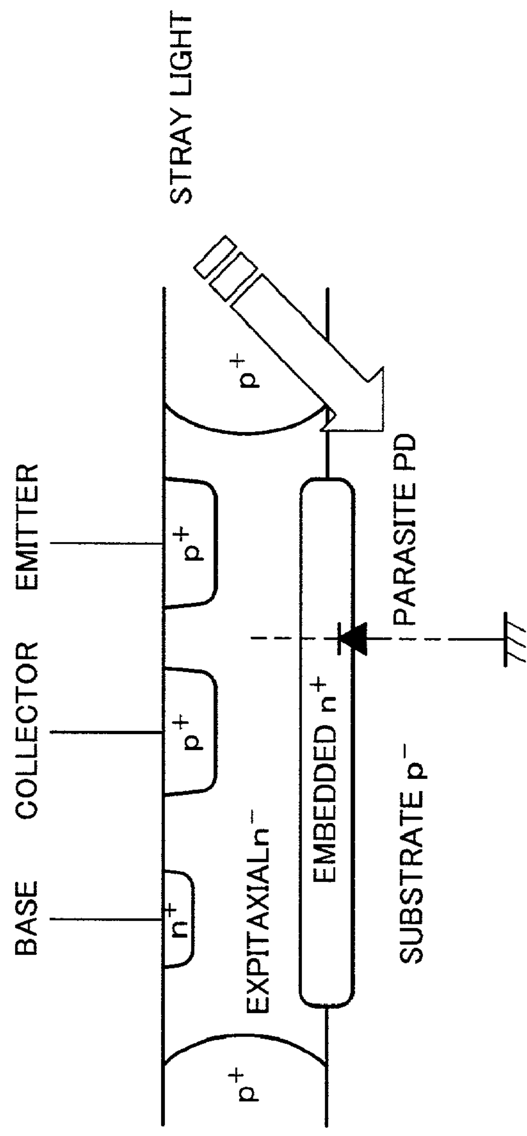
FIG. 11(*a*) is a circuit diagram of a lateral PNP transistor, while FIG. 11(*b*) is a sectional view thereof.

However, the lateral PNP transistor, as shown in FIG. 11(*a*), has a configuration in which a photodiode is connected to its base. Its sectional view is shown in FIG. 11(*b*). Therefore, use of the lateral PNP transistor in a circuit like the one shown in FIG. 10 with a feeble current cannot operate as designed due to the stray light. It is expected that the parasite light current is at most several nA in general, which is too big to deal with when a current of 100 pA order is used. Hence, in the configuration shown in FIG. 10, a vertical PNP transistor is used for the PNP transistor QP2 that deals with the feeble current. Meanwhile, the transistor QN4, which similarly deals with the feeble current, is an NPN transistor and is not affected significantly by the parasite light current.

Figure 12:
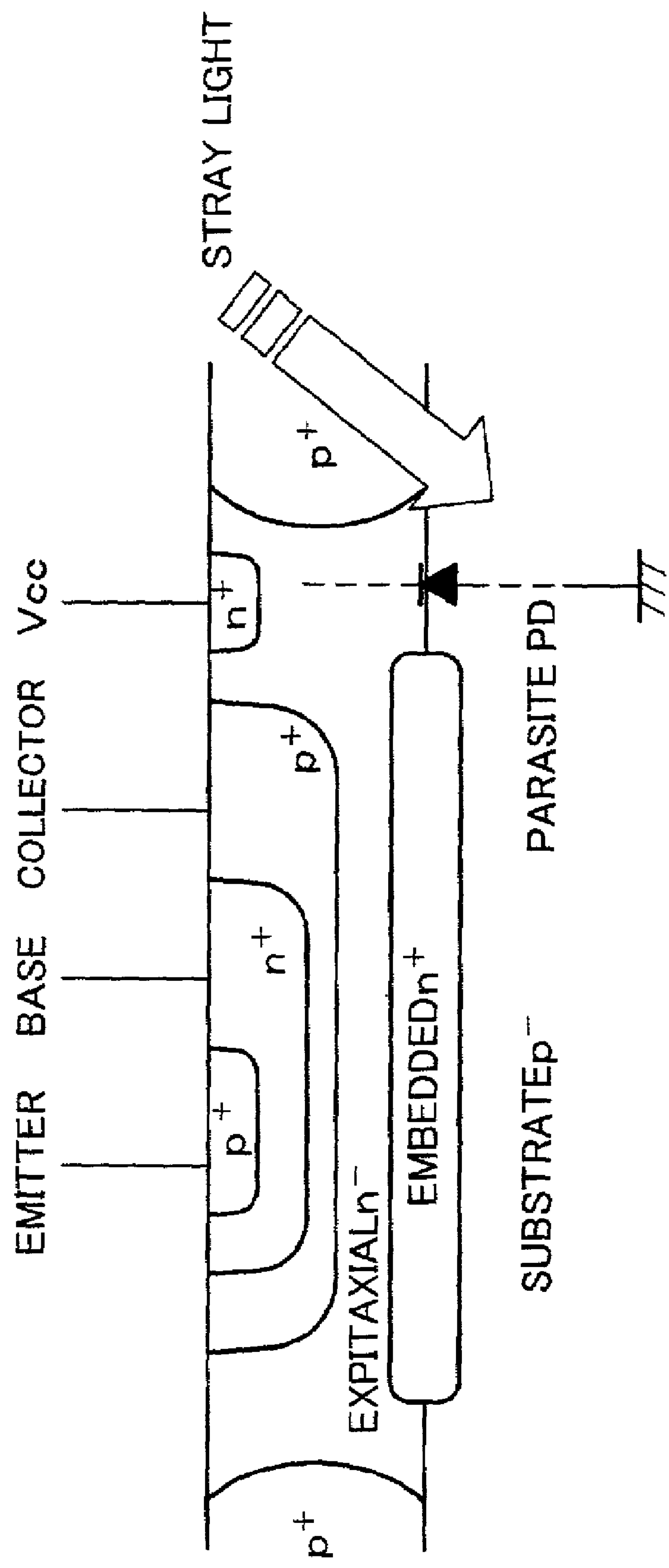
FIG. 12 is a sectional view showing a structure of a vertical PNP transistor.

In FIG. 12, shown is a sectional view of a configuration of the vertical PNP transistor. In this case, again, the stray light causes the parasite photodiode to generate the parasite light current. However, a parasite at its base is hardly affected by the stray light, which affects parasites of an expitaxial island to a substrate, thus not affecting circuit operation significantly. This makes it easier to deal with the feeble current of 100 pA.

Meanwhile, the current mirrors CM1, CM2, and CM5 are respectively composed of transistors QP3 and QP4; QP5 and QP6; and QP11 and QP12, having the configuration shown in FIG. 10 using the lateral PNP transistors. The current mirrors CM1, CM2 and CM5 are added with current mirrors CM6, CM7 and CM8 for compensating the parasite light current. The current mirrors CM6, CM7 and CM8 are respectively composed of transistors QP7 and QP8; QP9 and QP10; and QP13 and QP14. The current mirrors CM6 to CM8 also reduce the influence of the parasite light current.

In short, the parasite photodiode, which is provided between a substrate GND (substrate) and bases of the transistors QP3 and QP4 that are the lateral PNP transistors, compensates a parasite light current flowing from the bases to the substrate GND with a current supplied from the transistor QP8. Similarly, parasite currents associated with the transistors QP5 and QP6; and QP11 and QP12 are compensated with currents from the transistors QP10 and QP14, respectively, by using parasite photodiodes provided to those transistors QP5 and QP6; and QP11 and QP12, accordingly.

Here, as to the current mirror circuits CM1 and CM2, the influence of the parasite current on a terminal VC2 is compressed to 1/Hfe of the PNP transistors, while the current mirror circuit CM5 is affected by the parasite light current. Therefore, even though the current mirror circuit CM8 for compensating the parasite light current of the current mirror circuit CM5 is added, an output of an integrator 134 is largely affected by errors caused by the stray light or the current mirror circuit CM5. In order to absorb the errors, the parasite photodiode in the current mirror circuit CM8 for compensating the parasite light current is given an effective area larger than that of the parasite photodiode of the current mirror circuit CM5 to be compensated. To be concrete, the current mirror circuit CM8 has an expitaxial island having a greater area than that of an expitaxial island of the current mirror circuit CM5. This sufficiently compensates the parasite light current, thereby reducing malfunction due to errors of the compensation.

Described below is a fourth embodiment of the present invention, with reference to FIG. 13.

Figure 13:
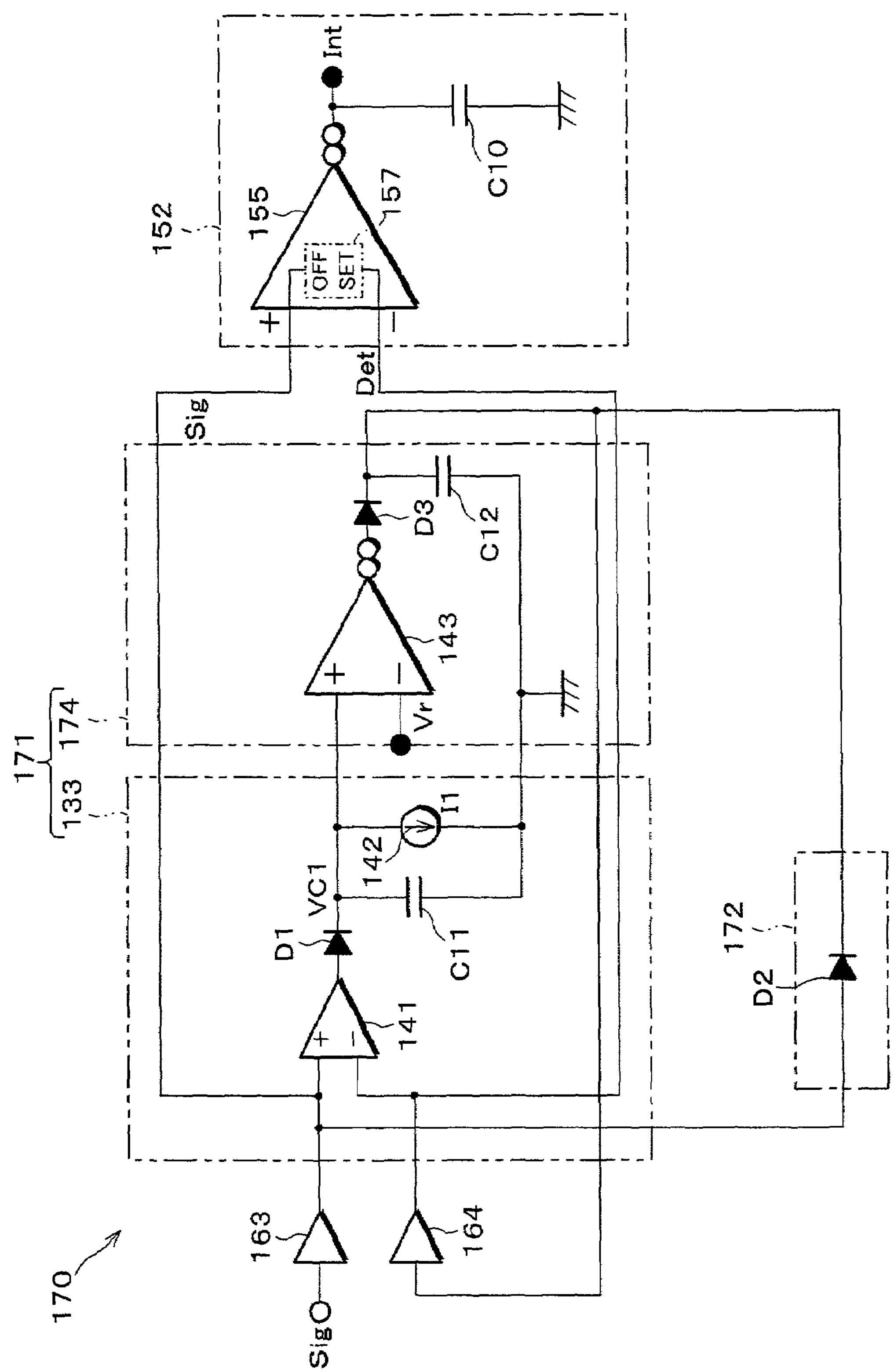
FIG. 13 is a view illustrating a carrier detection circuit of a fourth embodiment of the present invention.

In FIG. 13, shown is a configuration of a carrier detection circuit 170 of the fourth embodiment of the present invention. The carrier detection circuit 170 has some similarities with the carrier detection circuits 150 and 160, thus corresponding sections are labelled in the same manner, and their explanations are omitted here. In the carrier detection circuit 170, an amplifier 155 of an integration circuit 152 is provided with an offset circuit 157 as well as a rapid charging circuit 172 for temporarily supplying with a large current an integration circuit 174 of a detection circuit 171, when the amplitude level of the output Sig of the band pass filter 7 exceeds a certain level.

The rapid charging circuit 172 is constituted by the diode D2, while the diode D3 is provided so as to receive an output from the amplifier 143. With this arrangement, in response to the inputted large amplitude, the diode D2 is turned on, and then the capacitor C12 is rapidly charged via on-resistor of the diode D2. Such realization of the rapid charging by using the very simple circuit speeds up the response of the carrier detection level Det, thereby improving especially the responsibility (traceability) of the carrier detection level Det at the time of the large amplitude.

The present invention can be used for a receiver of a communication apparatus that utilizes a carrier provided by an infrared ray communication apparatus or a communication apparatus using electric waves, not limited to the infrared ray remote control.

In addition, Japanese Un-examined Utility Model Publication (Jitukaihei) No. 7-33020 (published on Jun. 16, 1995) discloses a burst signal detection circuit, in which (1) peaks of a noise and a carrier superposed by a burst signal are held by a first peak hold circuit, (2) a noise level is detected by a second peak hold circuit, (3) the noise level is removed from the burst signal that has been level-shifted, so that only the signal component is subjected to the half-wave rectification, and (4) a half-wave signal component is converted into sawtooth-waves for being compared with a reference voltage in order to carry out peak detection for wave form shaping.

In the conventional art, two stages of peak hold circuits are used so as to be able to integrate a capacitor that create a detection level, just like the present invention. The second peak hold circuit is composed of a mutual conductance amplifier and a differential amplifier, thereby creating a large equivalent resistor.

The conventional art, however, does not detect a time during which the carrier exists. Therefore, signals or noises are detected, regardless of a density of the carrier, thereby leading to an increase in a carrier detection level Det, which deteriorates a receiving sensitivity with respect to a code signal that is to be transmitted to the carrier detection circuit.

A carrier detection circuit of the present invention (a) for creating a carrier detection level in accordance with an received signal, and (b) for detecting whether or not a carrier exists in the received signal in accordance with the carrier detection level, is provided with (a) a detector for detecting groups of pulses, to be detected, having a carrier frequency; and (b) an integrator for carrying out integration of a time in which the groups of pulses are detected by the detector, and for outputting a resultant of the integration as the carrier detection level.

With the arrangement, the detector responds to the noise superposed with the carrier, thereby increasing the carrier detection level that is created by the integration apparatus. On the other hand, the transistor is provided in the integration capacitor for performing the charge and discharge of the capacitor, which outputs the carrier detection level, in accordance with whether or not the carrier exists. The transistor is only requested to be sensitive to a frequency of a base band component, but not to the carrier frequency, so that a margin with respect to the response of the transistor is ensured, and the charging and discharging currents of the capacitor can be feeble.

Therefore, it is possible to detect with the high responsibility, even if the capacitor has such a small capacity that the capacitor can be integrated.

Moreover, a carrier detection circuit of the present invention is further provided with an offset circuit for adding an offset to the carrier detection level for comparison of the received signal with the carrier detection.

With the arrangement, it is possible to maintain at a constant voltage an original carrier detection level which has not received the received signal, thereby reducing the malfunction caused by reacting to a circuit noise or a no disturbance requiring noise.

Furthermore, a carrier detection circuit of the present invention is further provided with a rapid charging circuit for temporarily supplying a large current into an output of the integrator, when the received signal has an amplitude level higher than a predetermined level.

With the arrangement, when a first pulse group having the carrier frequency is detected, the carrier detection level can follow promptly the pulse group, so as to suppress a distortion of an output pulse amplitude that is demodulated in a vicinity of the leading part of the transmission code.

Moreover, in the carrier detection circuit of the present invention, the rapid charging circuit is a diode.

With the arrangement, in response to the inputted large amplitude, the diode is turned on and the capacitor is charged via on-resistor of the diode. Thus, the response of the carrier detection level can be sped up by the simple circuit, thereby improving responsibility (traceability) of the carrier detection level at the time of the large amplitude.

Moreover, in the carrier detection circuit of the present invention, the rapid charging circuit is a diode.

Furthermore, a carrier detection circuit of the present invention is further provided with a buffer, provided in a position for monitoring a voltage in an integration capacitor of the integrator, wherein a ratio of (a) an input bias current of the buffer, which is a discharging current out of the capacitor, to (b) a charging current into the capacitor from the integrator is set to be constant.

With the arrangement, the use of the input bias current of the buffer allows the discharging current to be a stable feeble current, thereby attaining a time constant for a long period of discharging (a discharging time constant), while having the constant ratio of the charging time to the discharging time, thereby the carrier detection level can be decided in accordance with the ratio of the respective charging time to the discharging time, where (a) the charging time is a period of a time in which the respective pulses exceed the carrier detection level, and (b) the discharging time is a period of a time in which the respective pulses are less than the carrier detection level.

Furthermore, in the carrier detection circuit of the present invention, the charging current from the integrator into the integration capacitor is a base current of a vertical PNP transistor, while the input bias current of the buffer is a base current of an NPN transistor.

With the arrangement, the base current of the transistor is used as the charging and discharging currents, thereby attaining a feeble and stable current for the charging and discharging currents. Meanwhile, a combination of the vertical PNP transistor and the NPN transistor can limit the effect of the parasite light current caused by the stray light from the sun light or incandescent light into the integrated circuit chip.

Moreover, a carrier detection circuit of the present invention is further provided with a current mirror circuit for compensating a parasite light current, in association with a PNP transistor for creating feeble currents of charging and discharging an integration capacitor of the integrator.

With the arrangement, it is possible to compensate the parasite light current caused by the stray light from the sun light or incandescent light into the integrated circuit chip, thereby reducing the effect of the parasite light current.

Further, in the carrier detection circuit of the present invention, the current mirror circuit for compensating the parasite light current has an expitaxial island having an area larger than an area of an expitaxial island of the PNP transistor to be compensated.

The arrangement sufficiently compensates the parasite light current caused by the sun light or incandescent light, thereby reducing the malfunction due to the error in the compensation.

Figure 18:
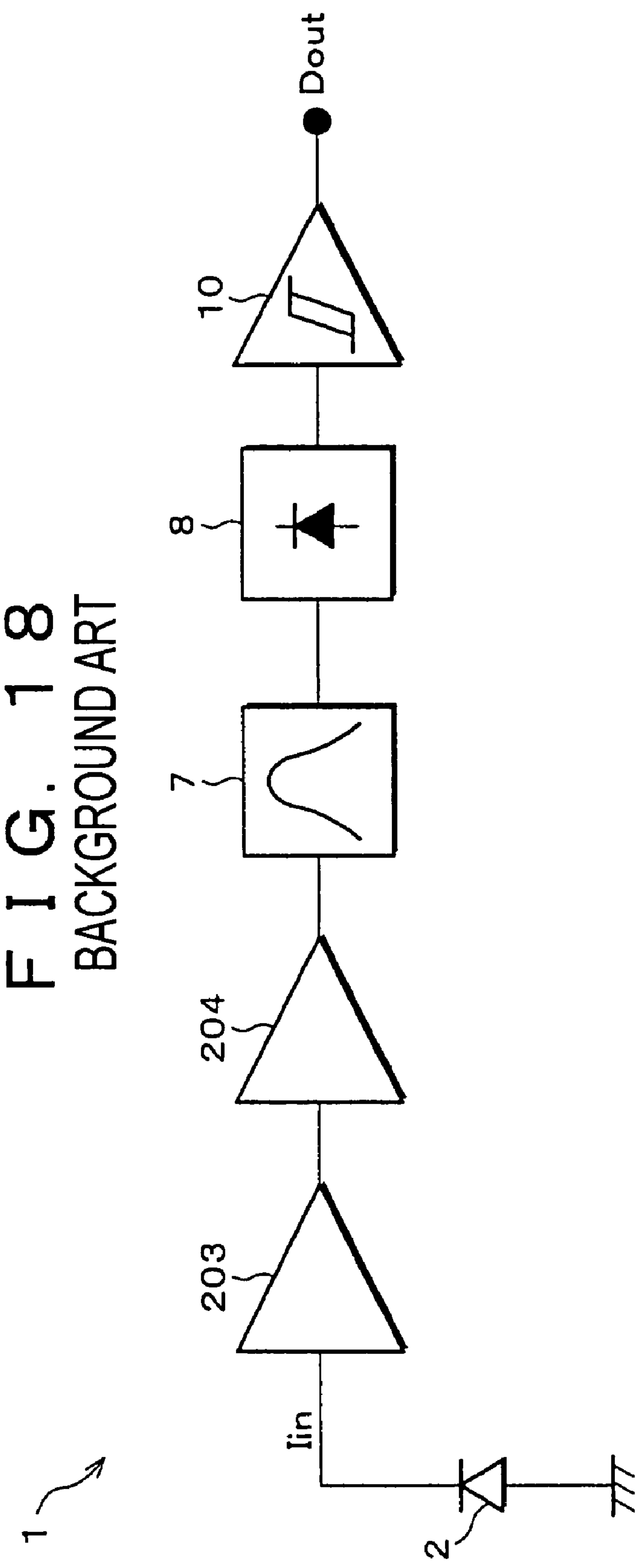
FIG. 18 is a block diagram showing a concrete configuration example of an infrared ray remote control receiver.
Figure 19:
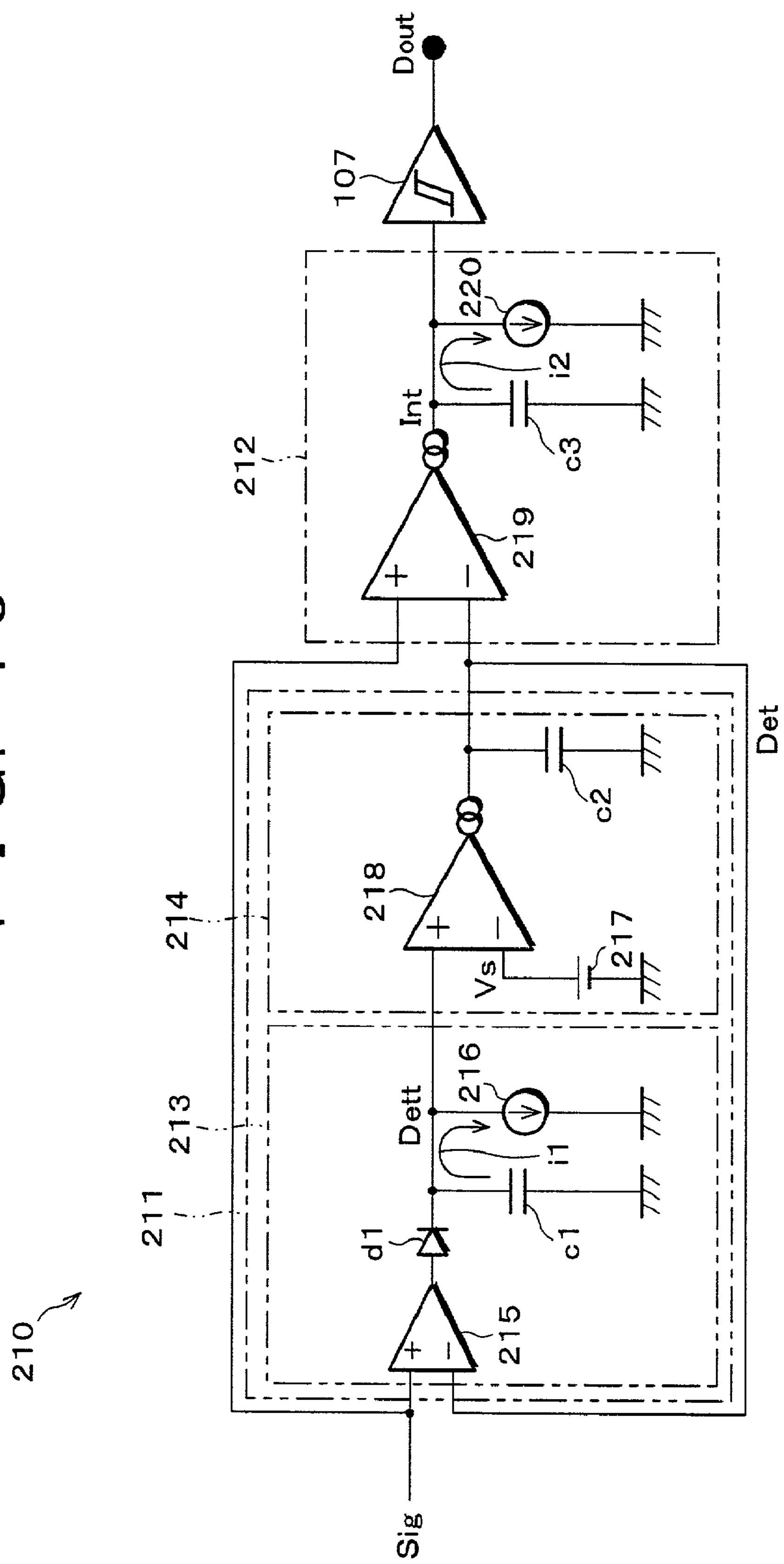
FIG. 19 is a circuit diagram of an inventive carrier detection circuit.

In the FIG. 19, shown is an equivalent circuit diagram of a carrier detection circuit 210, having the above arrangements. The carrier detection circuit 210, provided with a detection circuit 211, an integration circuit 212, and a hysteresis comparator 107, (1) creates the carrier detection level Det from the output Sig of the band pass filter 7 (see FIG. 18) by the detection circuit 211, (2) compares the output Sig with the carrier detection level Det by the integration circuit 212, (3) carries out the integration of a resultant of the comparison, and (4) gives such a resultant of the integration to the hysteresis comparator 107.

It should be noted that, the carrier detection circuit 210 has the detection circuit 211, in which a detector 213 detects pulses in groups (that is, a pulse group or a group of pulses) having the carrier frequency to be detected, an integrator 214 carries out the integration of the time in which the pulse group exists. A resultant of the integration outputted is the carrier detection level Det. In other words, the detector 213 does not directly create the carrier detection level Det for the whole receiving system, but is used to create the carrier detection level Det.

The detector 213 is provided with (a) a high-speed amplifier 215 for amplifying the difference between the output Sig and the carrier detection level Det at a high speed so as to respond to the carrier frequency, and output a voltage (output voltage), (b) a diode d1 for rectifying the output of the high-speed amplifier 215, (c) a capacitor c1 that is charged with the output voltage of the high-speed amplifier 215 via the diode d1, and (d) a constant current source 216 for discharging the capacitor c1 so that its discharging current is a constant current ii that is equivalent to an output current of the constant current source 216.

The integrator 214 is provided with (a) an amplifier 218 for outputting a current that varies in accordance with a difference between a charging voltage of the capacitor c1, that is an output Dett of the detector 213, and a predetermined reference voltage Vs from a reference voltage source 217, and (b) a capacitor c2 for being charged with an output current of the amplifier 218, and outputting the charged voltage as the carrier detection level Det.

The integration circuit 212 is provided with (a) an amplifier 219 of the current outputting type, (b) a capacitor c3, and (c) a constant current source 220 for discharging the capacitor c3 so that its discharging current is a constant current i2 that is equivalent to an output current of the constant current source 220. The integration circuit 212 carries out (a) comparison of the output Sig of the band pass filter 7 with the carrier detection level Det, (b) outputting a current, which varies in accordance with a resultant of the comparison, to the capacitor c3, so as to perform the integration of the time in which the carrier exists, so that a resultant of the integration is outputted as the integral output Int.

Figure 20:
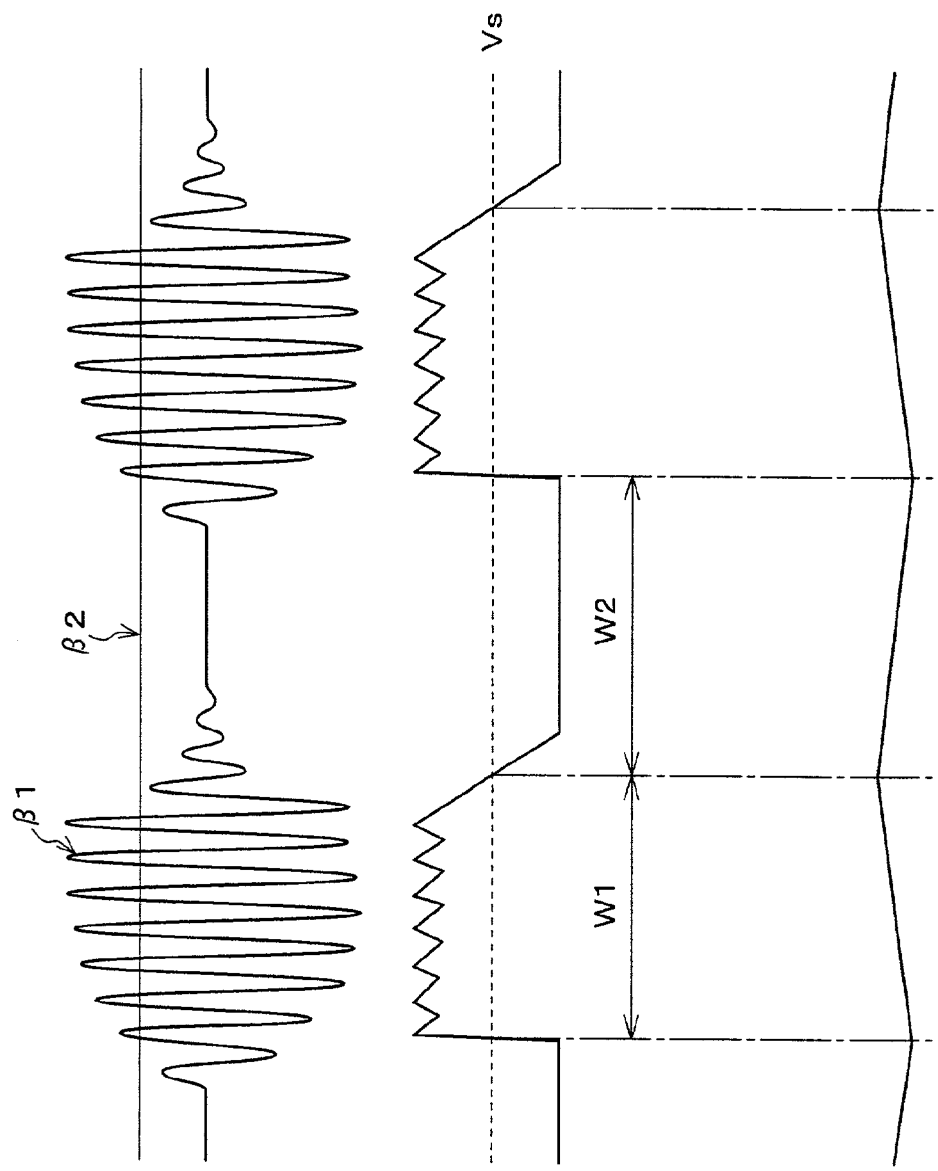
FIGS. 20(*a*) to 20(*c*) are wave form charts explaining an operation of the carrier detection circuit shown in FIG. 16.

FIGS. 20(*a*) to 20(*c*) show wave form charts explaining an operation of the carrier detection circuit 210. The high-speed amplifier 215 amplifies the difference between the output Sig (indicated by a reference numeral β1 in FIG. 20(*a*)) of the band pass filter 7 and the carrier detection level Det (indicated by a reference numeral β2 in FIG. 20(*a*)). Consequently, as shown in FIG. 20(*b*), the capacitor c1 is charged during a time period W1 in which the pulses having the carrier frequency are detected by the diode d1, thereby having a high value of the output Dett, which is the detection level of the pulse groups having the carrier frequency, while during a time period W2 in which no pulse is detected, the constant current source 216 discharges the capacitor c1, thereby lowering the output Dett down to zero. In this way, the time period W1 indicates the time in which the pulse group having the carrier frequency exists, as described above, and the integrator 214 carries out the integration of the time period W1, while its output (shown in FIG. 20(*c*)), which has been integrated, indicates the carrier detection level Det.

The infrared ray signal, is an ASK signal, which is modulated in accordance with a predetermined carrier having a frequency of 30 to 60 kHz. In a conventional method, a capacitor is charged and discharged in accordance with a carrier frequency of the carrier detection level Det that is outputted by the capacitor. On the contrary, here, the time periods W1 and W2 are time constants of 100 msec, which is sufficiently longer time in comparison with the conventional carrier frequency, so that the capacity of the capacitor c2, which outputs the carrier detection level Det, can be reduced to about 100 pF, for example, thereby ensuring that the capacitor c2 can be incorporated in an integrated circuit.

However, in the carrier detection circuit 210, a noise is detected with respect to the code signal that is transmitted after a predetermined dormant period is elapsed, when the carrier detection level Det is lowered during the dormant period. Therefore, the pulses having the carrier frequency are detected in groups as described before, considering a transmission code of the infrared ray remote control is about 50 msec. As a result, the long discharging time constant is attained, even when the capacitor C2 has such a small capacity that the capacitor can be assembled in the integrated circuit.

While this can prevent the malfunction caused by the light noises exceeding the discharging time constant, still remained is such a problem that a malfunction is caused by a light noise that varies periodically within the discharging time constant.

In FIGS. 21(*a*) to 21(*b*), shown are wave form charts with respect to main sections, when a continuous light noise is inputted from an inverter fluorescent light that has a carrier frequency substantially equivalent to the carrier frequency of the infrared signal. Based on the output Sig (indicated by a reference numeral β11 in FIG. 21(*a*)) of the band pass filter 7, the detector 13 outputs the output Dett (shown in FIG. 21(*b*)). When the output Dett exceeds the reference voltage Vs, the carrier detection level Det (indicated by a reference numeral β12 in FIG. 21(*a*)) is increased in accordance with a time constant for a long period, while the integration output Int (indicated by a reference numeral β13 in FIG. 21(*c*) is also increased. When exceeding the threshold level (indicated by a reference numeral β14), the threshold is lowered due to hysteresis, while the output signal Dout, shown in FIG. 21(*d*), is inverted, thereby causing the malfunction.

However, the malfunction can be put back to normal in such a manner that the increase of the carrier detection level Det is stopped as approaching the peak of the output Sig of the band pass filter 7, then the amplifier 219 outputs a voltage of low level based on an input offset of amplifier 219 in this condition, so as to allow the constant current source 220 to discharge the capacitor c3, where the discharged current is equivalent to the constant current i2, thereby reducing the integral output Int, to be not more than the threshold level of the outputting circuit 7.

On the contrary, in reality, the light noise of the fluorescent light includes other frequency components, such as commercially-used frequencies of power source lines, thereby resulting in swelling of the light noise component and the other frequency components. Thus, the light noise, which varies periodically within the discharging time constant, causes the malfunction. In FIGS. 22(*a*) to 22(*d*), shown are wave form charts explaining an operation with respect to the light noise having such swelling. The respective wave forms shown in FIGS. 22(*a*) to 22(*d*) correspond to those shown in FIGS. 21(*a*) to 21(*d*).

To begin with, similar to the above case, based on the output Sig (indicated by a reference numeral ella in FIG. 22) of the band pass filter 7, in which the swelling is contained, the detector 213 outputs the output Dett (shown in FIG. 22(*b*)). When the output Det exceeds the reference voltage Vs, the carrier detection level Det (indicated by a reference numeral β12a in FIG. 22(*a*)) is increased, while the integral output Int (indicated by a reference numeral β13*a* in FIG. 22(*c*)) is also increased. When exceeding the threshold level (indicated by a reference numeral β14*a*), the threshold is lowered due to hysteresis, while the output signal Dout, shown in FIG. 22(*d*), is inverted, thereby causing the malfunction.

However, the swelling in the output Sig sometimes lowers the output Dett below or equal to the reference voltage Vs. This decreases the carrier detection level Det, so that the output Sig exceeds the carrier detection level Det, again. In this way, peaks of the noise cannot be detected, so that the integral output Int will not be below or equal to the threshold level, which is reduced by the hysteresis, because the integral output Int repeats increases and decreases within a certain level. As a result, the output signal Dout will not be inverted, thus leading to continuation of the malfunction.

Figure 23:
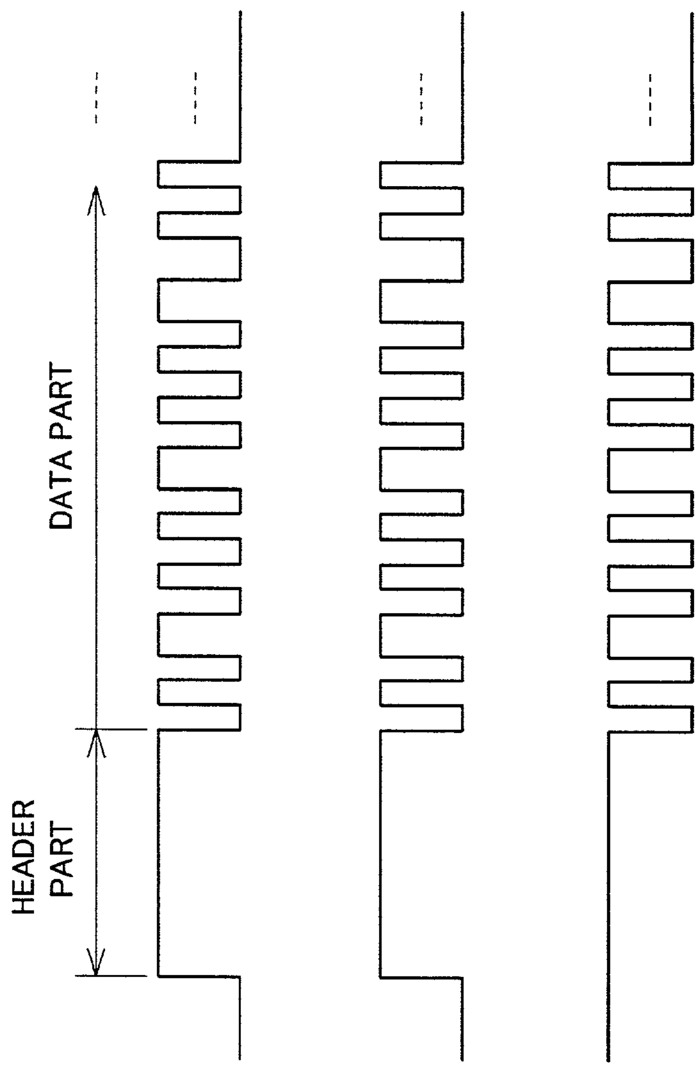
FIGS. 23(*a*) to 23(*c*) are wave form charts showing a transmission code signal and a inputted code signal of an infrared ray remote control signal.

Here, shown in FIG. 23(*a*) is an example of a code signal that is transmitted. In FIG. 23(*b*), the output signal Dout for the normal function is shown, while FIG. 23(*c*) illustrates the output signal Dout for the malfunction caused by the light noise having the swelling. Even when using the light noise containing the swelling, because the noise is substantially detected, data can be restored, as shown in FIG. 23(*c*), as long as the transmission signal has a level of a sufficient magnitude. However, to many of code signals used by remote controls a header as a starting code is added, just before the data. If the header was not detected, as the case shown in FIG. 23(*c*), the data following the header would not be detected, causing malfunction.

In the following, described is a fifth embodiment of the present invention, with reference to FIGS. 24 and 25.

In FIG. 24, a block diagram illustrating an electric configuration of a carrier detection circuit 30 of the fifth embodiment of the present invention. The carrier detection circuit 30 is mainly provided with a detection circuit 31, an integration circuit 32, and an outputting circuit 33. In the detection circuit 31, a detector 34 detects pulse group, to be detected, having a carrier frequency, an integrator 35 carries out an integration of a time in which the pulse group exists, thereby letting the output, that is, a resultant of the integration, to be a carrier detection level Det. Then, in the integral circuit 32, the output Sig is compared with the carrier detection level Det. After executing an integration of the resultant of the comparison by the integration circuit 32, the output circuit 33 discriminates the resultant of the comparison according to levels, so as to create an output Dout. The above process is same as the one of the carrier detection circuit 10 shown in FIG. 19.

In other words, the detector 34 is provided with (a) a high-speed amplifier 36 that amplifies a difference between the output Sig and the carrier detection level Det in a high speed so as to sufficiently respond to the carrier frequency, (b) a diode D1 for rectifying an output of the high-speed amplifier 36, (c) a capacitor C1 for being charged with an output voltage of the high-speed amplifier 36 via the diode D1, and (d) a constant current source 37 for discharging the capacitor C1 in such a manner that a discharging current is equivalent to a constant current I1. The detector 34 carries out peak hold operation for the output Sig.

The integrator 35 is provided with (a) an amplifier 39 for outputting a current that is in accordance with a difference between a charging voltage of the capacitor C1, that is, an output Dett of the detector 34, and the reference voltage Vs, which is a predetermined reference integral value given by a reference voltage source 38, and (b) a capacitor C2 for being charged with an output current of the amplifier 39, and for outputting its charged voltage (a voltage charged in the capacitor C2) as the carrier detection level Det.

The integration circuit 32 is provided with (a) an amplifier 40 of the current outputting type, (b) a capacitor C3, and (C) a constant current source 41 for discharging the capacitor C3 in such a manner that a discharging current of the capacitor C3 is equivalent to a constant current I2. The integration circuit 32 makes a comparison of the output Sig of the band pass filter 5 with the carrier detection level Det, and outputs a current that varies in accordance with a resultant of the comparison, thereby resulting in that the integration of the time in which the carrier exists is carried out and the resultant of the calculation is outputted as the integral output Int. The output circuit 33, provided with a hysteresis comparator, discriminates the integral output Int, which is outputted from the integration circuit 32, in accordance with level, so as to create an output signal Dout having a base band frequency.

It should be noted that, the carrier detection circuit 30 is provided with a feedback loop 42 that feeds the output signal Dout of the output circuit 33 back to the detector 34. Meanwhile, the charging voltage of the capacitor C1, which acts as a detection level of the pulse group for an ON-state time, (that is, the output Dett of the detector 34) is set at a predetermined a constant voltage VC, which is substantially equal to the maximum value, by a transistor 43, which receives the output signal Dout. This increases the carrier detection level Det, thereby reducing the sensitivity. As a result, the integral output Int can be restored to be in the original initial state.

Figure 25:
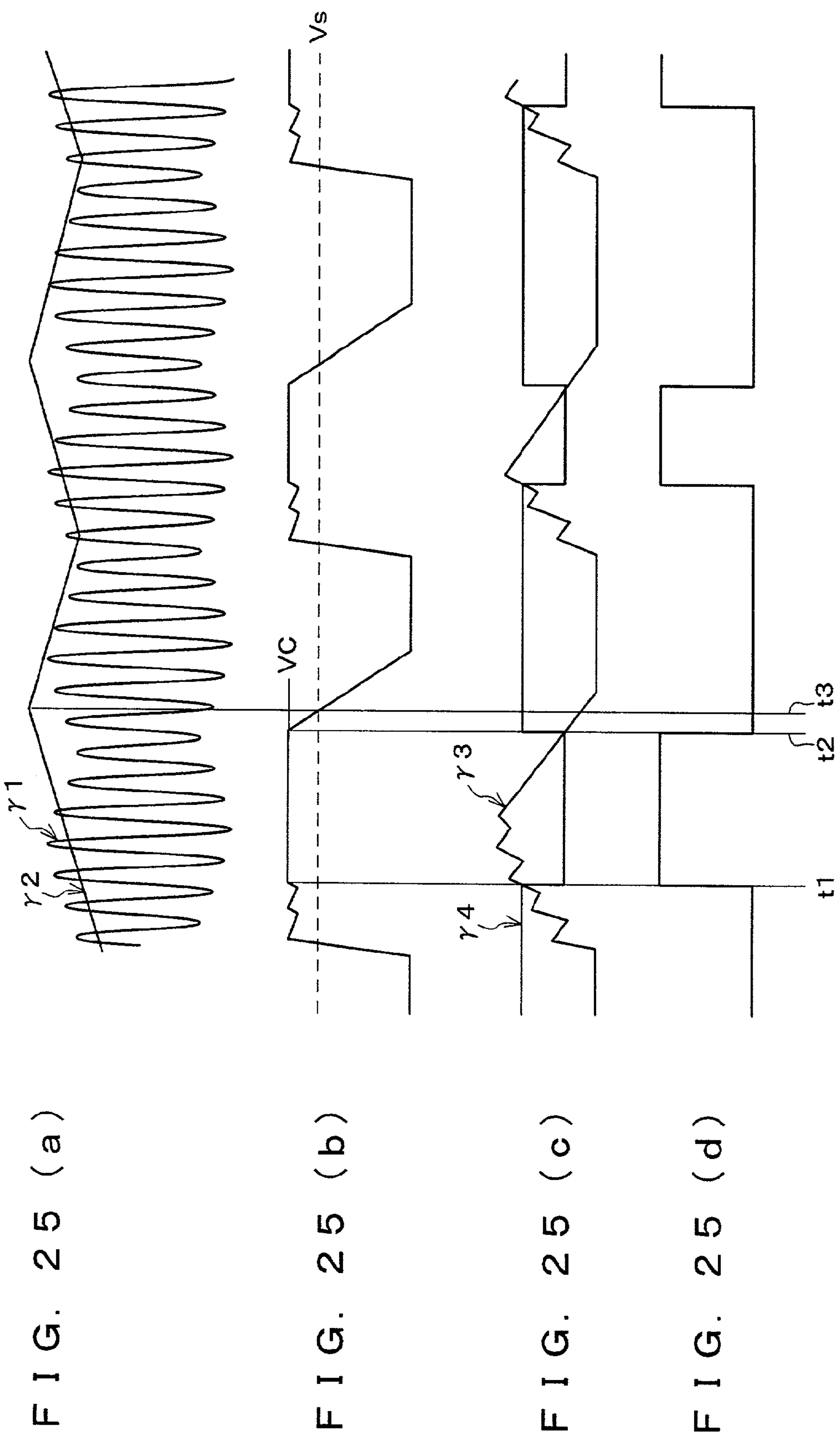
FIGS. 25(*a*) to 25(*d*) are wave form charts explaining an operation of the carrier detection circuit shown in FIG. 1.

In FIG. 25, shown are wave form charts explaining the operation of the carrier detection circuit 30 having the above arrangement, in case of receiving the light noise having the swelling. Based on an output Sig (indicated by a reference numeral γ1 in FIG. 25(*a*)) of the band pass filter 5, the detector 34 outputs an output Dett shown in FIG. 25(*b*). When the output Dett exceeds the reference voltage Vs, a carrier detection level Det (indicated by a reference numeral γ2 in FIG. 25(*a*)) is increased in accordance with a time constant for a long period, while an integral output Int (indicated by a reference numeral γ3 in FIG. 25(*c*)) is also increased. When exceeding a threshold level (indicated by a reference numeral γ4) of the output circuit 33, the threshold level would be lowered due to the hysteresis, and an output signal Dout (shown in FIG. 25(*d*)) would be inverted, thereby temporally falling into a malfunction state.

However, in this case, because the output Dett of the detector 34 is set at the constant voltage VC by the transistor 43, as mentioned before, the output Dett is kept above the reference voltage Vs, even if the amplitude of the output Sig shown in FIG. 25(*a*) is reduced by the swelling, resulting in an increase of the carrier detection level Det up to the level substantially equal to the maximum. In this way, the integral output Int is lowered. The level of the integral output Int is reduced to below or equal to the threshold level of the output circuit 33 at time t2, thereby inverting the output signal Dout to an off state, and restoring the normal condition. If the output Dett is reduced to below or equal to the reference voltage Vs at time t3, the carrier detection level Det starts to decrease.

In addition, even though the above-mentioned ON-OFF operation of the output signal Dout may seem to be an oscillation, the circuit has a large time constant, as described above, thus having a relatively long cycle. Therefore, after a header of the transmission signal, as shown in FIG. 23(*a*) is received when the output Dout is in the OFF-state, the receiving can be carried out exactly, as shown in FIG. 23(*b*), without having a problem in data following the header. Moreover, there is no practical problem for the ON-OFF operation because (1) even when the ON-OFF operation is continued, it is possible to have power consumption smaller than that in a case where ON-stage is sustained for all the time, as shown in FIG. 22(*d*), and (2) the ON-OFF operation will not be activated when an ordinary infrared ray signal is received.

In this manner, the output Dett, which indicates the detection level of the pulse group having the carrier frequency, is maintained at the constant voltage VC that is above the reference voltage Vs, in order to deal with swelling lower than the carrier frequency having the output Sig, when the output signal Dout is in the ON-state, in which a carrier is detected. By doing this, the detection of the pulse group is apparently continued. This reduces the integral output Int below or equal to the threshold level of the output circuit 33 after the amplitude of the output Sig caused by the swelling is restored. As a result, the output signal Dout is surely restored back to the OFF-state, so as to prevent the malfunction. In this way, it is possible to separate and detect the code signal having a base band frequency out of the noise having the swelling.

Regarding this, for example, in Japanese Un-examined Patent Publication (Tokukaihei) No. 6-188835 (published on Jul. 8, 1994), it is arranged that the noise is inputted into an amplifier through a matching circuit in which a current caused by incident light is subjected to a square root conversion, in order to remove a shot noise that is generated in a photodiode and passes through a band pass filter, because a current of the shot noise varies in accordance with the square root of the current caused by the incident light.

However, all of such prior arts considering the removal of noise deals with the noise by adjusting the input level of the amplifier, while the carrier is detected by the envelope detection. In this point, in the present invention, the carrier detection level Det varies in response to the peaks of a substantial disturbance noise, in other words, is in accordance with the level of the disturbance noise, so as to remove the noise component. Therefore, in the present invention, it is possible to achieve high ability to remove the noises including the shot noise.

In the following, described is a sixth embodiment of the present invention, with reference to FIGS. 26 to 28.

FIG. 26 is a block diagram illustrating an electric configuration of a carrier detection circuit of the sixth embodiment. The carrier detection circuit 50 has some similarities to the carrier detection circuit 30, thus its corresponding sections are labelled in the same fashion, omitting their explanation. It should be noted that, in the carrier detection circuit 50, a carrier detection circuit 30 limits an output Dett of a detector 34 at the constant voltage Vc, which is slightly higher than the reference voltage Vs, when an output signal Dout is in an ON-state, whereas the carrier detection circuit 30 maintains the output Dett at the constant voltage VC.

For this reason, a voltage limiting circuit 51 that limits the output Dett at the constant voltage Vc is provided in association with the detector 34. The voltage limiting circuit 51 is mainly provided with a limited voltage generating circuit 52 and a switch device 54. The limited voltage generating circuit 52 receives the reference voltage Vs from a reference voltage source 38, and generates the constant voltage Vc that is slightly higher than the reference voltage Vs. The switch device 54 receives the output signal Dout via the feedback loop 42. The constant voltage Vc of the limited voltage generating circuit 52 is supplied to a line 53 when the switch device 54 is on, while the limited voltage generating circuit 52 is opened from the line 53 when the switch device 54 is off.

Figure 27:
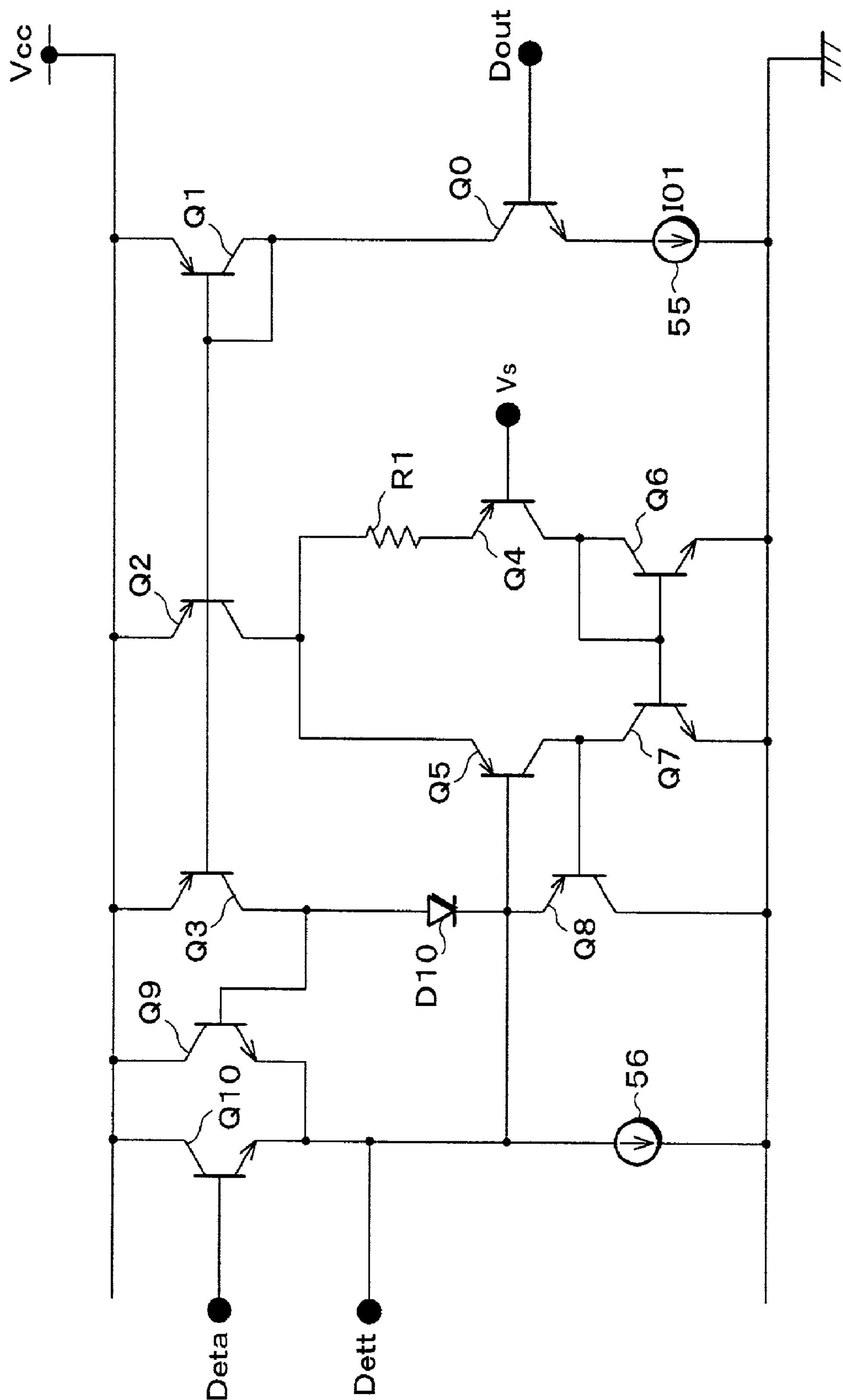
FIG. 27 is an electric circuit diagram showing a configuration example of voltage limiting circuit in the carrier detection circuit shown in FIG. 26.

In FIG. 27, shown is an electric circuit diagram of a configuration example of the voltage limiting circuit 51. The voltage limiting circuit 51 is provided with a reference current source 55, transistors Q0 through Q10, a resistor R1, and a diode D10. The transistors Q0 to Q3 are respectively supplied with a reference current I01 from the reference current source 55, while the transistor Q0 is turned on and off according to the output signal Dout. The transistors Q0 to Q3 configure the switch device 54. Configured by the resistor R1, the diode D10, the transistors Q4 through Q9 and the constant current source 56 is the limited voltage generating circuit 52 that creates the voltage Vc. The transistor Q10 (the inputting transistor Q10), which is for inputting, receives an output Deta from the capacitor C1.

The transistors Q4 and Q5 are in pair. A base of transistor Q4 receives the reference voltage Vs, while its emitter is connected to a collector of the transistor Q2 that supplies the reference current I01 via the resistor R1. A collector of the transistor Q4 is grounded via the transistor Q6. Meanwhile, a base of the transistor Q5 is connected to (a) a collector of the transistor Q3, which supplies the reference current I01 via diode 10, and (b) an emitter of the transistor Q9, which is in pair with the inputting transistor Q10. The base of the transistor Q4 is also grounded via the transistor Q8. Moreover, a base of the transistor Q5 is connected to a connecting point between the inputting transistor Q10 and the constant current source 56, which are connected each other in series between power supplying lines, thereby being an output terminal for the output Dett to the amplifier 39. An emitter of the transistor Q5 is connected to the collector of the transistor Q2, and a collector of the transistor Q5 is grounded via the transistor Q7 that configures a current mirror circuit with the transistor Q6.

Accordingly, when the output signal Dout is off, the transistors Q0 through Q3 are turned off, thus the transistors Q4 to Q9 are inactivated, so as to output, as the output Dett, a voltage that is lower than the output Deta of the capacitor C1 by a voltage between the base and emitter of the transistor Q10. As a result, the detector 34 carries out the normal peak hold operation. On the other hand, in case the output signal Dout is on, the transistors Q0 through Q3 are turned on, thereby activating the transistors Q4 to Q9. Consequently, the output Dett is limited to the constant voltage Vc (Vc=Vs+(I01/2)·R1), which is slightly higher than the reference voltage Vs.

Figure 28:
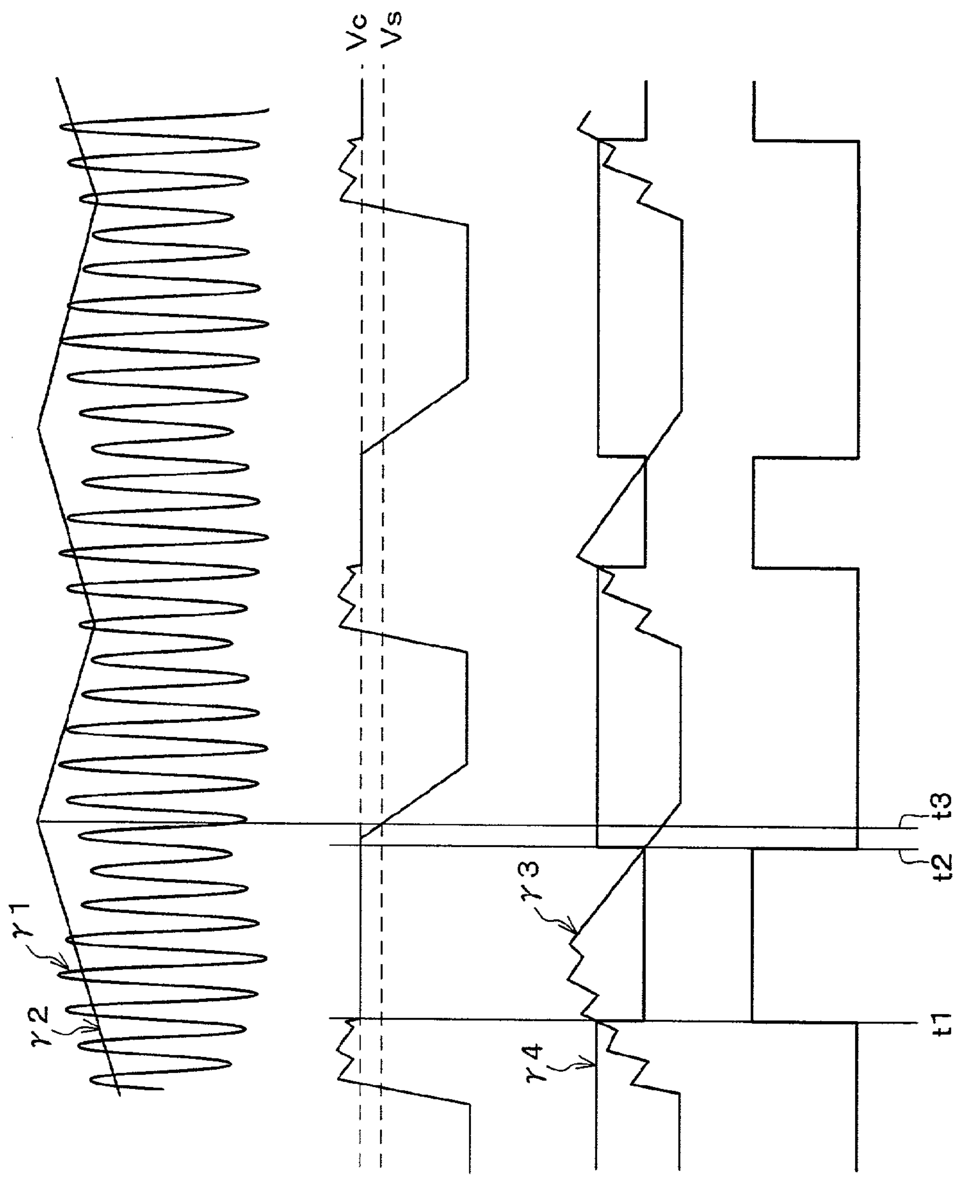
FIGS. 28(*a*) to 28(*d*) are wave form charts explaining an operation of the carrier detection circuit shown in FIG. 26.

In FIGS. 28(*a*) to 28(*d*), shown are wave form charts explaining an operation to deal with a light noise having swelling.

Each wave form in FIGS. 28(*a*) to 28(*d*) corresponds to those of FIGS. 25(*a*) through 25(*d*), respectively. As shown in FIG. 28(*b*), the output Dett is limited to the constant voltage Vc, when the output signal Dout is on at the time T1.

In this way, it is also possible to maintain the output Dett, which indicates the detection level of the pulse group having the carrier frequency, above the reference voltage Vs. By doing this, apparently the pulse group is continuously detected. This reduces the integral output Int below or equal to the threshold level of the outputting circuit 33 after a predetermined period. As a result, the output signal Dout is surely restored back to the OFF-state, thereby preventing the malfunction, as the above case.

Furthermore, by limiting the output Dett, which is the detection level of the pulse group having the carrier frequency, at the constant voltage Vc that is slightly higher than the reference voltage Vs, it is possible to solve such a drawback that the infrared ray to be received cannot be received because of lower receiving sensitivity due to excessively high output dett when no carrier exists.

Described below is a seventh embodiment of the present invention, with reference to FIGS. 29 to 31.

Figure 29:
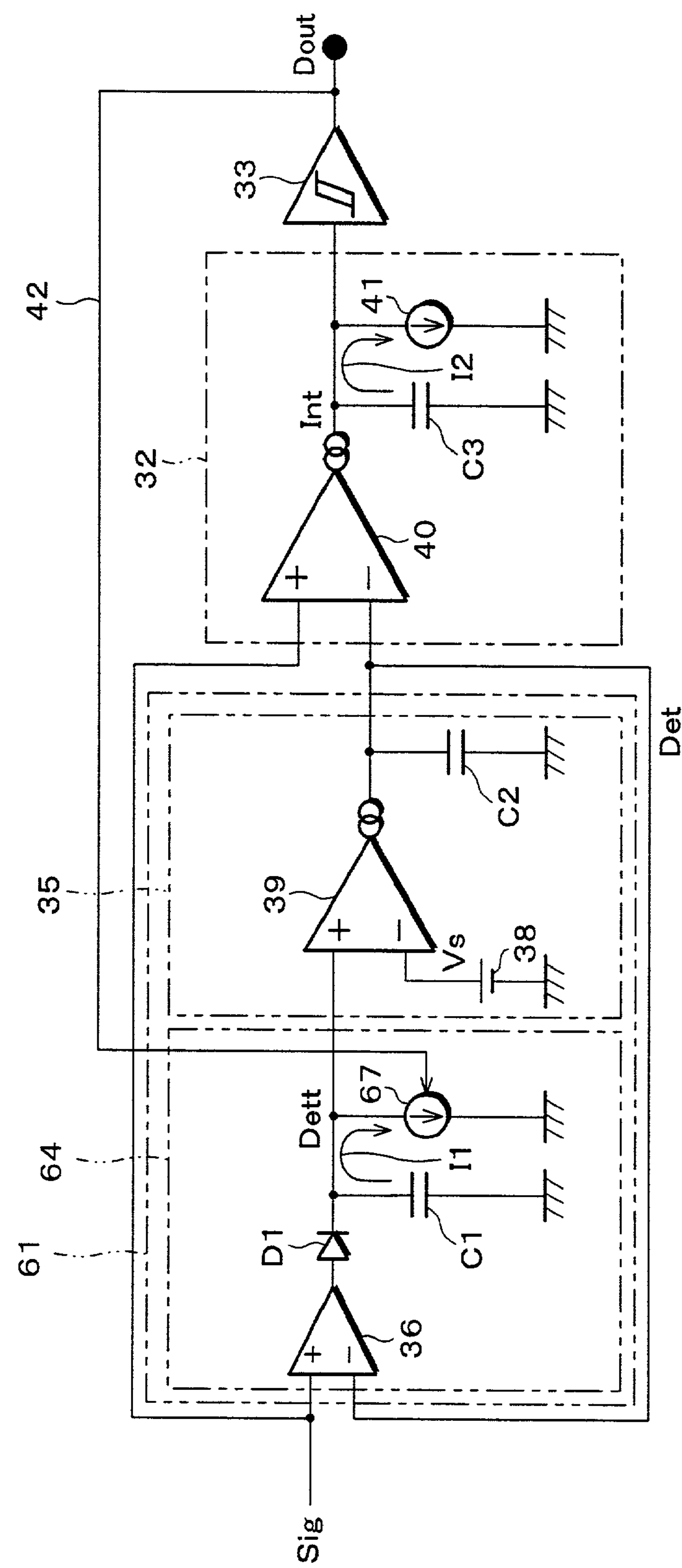
FIG. 29 is a block diagram illustrating an electric configuration of a carrier detection circuit of a seventh embodiment of the present invention.

FIG. 29 shows a block diagram of an electric configuration of a carrier detection circuit 60 of the present invention. The carrier detection circuit 60 is similar to the carrier detection circuits 30 and 50, having corresponding sections labelled in the same manner. Thus, the explanation on the corresponding sections is not repeated, here. In should be noted that, in the carrier detection circuit 60, the output signal Dout, which is fed back through the feedback loop 42, is inputted into a constant current source 67 of a detector 64 in a detection circuit 61. Meanwhile, the constant current Ii of the constant current source 67 has a predetermined first current value Iloff when the output signal Dout is in the OFF-state, whereas the constant current I1 is reduced to have a predetermined second current value I1on, which is lower than the Iloff.

Figure 30:
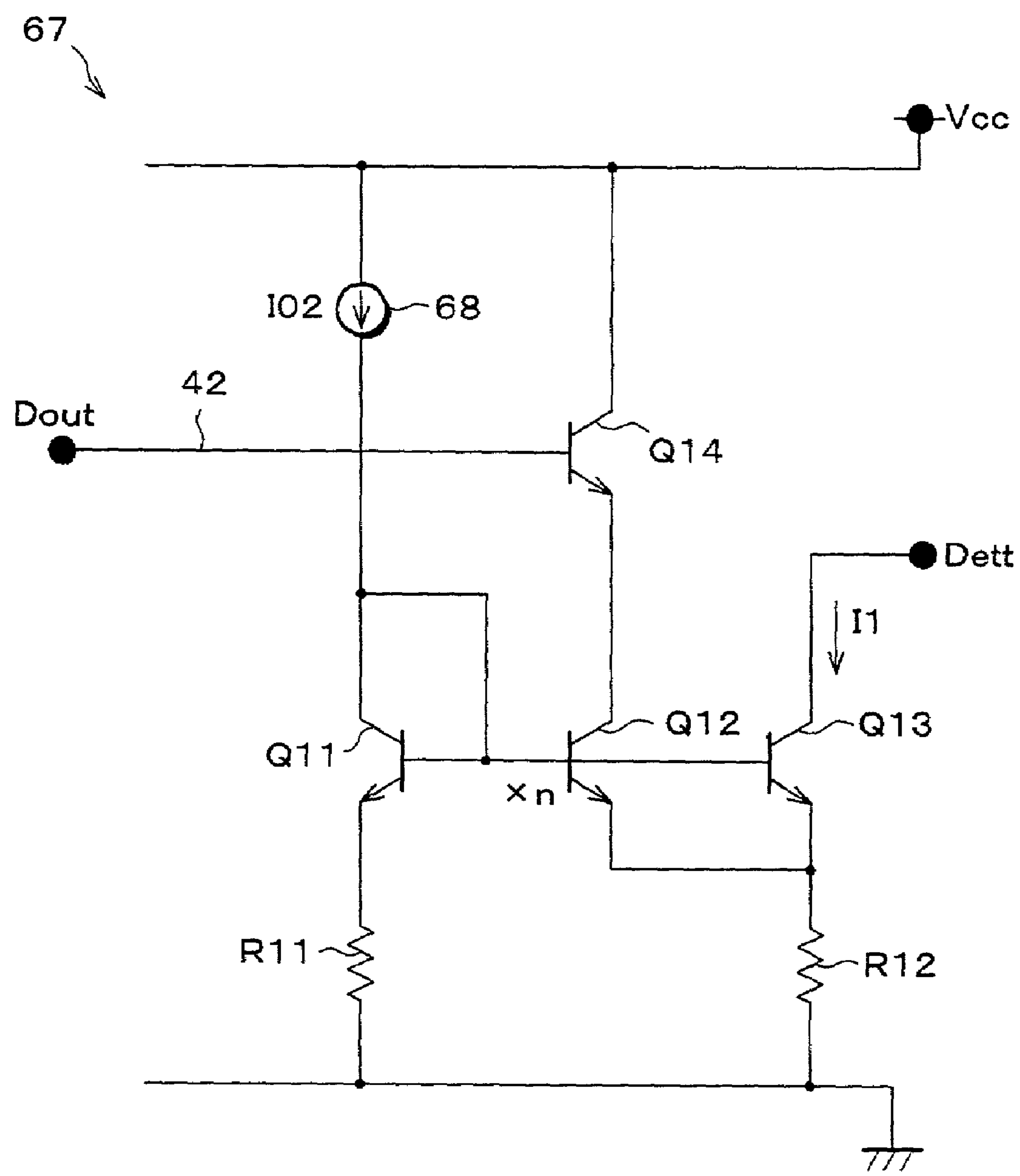
FIG. 30 is an electric circuit diagram showing a configuration example of a constant current source in the carrier detection circuit showing in FIG. 29.

In FIG. 30, shown is an electric circuit diagram of a configuration example of the constant current source 67. The constant current source 67 is provided with a reference current source 68, four transistors, namely, Q11 through Q14, and two resistors, namely R11 and R12. The reference current source 68, transistor Q11 and the resistor R11 are provided between power supplying lines, thus being connected in series each other. A base of the transistor Q11, which is connected so as to function as a diode, is connected with bases of the transistors Q12 and Q13, which configure a current mirror circuit. A collector of the transistor Q13 is connected to the capacitor C1, so as to receive the constant current I1, and is grounded via the resistor R12. On the other hand, an emitter of the transistor Q12 is also grounded via the resistor R12. Moreover, a collector of the transistor Q12 is connected to a power supplying line of high level Vcc via the transistor Q14. A base of the transistor Q14 receives the output signal Dout via the feedback loop 42.

The transistors Q11, Q12, and Q13 have an emitter area ratio of 1:n:1 where n>1. Thus, when the output signal Dout is in the OFF-state, the transistors Q12 and Q14 are turned off so that the constant current I1 has the current value I1off, which is relatively greater, while the constant current I1 has the current value I1on, which is relatively smaller, when the output signal Dout is in the ON-state, thereby making the transistors Q12 and Q14 turn on. Consequently, a current flows into the resistor R12 via the transistors Q12 and Q14.

The current values I1off and I1on are set as follows:

$$(kT/q)\ln(I02/I1\mathrm{off})+I02\cdot R11-I1\mathrm{off}\cdot R12=0$$

$$(kT/q)\ln(I02/I1\mathrm{on})+I02\cdot R11-(1+n)I1\mathrm{on}\cdot R12=0,$$

where k is the Boltzmann's constant, T is the absolute temperature, q is elementary electric charge.

Figure 31:
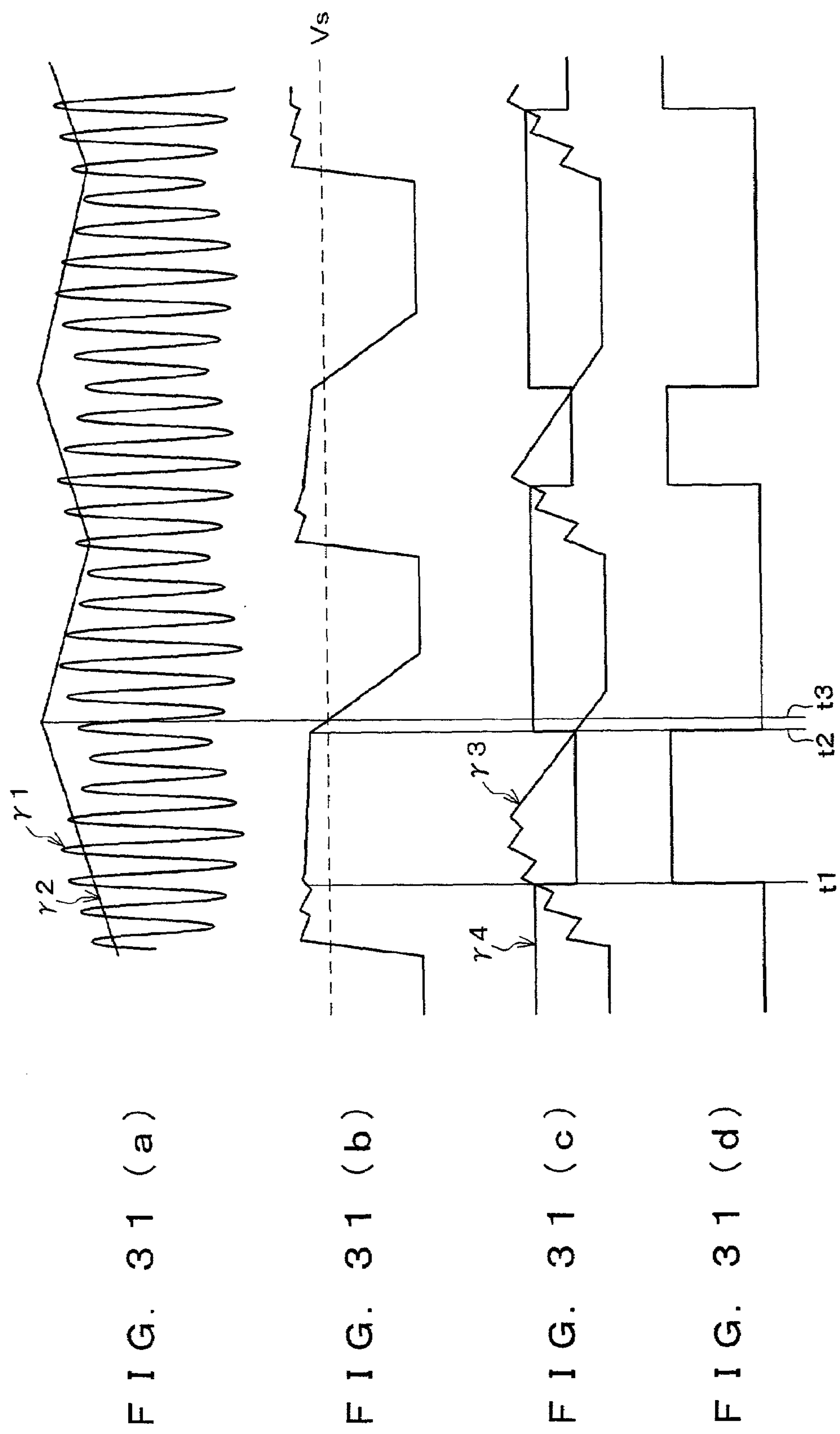
FIGS. 31(*a*) through 31(*d*) are wave form charts explaining an operation of the carrier detection circuit shown in FIG. 29.

In FIGS. 31(*a*) to 31(*d*), shown are wave form charts explaining an operation to deal with a light noise containing swelling. The respective wave forms in FIG. 31(*a*) to 31(*d*) correspond to those in FIG. 25(*a*) to 25(*d*) and FIG. 28(*a*) through 28(*d*), respectively. As illustrated in FIG. 31(*b*), when the output signal Dout is in the ON-state at the time t1, the constant current I1, which is discharged out of the capacitor C1 by the constant current source 67, is reduced to I1on as described above. Therefore, the output Dett is slowly decreased in such a manner that the output Dett is kept above the reference voltage Vs until the time t3.

Even in this case, it is possible to prevent the malfunction caused by the swelling, while it is also possible to solve the drawback that the infrared ray to be received cannot be received because of lower receiving sensitivity due to excessively high output dett when no carrier exists.

In the following, described is an eighth embodiment of the present invention, with reference to FIGS. 32 and 33.

FIG. 32 shows a block diagram illustrating an electric configuration of a carrier detection circuit 70 of the eighth embodiment of the present invention. The carrier detection circuit 70 have similarities as the carrier detection circuits 30, 50, and 60, discussed above. It should be noted that, in the carrier detection circuit 70, a detector 74 of a detection circuit 71 amplifies the difference between the output Sig of the band pass filter 5 and the carrier detection level Det, and increases an input offset voltage of a high-speed amplifier 76 for outputting a voltage when the output signal Dout is in the ON-state.

Figure 33:
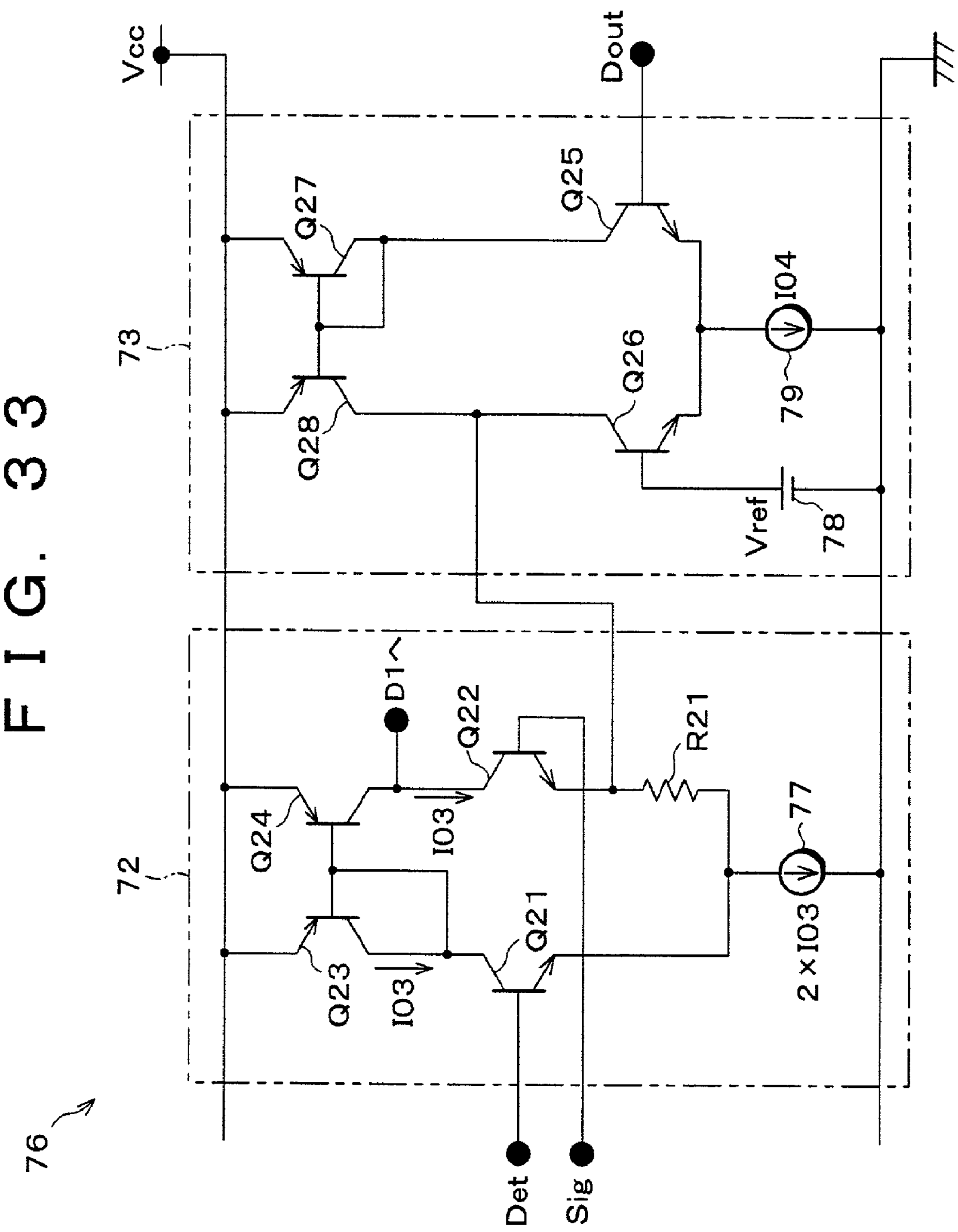
FIG. 33 is an electric circuit diagram showing a concrete configuration of a high-speed amplifier in the carrier detection circuit shown in FIG. 32.

In FIG. 33, shown is an electric circuit diagram illustrating a concrete configuration of the high-speed amplifier 76. The high-speed amplifier 76 is provided with a comparator 72 and an offset change-over switch circuit 73. The comparator 72 is provided with transistors Q21 through Q24, a load resistor R21, and a constant current source 77. The transistors Q21 and Q22 are in pair whose bases receive the carrier detection level Det and the output Sig of the band pass filter 5, respectively. The load resistor R21 is connected to an emitter of the transistor Q22. The constant current supply 77 supplies with currents an emitter of the transistor Q21 and an emitter of the transistor Q22 via the resistor R21, respectively. The transistors Q23 and Q24 are connected to collectors of the transistors Q21 and Q22, respectively, and configure a current mirror circuit while occupying areas equal to each other in the current mirror circuit. A connecting point between the transistor Q22 and the transistor Q24 is an output terminal for the diode D1.

The constant current source 77 supplies a constant current of 2×I03. Thus, the identical constant currents I03 flows through both of the transistors Q23 and Q24. Here, the input offset is substantially equal to a product of I03×R21, when Sig>Det.

On the other hand, the offset change-over switch circuit 73 is provided with transistors Q25 to Q28, and a constant current source 79. The transistors Q25 and Q26 are in pair whose bases respectively receive the output signal Dout and a predetermined reference voltage Vref from a reference voltage source 78. The constant current source 79 supplies with identical currents emitters of the transistors Q25 and Q26. The transistors Q27 and Q28 are connected to collectors of the transistors Q25 and Q26, respectively, and configure a current mirror circuit while occupying areas equal to each other in the current mirror circuit. A connecting point between the transistor Q26 and the transistor Q28 is connected to a connecting point between the transistor Q22 and the load resistor R21.

Therefore, when the output signal Dout has a ground level lower than the reference voltage Vref in the OFF-state, the transistors Q25 to Q28 are turned off, so that the input offset is I03×R21. When the output Dout is higher than the reference voltage Vref in the ON-state, the transistors Q25 to Q28 are turned on, so that the load resistor R21 receives a constant current I04 from the constant current source 79, thereby increasing the input offset to a product of hit (I03+I04)×R21.

With the arrangement, where the output Sig is apparently increased when the output signal Dout is in the ON-state in which it is detected that a carrier exists. Maintained is the output Dett, which indicates the detection level of the pulse group having the carrier frequency, above the reference voltage Vs that indicate the detection level of the pulse group having the carrier frequency, with respect to the swelling whose frequency is lower than the carrier frequency. By doing this, apparently the pulse group is continuously detected. This reduces the integral output Int below or equal to the threshold level of the output circuit 33, after a predetermined period. As a result, the output signal Dout is surely restored back to the OFF-state, thereby preventing the malfunction, as the above cases.

Moreover, in the carrier detection circuit 70, the sensitivity is lowered by increasing the output Dett, that is, the carrier detection level Det, as each of the carrier detection circuits 30, 50 and 60, while it is possible in the carrier detection circuit 70 that the period having low sensitivity can be shortened because the output Dett is not directly manipulated.

Described below is a ninth embodiment of the present invention, with reference to FIGS. 34 and 35.

In FIG. 34, shown is a block diagram of an electric configuration of a carrier detection circuit 80 in accordance with the ninth embodiment of the present invention. The carrier detection circuit 80 is similar to the carrier detection circuits 30, 50, 60 and 70. It should be noted that, a reference voltage Vs of a reference voltage source 88 in an integrator 85 is lowered by a detection circuit 81 in the carrier detection circuit 80, when the output signal Dout is in the ON-state.

Figure 35:
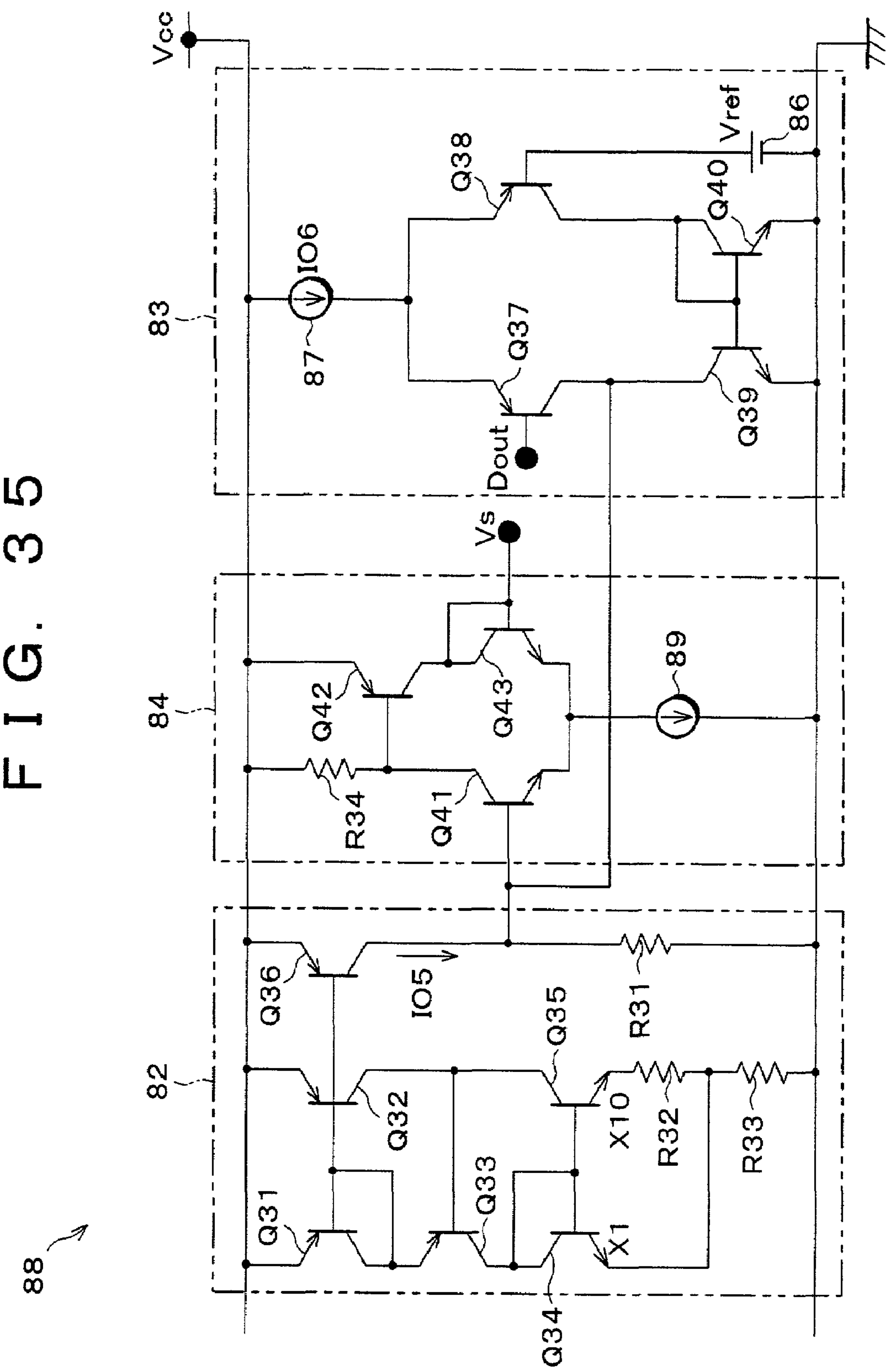
FIG. 35 is an electric circuit diagram showing a concrete configuration of a reference voltage source in the carrier detection circuit shown in FIG. 34.

FIG. 35 shows an electric circuit diagram of a concrete configuration of the reference voltage source 88. The reference voltage source 88 is provided with a constant voltage generating circuit 82, a change-over circuit 83, and an output buffer circuit 84. The constant voltage generating circuit 82 is provided with transistors Q31 through Q3G and resistors R31 to R33. The constant voltage generating circuit 82 supplies the resistor R31 with a constant current I05, thereby generating a constant voltage equal to a product of I05×R31.

On the other hand, the change-over circuit 83 is provided with transistors Q37 to Q40 and a constant current source 87. The transistors Q37 and Q38 are in pair whose bases receive the output signal Dout and a predetermined reference voltage Vref from a reference voltage source 86, respectively. The constant current source 87 supplies with currents an emitter of the transistor Q37 and an emitter of the transistor Q38, respectively. The transistors Q39 and Q40 are connected to collectors of the transistors Q37 and Q38, respectively, and configure a current mirror circuit while occupying area equal to each other in the current mirror circuit. A connection point between the transistor Q37 and the transistor Q39 is connected to a connecting point between the transistor Q36 and the resistor R31.

Moreover, the output buffer circuit 84 is provided with transistors Q41 through Q43, a resistor R34 and a constant current source 89. The output buffer circuit 84 outputs, as the reference voltage Vs, a voltage at a connecting point between the resistor R31 and the transistor Q36 that is connected with a base of the transistor Q41, in other words, a voltage across the resistor R31, via the base of the transistor Q43.

Therefore, when the output signal Dout has a ground level lower than the reference voltage Vref in the OFF-state, the transistors Q37 through Q40 are turned on, while the resistor R31 receives a constant current I06 from the constant current source 87, so that the reference voltage Vs is equal to a product of (I05+I06)×R31. On the contrary, when the output signal Dout has higher than the reference voltage Vref in the ON-state, the transistors Q37 through Q40 are turned off, so that the reference voltage Vs is lowered to a level equal to the product of I05×R31.

With this arrangement, where the reference voltage Vs is lowered when the output signal Dout is in the ON-state, in which it is detected that the carrier exists. Maintained is the output Dett above the reference voltage Vs that indicates the detection level of the pulse group having the carrier frequency, with respect to the swelling whose frequency is lower than the carrier frequency. By doing this, apparently the pulse groups are continuously detected. This reduces the integral output Int below or equal to the threshold level of the output circuit 33 after a predetermined period. As a result, the output signal Dout is surely restored back to the OFF-state, thereby preventing the malfunction, as the above cases.

Furthermore, by manipulating the reference voltage Vs, but not the output Dett, it is possible to reduce an effect caused by a newly-generated noises that is associated with such a manipulation. This improves tolerance of the system against the malfunction.

Described below is a tenth embodiment of the present invention, with reference to FIG. 36.

FIG. 36 is a block diagram showing an electric configuration of an infrared remote control receiver 91 (hereinafter, it may just referred to as the receiver 91) in accordance with the tenth embodiment of the present invention. In the receiver 91, an infrared ray signal is converted into a light current signal I1n by a photodiode 92. The light current signal I1n is subjected to current-voltage conversion by an amplifier 93, then, is amplified by an amplifier 94, thereafter, is inputted into a band pass filter 95. The band pass filter 95 detects a carrier frequency component. Further, a detection circuit 96 detects a transmission code having a base band frequency out of the carrier frequency component. An output of the detection is compared with a predetermined threshold level by an output circuit 97, thereby detecting whether or not a carrier exists in the infrared ray signal. This restores a code signal in digital. The code signal in digital is outputted as the output signal Dout, by the output circuit 97. The output circuit 97 is provided with the detection circuit 96 and a hysteresis comparator. The output circuit 97 configures a carrier detection circuit.

It should be noted that, in the receiver 91, the output signal Dout, which is supplied from the output circuit 97 via the feedback loop 42, is inputted into at least one of the amplifier 94 and the band pass filter 95, while their gains are lowered during a time in which the output signal is in the ON-state.

With the arrangement, where gains of the amplifier 94 and/or band pass filter 95 are lowered, achieved is higher possibility in which the output Sig of the band pass filter 95 is below or equal to the carrier detection level Det, even when a level of pulses is shifted because of swelling having lower frequency than the carrier frequency. This keeps the integral output Int of the detection circuit 96 below or equal to the threshold level of the output circuit 97. As a result, the output signal Dout can be surely restored back to the OFF-state. In this way, again, it is possible to prevent the erroneous detection of carrier.

Further, the gains of the amplifier 94 and/or the band pass filter 95 are lowered in accordance with a predetermined time constant. Thus, the response of the control is delayed according to the time constant, so as to reduce an effect of a noise generated by switching over of the output signal Dout. As a result, the system can be more tolerate against the malfunction.

Furthermore, when the gain of the amplifier 94 is lowered, there is no variation in central frequencies and band amplitudes of the band pass filter 95. On the contrary, when the gain of the band pass filter 95 is reduced, there is no need to consider the delay in the responding due to the time constant of the carrier detection circuit. Therefore, the control can be more accurate.

A carrier detection circuit of the present invention for generating a carrier detection level in accordance with an received signal so as to detect, in accordance with the carrier detection level, whether or not a carrier exists in the received signal. The carrier detection circuit is provided with (a) a detector for detecting pulses, to be detected, having a carrier frequency, (b) an integrator for performing integration of a time in which an output of the detector is higher than a predetermined reference integral value, so as to detect groups of the pulses having the carrier frequency, and for outputting a resultant of the integration as the carrier detection level, and (c) a level change-over circuit for increasing the output of the detector relative to the reference integral value, during a time in which a carrier exists.

With the arrangement, the detector responds to the noise superposed with the carrier, thereby increasing the carrier detection level generated by the integrator. On the other hand, the integrator is provided with the transistor that performs the charging and discharging of the integration capacitor for outputting the carrier detection level, according to whether or not the carrier exists. The transistor is only requested to be sensitive to the frequency of the base band component, but not to the carrier frequency, so that the margin for the response of the transistor is ensured, and the charging and discharging currents of the capacitor can be feeble.

In this way, even when the capacitor has such a small capacity that the capacitor can be integrated, the carrier detection circuit, which is highly sensitive to detect the carrier, is further provided with the level change-over circuit so that the output of the detector is increased relative to the reference integral value of the integrator during the time in which it is detected that the carrier exists, for example, as explained later.

Therefore, even if the pulse level is lowered by the swelling having a frequency lower than the carrier frequency, the output of the detector, which indicates the detection level of the pulse group having the carrier frequency, indicates that the carrier detection is continued. This suppresses the reduction of the carrier detection level due to the swelling, thereby ensuring that the pulse level is below or equal to the carrier detection level after restoring the pulse level that has been lowered by the swelling. In this way, the erroneous detection of the carrier is prevented.

In this manner, the base band component and the noise component are separated, so as to reduce the malfunction caused by the noise having the swelling. This ensures accurate detection of the base band component.

Moreover, in the carrier detection circuit of the present invention, the level change-over circuit limits the output of the detector at a constant voltage that is slightly higher than the reference integral value, so as to increase the output of the detector relative to the reference integral value, during the time carrier exists.

The arrangement limits the output of the detector, which is the detection level of the pulse group, at the constant voltage during the time in which the carrier exists. The constant voltage is higher than the time in which no carrier exists, and is slightly higher than the reference integral voltage. In this way, the swelling in the pulse level is dealt with.

Therefore, solved is such a drawback that the signal to be received cannot be received because the detection level of the pulse group is excessively high when no carrier exists.

Furthermore, in the carrier detection circuit of the present invention, the level change-over circuit reduces a discharging current of a capacitor in an output stage of the detector, so as to increase the output of the detector relative to the reference integral value, during the time in which the carrier exists.

The arrangement reduces, during the time the carrier exists, the discharging current of the capacitor in the outputting side of the detector whose output voltage indicates the detection level of the pulse group, compared to the time when no carrier exists. In this way, the discharging time is set to be longer. In this way, the swelling in the pulse level is dealt with.

Therefore, solved is such a drawback that the signal to be received cannot be received because the detection level of the pulse group is excessively high when no carrier exists.

Moreover, in the carrier detection circuit of the present invention, the level change-over circuit increases an input offset voltage of an received signal to be supplied into the detector, so as to increase the output of the detector relative to the reference integral value, during the time in which the carrier exists.

With the arrangement where the input offset voltage of the received signal into the detector is increased, the signal level is apparently higher during the time in which the carrier exists, compared with the time when no carrier exists. In this way, the swelling in the pulse level is dealt with.

Thus, the output from the detector is not directly adjusted. In this way, it is also possible to reduce a time in which sensitivity is low.

Furthermore, in the carrier detection circuit of the present invention, the level change-over circuit lowers the reference integral value of the integrator, so as to increase the output of the detector relative to the reference integral value, during the time in which the carrier exists.

With the arrangement, where the reference integral value of the integrator is lowered, the output level from the detector is apparently increased during the time in which the carrier exists, compared to the time no carrier exists. In this way, the swelling in the pulse level is dealt with.

Therefore, the output from the detector is not directly adjusted. Thus, it is possible to reduce an effect of a newly-generated noise in associated with the adjustment. As a result, the system can be more tolerate against the malfunction.

Moreover, the infrared ray remote control receiver of the present invention is incorporated with any one of the carrier detection circuits discussed above.

With the arrangement, the output from the detector is increased relative to the reference integral value of the integrator, so as to reduce the malfunction of the receiver with respect to the noise having the swelling.

Furthermore, an infrared ray remote control receiver of the present invention, which is (a) for inputting an received signal, which has been obtained by receiving an infrared ray signal, into a band pass filter via an amplifier, so as to detect the carrier frequency components, to be detected, in the received signal, and (b) for subsequently detecting pulses having the carrier frequency by using carrier detection circuit, so as to perform integration of a time in which a resultant of the detection is higher than a predetermined reference integral value, thereby detecting groups of the pulses having the carrier frequency, while detecting whether or not a carrier exists in the received signal, in accordance with an output of the integration as a carrier detection level, is provided with a gain change-over circuit for lowering at least either of a gain of the amplifier or a gain of band pass filter, during a time in which the carrier is detected.

In the arrangement, provided is the gain change-over circuit in the infrared ray remote control receiver. By detecting the groups of the pulses having the carrier frequency, the infrared ray remote control receiver is allowed to have such a capacitor having a small capacity that the capacitor can be assembled in an integrated circuit chip, for the integration capacitor, which outputs the carrier detection level in the integrator. The gain change-over circuit lowers at least one of the gain of the amplifier and the gain of the band pass filter during the period it is detected that the carrier exists.

Therefore, even if the pulse level is varied due to the swelling having a frequency lower than the carrier frequency, there is a high possibility that the received signal below or equal to the carrier detection level because at least one of the gain of the amplifier and the gain of the band pass filter is lowered. This prevents the erroneous detection of the carrier.

Furthermore, the infrared ray remote control receiver of the present invention is provided with the gain change-over circuit that is given a time constant when the gain is lowered.

With the arrangement, the response of the control is delayed in accordance with the time constant, thereby reducing an effect of the noise generated due to changing-over of the resultant of the detection whether or not the carrier exists. As a result, the system can be more tolerate against the malfunction.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A carrier detection circuit (a) for creating a carrier detection level in accordance with an received signal, and (b) for detecting whether or not a carrier exists in the received signal in accordance with the carrier detection level, said carrier detection circuit comprising:

a detector for detecting, based on the received signal and the carrier detection level, groups of pulses having a carrier frequency to be detected; and an integrator for carrying out integration of a time in which the groups of pulses are detected by said detector, and for outputting a resultant of the integration as the carrier detection level.

2. A carrier detection circuit as set forth in claim 1, further comprising:

an offset circuit for adding an offset to the carrier detection level for comparison of the received signal with the carrier detection level.

3. A carrier detection circuit as set forth in claim 1, further comprising:

a rapid charging circuit for temporarily supplying a large current into an output of said integrator, when the received signal has an amplitude level higher than a predetermined level.

4. A carrier detection circuit as set forth in claim 2, further comprising:

a rapid charging circuit for temporarily supplying a large current into an output terminal of said integrator, when the received signal has an amplitude level higher than a predetermined level.

5. The carrier detection circuit as set forth in claim 3, in which said rapid charging circuit is a diode.

6. The carrier detection circuit as set forth in claim 4, in which said rapid charging circuit is a diode.

7. A carrier detection circuit as set forth in claim 1, further comprising:

a buffer, provided in a position for monitoring a voltage in an integration capacitor of said integrator, wherein a ratio of (a) an input bias current of said buffer, which is a discharging current out of said capacitor, to (b) a charging current into said capacitor from said integrator is set to be constant.

8. A carrier detection circuit as set forth in claim 2, further comprising:

a buffer, provided in a position for monitoring a voltage in an integration capacitor of said integrator, wherein a ratio of (a) an input bias current of said buffer, which is a discharging current out of said capacitor, to (b) a charging current into said capacitor from said integrator is set to be constant.

9. A carrier detection circuit as set forth in claim 3, further comprising:

a buffer, provided in a position for monitoring a voltage in an integration capacitor of said integrator, wherein a ratio of (a) an input bias current of said buffer, which is a discharging current out of said capacitor, to (b) a charging current into said capacitor from said integrator is set to be constant.

10. A carrier detection circuit as set forth in claim 4, further comprising:

a buffer, provided in a position for monitoring a voltage in an integration capacitor of said integrator, wherein a ratio of (a) an input bias current of said buffer, which is a discharging current out of said capacitor, to (b) a charging current into said capacitor from said integrator is set to be constant.

11. The carrier detection circuit as set forth in claim 7, wherein the charging current from said integrator into said integration capacitor is a base current of a vertical PNP transistor, while the input bias current of said buffer is a base current of an NPN transistor.

12. The carrier detection circuit as set forth in claim 8, wherein the charging current from said integrator into said integration capacitor is a base current of a vertical PNP transistor, while the input bias current of said buffer is a base current of an NPN transistor.

13. The carrier detection circuit as set forth in claim 9, wherein the charging current from said integrator into said integration capacitor is a base current of a vertical PNP transistor, while the input bias current of said buffer is a base current of an NPN transistor.

14. The carrier detection circuit as set forth in claim 10, wherein the charging current from said integrator into said integration capacitor is a base current of a vertical PNP transistor, while the input bias current of said buffer is a base current of an NPN transistor.

15. A carrier detection circuit as set forth in claim 1, further comprising:

a current mirror circuit for compensating a parasite light current, in association with a PNP transistor for creating feeble currents of charging and discharging an integration capacitor of said integrator.

16. A carrier detection circuit as set forth in claim 2, further comprising:

a current mirror circuit for compensating a parasite light current, in association with a PNP transistor for creating feeble currents of charging and discharging an integration capacitor of said integrator.

17. A carrier detection circuit as set forth in claim 3, further comprising:

a current mirror circuit for compensating a parasite light current, in association with a PNP transistor for creating feeble currents of charging and discharging an integration capacitor of said integrator.

18. A carrier detection circuit as set forth in claim 4, further comprising:

a current mirror circuit for compensating a parasite light current, in association with a PNP transistor for creating feeble currents of charging and discharging an integration capacitor of said integrator.

19. A carrier detection circuit as set forth in claim 7, further comprising:

a current mirror circuit for compensating a parasite light current, in association with a PNP transistor for creating feeble currents of charging and discharging an integration capacitor of said integrator.

20. A carrier detection circuit as set forth in claim 8, further comprising:

a current mirror circuit for compensating a parasite light current, in association with a PNP transistor for creating feeble currents of charging and discharging an integration capacitor of said integrator.

21. A carrier detection circuit as set forth in claim 9, further comprising:

a current mirror circuit for compensating a parasite light current, in association with a PNP transistor for creating feeble currents of charging and discharging an integration capacitor of said integrator.

22. A carrier detection circuit as set forth in claim 10, further comprising:

a current mirror circuit for compensating a parasite light current, in association with a PNP transistor for creating feeble currents of charging and discharging an integration capacitor of said integrator.

23. The carrier detection circuit as set forth in claim 15, wherein the current mirror circuit for compensating the parasite light current has an expitaxial island having an area larger than an area of an expitaxial island of said PNP transistor to be compensated.

24. The carrier detection circuit as set forth in claim 16, wherein the current mirror circuit for compensating the parasite light current has an expitaxial island having an area larger than an area of an expitaxial island of said PNP transistor to be compensated.

25. The carrier detection circuit as set forth in claim 17, wherein the current mirror circuit for compensating the parasite light current has an expitaxial island having an area larger than an area of an expitaxial island of said PNP transistor to be compensated.

26. The carrier detection circuit as set forth in claim 18, wherein the current mirror circuit for compensating the parasite light current has an expitaxial island having an area larger than an area of an expitaxial island of said PNP transistor to be compensated.

27. The carrier detection circuit as set forth in claim 19, wherein the current mirror circuit for compensating the parasite light current has an expitaxial island having an area larger than an area of an expitaxial island of said PNP transistor to be compensated.

28. The carrier detection circuit as set forth in claim 20, wherein the current mirror circuit for compensating the parasite light current has an expitaxial island having an area larger than an area of an expitaxial island of said PNP transistor to be compensated.

29. The carrier detection circuit as set forth in claim 21, wherein the current mirror circuit for compensating the parasite light current has an expitaxial island having an area larger than an area of an expitaxial island of said PNP transistor to be compensated.

30. The carrier detection circuit as set forth in claim 22, wherein the current mirror circuit for compensating the parasite light current has an expitaxial island having an area larger than an area of an expitaxial island of said PNP transistor to be compensated.

31. A carrier detection circuit for detecting whether or not a carrier exists in an received signal, in accordance with a carrier detection level, comprising:

a detector for detecting groups of pulses having a carrier frequency in an received signal, based on the carrier detection level; and an integrator for carrying out an integration of an output signal of said detector, and for outputting a resultant of the integration as the carrier detection level.

32. The carrier detection circuit as set forth in claim 31, wherein said detector includes:

an amplifier for amplifying a difference between the received signal and the carrier detection level;

a rectifier for rectifying an output voltage of said amplifier;

a capacitor for being charged with the output voltage of said amplifier via said rectifier, a voltage across said capacitor being outputted as the output signal; and a constant current source, connected with said capacitor in parallel, for discharging the capacitor via a constant current.

33. The carrier detection circuit as set forth in claim 32, wherein a ratio of the charging current to the discharging current of said capacitor is constant.

34. A carrier detection circuit as set forth in claim 31, further comprising:

an offset circuit for adding an offset voltage into the received signal or the carrier detection level.

35. The carrier detection circuit as set forth in claim 34, wherein said offset circuit includes:

a pair of first and second transistors whose bases receive differential received signals, respectively;

first and second load resistors, connected with emitters of said first and second transistors, respectively;

a first constant current source for supplying currents to said first and second transistors via said first and second load resistors;

third and fourth transistors, connected with said first and second transistors, for configuring a current mirror circuit, said third and fourth transistors occupying areas , which are identical to each other, of said current mirror circuit, respectively;

a fifth transistor whose base receives a voltage between collectors of said first and third transistors; and a second constant current source for supplying a constant current to an emitter of said fifth transistor.

36. A carrier detection circuit as set forth in claim 31, further comprising:

a rapid charging circuit for rapidly charging said capacitor, when the received signal exceeds the carrier detection level.

37. A carrier detection circuit as set forth in claim 34, further comprising:

a rapid charging circuit for rapidly charging said capacitor, when the received signal exceeds a predetermined level.

38. The carrier detection circuit as set forth in claim 32, wherein the received signal and the carrier detection level are supplied into said detection circuit via first and second buffers, respectively.

39. A carrier detection circuit for generating a carrier detection level in accordance with an received signal so as to detect, in accordance with the carrier detection level, whether or not a carrier exists in the received signal, said carrier detection circuit, comprising:

a detector for detecting pulses, to be detected, having a carrier frequency;

an integrator for performing integration of a time in which an output of said detector is higher than a predetermined reference integral value, so as to detect groups of the pulses having the carrier frequency, and for outputting a resultant of the integration as the carrier detection level; and a level change-over circuit for increasing the output of said detector relative to the reference integral value, during a time in which a carrier exists.

40. The carrier detection circuit as set forth in claim 39, wherein said level change-over circuit limits the output of said detector at a constant voltage that is slightly higher than the reference integral value, so as to increase the output of said detector relative to the reference integral value, during the time carrier exists.

41. The carrier detection circuit as set forth in claim 39, wherein said level change-over circuit reduces a discharging current of a capacitor in an output stage of said detector, so as to increase the output of said detector relative to the reference integral value, during the time in which the carrier exists.

42. The carrier detection circuit as set forth in claim 39, wherein said level change-over circuit increases an input offset voltage of an received signal to be supplied into said detector, so as to increase the output of said detector relative to the reference integral value, during the time in which the carrier exists.

43. The carrier detection circuit as set forth in claim 39, wherein said level change-over circuit lowers the reference integral value of said integrator, so as to increase the output of said detector relative to the reference integral value, during the time in which the carrier exists.

44. An infrared ray remote control receiver, incorporated with a carrier detection circuit for creating a carrier detection level in accordance with an received signal, so as to detect, in accordance with the carrier detection level, whether or not the carrier exists in the received signal, said carrier detection circuit, including:

a detector for detecting pulses, to be detected, having a carrier frequency;

an integrator for detecting groups of the pulses having the carrier frequency by performing integration of a time in which an output of said detector is higher than a predetermined reference integral value, and for outputting a resultant of the integration as the carrier detection level; and a level change-over circuit for increasing the output of said detector relative to the reference integral value, during a time in which a carrier exists.

45. The carrier detection circuit as set forth in claim 44, wherein said level change-over circuit limits the output of said detector at a constant voltage that is slightly higher than the reference integral value, so as to increase the output of said detector relative to the reference integral value, during the time carrier exists.

46. The carrier detection circuit as set forth in claim 44, wherein said level change-over circuit reduces a discharging current of a capacitor in an output stage of said detector, so as to increase the output of said detector relative to the reference integral value, during the time in which the carrier exists.

47. The carrier detection circuit as set forth in claim 44, wherein said level change-over circuit increases an input offset voltage of an received signal for said detector, so as to increase the output of said detector relative to the reference integral value, during the time in which the carrier exists.

48. The carrier detection circuit as set forth in claim 44, wherein said level change-over circuit lowers the reference integral value of said integrator, so as to increase the output of said detector relative to the reference integral value, during the time in which the camer exists.

49. An infrared ray remote control receiver (a) for inputting an received signal, which has been obtained by receiving an infrared ray signal, into a band pass filter via an amplifier, so as to detect the carrier frequency components, to be detected, in the received signal, (b) for subsequently detecting pulses having the carrier frequency by using carrier detection circuit, so as to perform integration of a time in which a resultant of the detection is higher than a predetermined reference integral value, thereby detecting groups of the pulses having the carrier frequency, while detecting whether or not a carrier exists in the received signal, in accordance with an output of the integration as a carrier detection level, said infrared ray remote control receiver, comprising:

a gain change-over circuit for lowering at least either of a gain of said amplifier or a gain of band pass filter, during a time in which the carrier is detected.

50. The infrared ray remote control receiver as set forth in claim 49, wherein said gain change-over circuit is given a time constant while said gain change-over circuit is lowering the gain.

* * * * *